United States Patent
Yamana

Patent Number: 5,748,375
Date of Patent: May 5, 1998

[54] MAGNIFYING LENS AND DISPLAY APPARATUS

[75] Inventor: Shinji Yamana, Yamatokoriyama, Japan

[73] Assignee: Sharp Kabushiki Kaisha, Osaka, Japan

[21] Appl. No.: 746,264

[22] Filed: Nov. 8, 1996

[30] Foreign Application Priority Data

Nov. 9, 1995 [JP] Japan ................................. 7-291476

[51] Int. Cl.⁶ .......................... G02B 27/10; G02B 27/02
[52] U.S. Cl. ........................... 359/622; 359/621; 359/802
[58] Field of Search ........................... 359/802, 618, 359/619, 621, 622, 625, 626, 623

[56] References Cited

U.S. PATENT DOCUMENTS

| | | | |
|---|---|---|---|
| 4,082,440 | 4/1978 | Bennett | 353/26 R |
| 4,220,400 | 9/1980 | Vizenor | 353/26 R |
| 4,348,185 | 9/1982 | Breglia et al. | 434/43 |
| 4,422,720 | 12/1983 | Sheiman et al. | 359/834 |
| 4,934,773 | 6/1990 | Becker | 359/214 |
| 5,003,300 | 3/1991 | Wells | 340/705 |
| 5,098,184 | 3/1992 | Van Den Brandt et al. | 353/102 |
| 5,270,859 | 12/1993 | Wirth et al. | 359/622 |
| 5,291,334 | 3/1994 | Wirth et al. | 359/622 |
| 5,475,513 | 12/1995 | Nakanishi et al. | 359/40 |
| 5,577,826 | 11/1996 | Kasame et al. | 353/31 |

FOREIGN PATENT DOCUMENTS

| | | |
|---|---|---|
| 0292111 | 11/1988 | European Pat. Off. |
| 0367534 | 5/1990 | European Pat. Off. |
| 0653891 | 5/1995 | European Pat. Off. |
| 0687933 | 12/1995 | European Pat. Off. |
| 61-079364 | 4/1986 | Japan |
| 3289615 | 12/1991 | Japan |
| 4168489 | 6/1992 | Japan |
| 5183838 | 7/1993 | Japan |
| 5328258 | 12/1993 | Japan |
| 9407161 | 3/1994 | WIPO |

OTHER PUBLICATIONS

International Publication No.: WO 89/08304 dated Sep. 1989.

*Primary Examiner*—David C. Nelms
*Assistant Examiner*—Ricky Mack

[57] ABSTRACT

A magnifying lens is arranged as follows: a two dimensional negative lens array composed of a plurality of negative lenses provided so that principal planes of the same are disposed on a same plane, and a two dimensional positive lens array composed of a plurality of positive lenses provided so that principal planes of the same are disposed on a same plane, are provided vis-a-vis so that each pair of corresponding negative and positive lenses and constitutes each compound lens. Each pair of the negative and positive lenses and constituting each compound lens is provided so that each straight line connecting respective principal points of each pair of negative and positive lenses intersects substantially at one point a predetermined distance away from the principal plane of the two-dimensional positive lens array. A display apparatus has an optical system which forms images and through which the observer observes the images with the naked eye, the optical system being provided in front of the eyes of the observer. The optical system includes an image display element and the magnifying lens of the present invention so that magnified images of the images displayed on the image display element are visible to the naked eye.

50 Claims, 49 Drawing Sheets

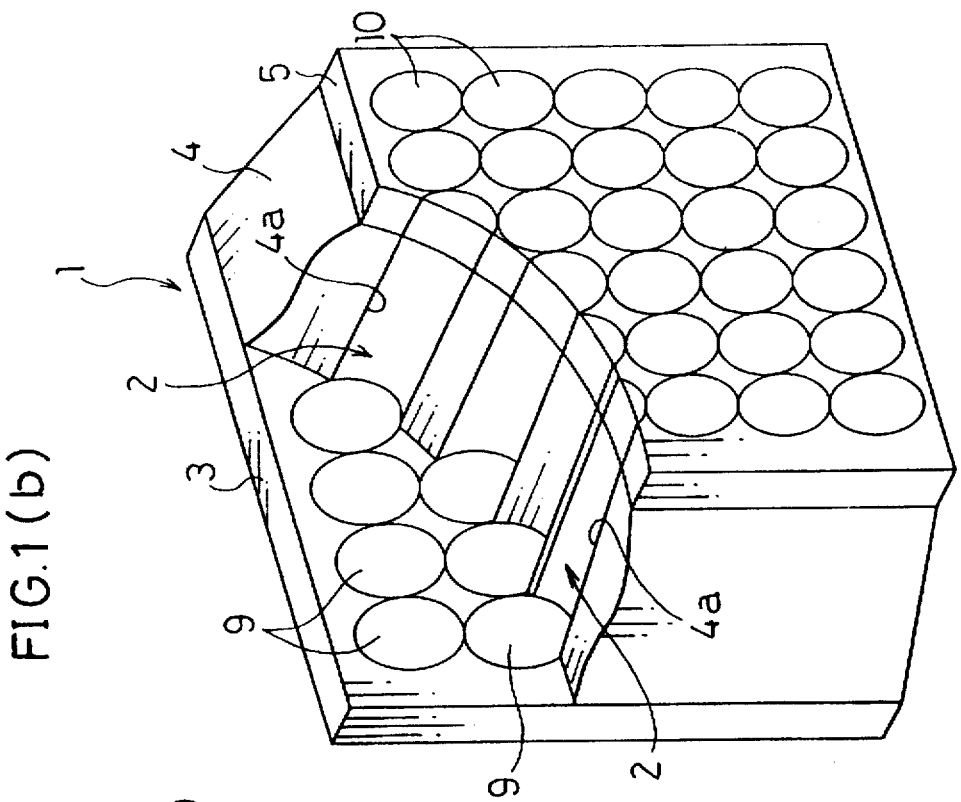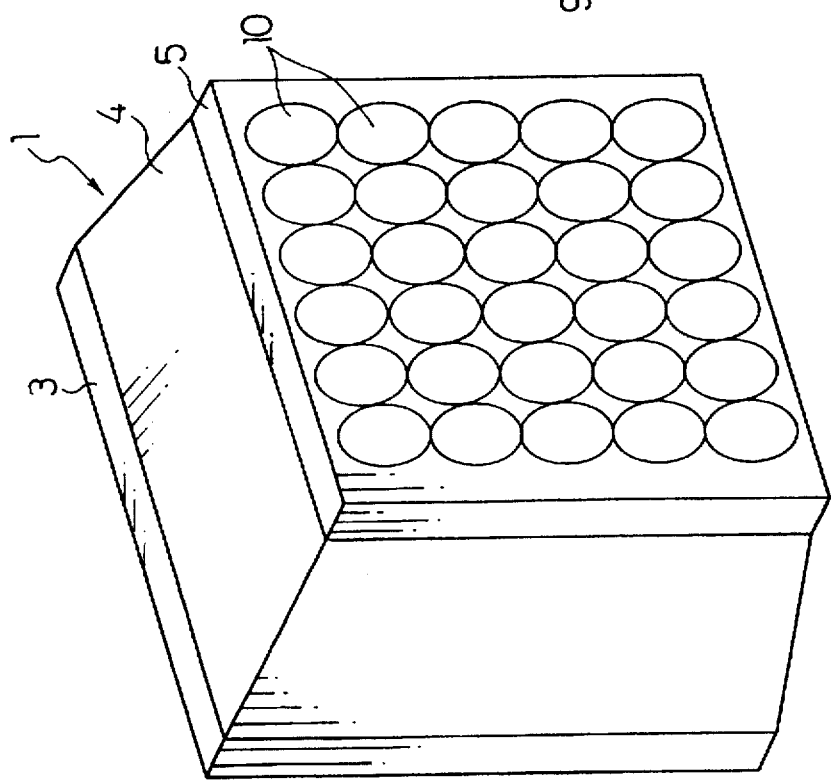

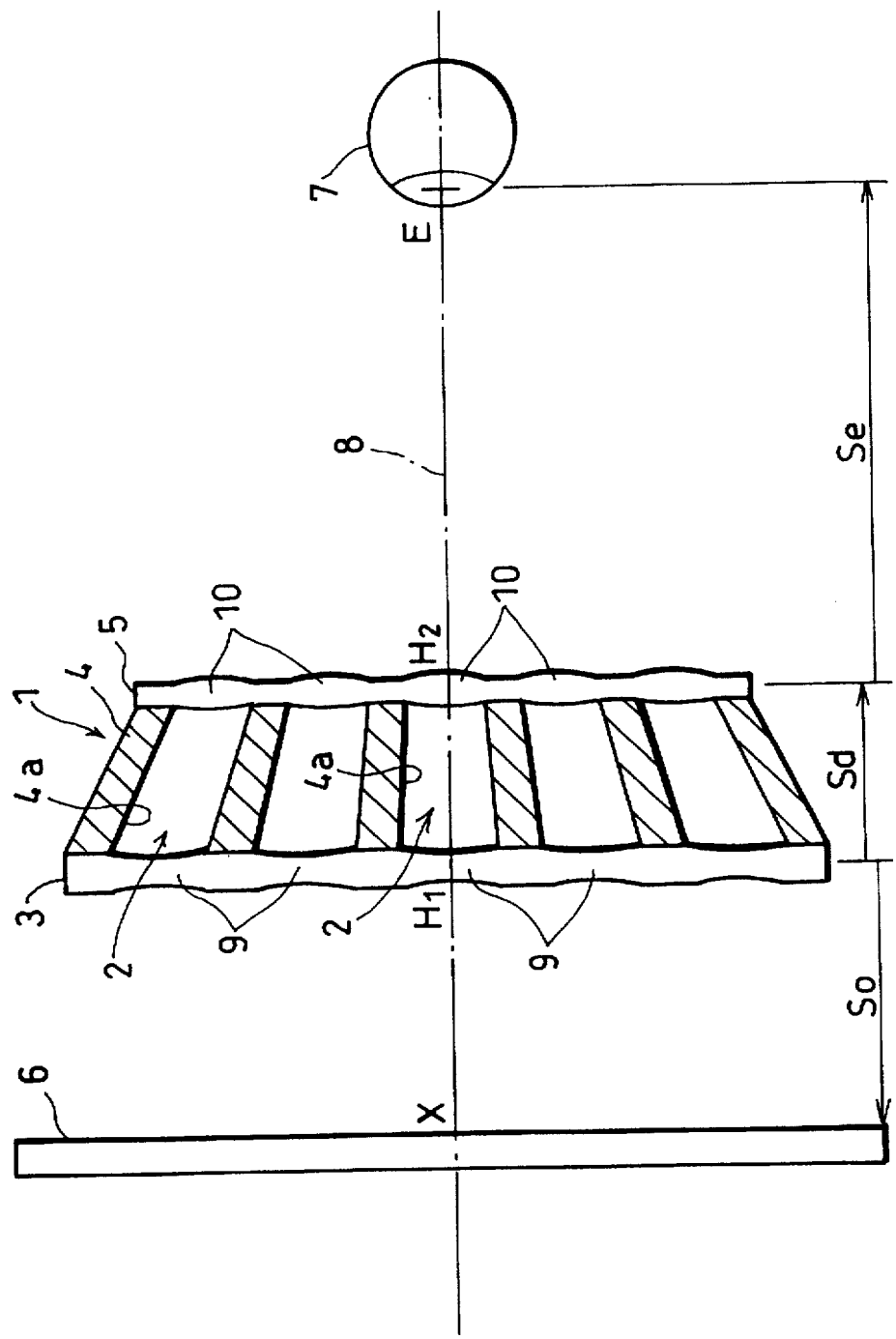

IMAGE LIGHT

IMAGE LIGHT

IMAGE LIGHT

MAGNIFYING LENS AND DISPLAY APPARATUS

FIELD OF THE INVENTION

The present invention relates to a magnifying lens with which magnified images of objects are visible to a naked eye, and more particularly relates to a magnifying lens composed of compound lenses, each compound lens being composed of a negative lens which diverges light and a positive lens which converges light. The present invention also relates to a portable display apparatus for personal use, which has an optical system unit including at least an image display device and a magnifying lens with which magnified images are visible to a naked eye, the optical system unit being arranged so as to be worn by the observer on somewhere of the body such as the head so that the observer can watch TV or videos.

BACKGROUND OF THE INVENTION

Various miniature display apparatuses suitable for hand-held or headgear-mounted use which can provide vivid images though being small in size have been developed and put on the market. Such display apparatuses are roughly classified into two categories based on optical systems they take.

An apparatus as an example included in one category causes the observer to observe a virtual image of a two-dimensional image display element (as disclosed in the Japanese Publications for Laid-open Patent Application No. 3-289615/1991, No. 4-168489/1992, and No. 5-183838/1993 (Tokukaihei No. 3-289615, No. 4-168489, and No. 5-183838), for example). Another apparatus as an example included in the other category has a point light source or a one-dimensional light source, which is scanned on the retina of the observer, thereby forming an image thereon (as disclosed in the U.S. Pat. No. 4,934,773, and as its related patent, the U.S. Pat. No. 5,003,300, for example).

The following description will discuss the foregoing conventional arrangements with reference to FIGS. 47 through 50.

A display apparatus 101 shown in FIG. 47, as the former apparatus with which a virtual image of a two-dimensional image display element is observed, has a goggle-like housing 102. In the goggle-like housing 102, speakers 103 are provided respectively at aural sections 102a on both the laterals of the housing 102, so that the positions thereof fall on the positions of the ears of the observer, when the observer wears the housing 102 in the same manner as that for wearing glasses. The apparatus also has two pairs of an image display element 104 utilizing a liquid crystal panel or the like and a magnifying lens 105 which may be a single lens or a multiple lens configuration. The pairs of the image display element 104 and the magnifying lens 105 are provided respectively at visual sections 102b whose positions fall on positions of the eyes of the observer.

The display apparatus 101 thus has the optical systems composed of the image display elements 104 and the magnifying lenses 105 in pairs so as to correspond to the right and left eyes of the observer. Therefore, a three-dimensional image can be obtained by supplying slightly displaced images of the same object to the right and left image display elements, respectively.

Each magnifying lens 105 is provided between the image display element 104 and an eye 106 of the observer, as shown in FIGS. 48 and 49. In FIG. 48, Xo indicates a center of the image display element 104, H indicates a principal point of the lens 107 of the magnifying lens 105, Xe indicates a position of a pupil of the eye 106, S represents a distance between the center of the image display element 104 and the principal point of the lens 107, and Se represents a distance between the principal point of the lens 107 and the position of the pupil of the eye 106. With this arrangement, by adjusting the distances S and Se, the observer can observe a magnified image obtained by magnifying an image formed by the image display element 104. Usually used as the magnifying lenses 105 are achromatic lenses or non-spherical lenses so as to eliminate various aberrations. Note that FIG. 48 illustrates an example of the magnifying lens 105 composed of a single magnifying lens 107, while FIG. 49 illustrates an example of the magnifying lens 105 composed of multiple magnifying lenses 107.

As an example of the latter apparatus, which has a point light source or a one-dimensional light source which is scanned on the retina so as to form an image thereon, a display apparatus 111 is shown in FIG. 50. The display apparatus 111 has a one-dimensional display device 112 composed of linearly-aligned light-emitting diode (LED) elements, a vibrating mirror 113 as optical path deflecting means, and a magnifying lens 105 composed of a single magnifying lens or a multiple magnifying lens configuration.

The display apparatus 111 is arranged so that virtual images formed by selectively illuminating the one-dimensional display device 112 is observed through the magnifying lens 105. To be more specific, light 114 emitted from the one-dimensional display apparatus 112 to the eye 106 is deflected by the reciprocating motion of the vibrating mirror 113. Therefore, the point at which the light from the display device 112 is projected is caused to scan from a point $Z_1$, through a point $Z_0$, to a point $Z_2$ on the retina, thereby forming a two-dimensional image thereon.

However, with the arrangement of the display apparatus 101 in the case where each magnifying lens 105 is composed of a single lens 107 as shown in FIG. 48, it is difficult to obtain a wide apparent visual field due to refraction of the lenses 107, distortion of images, or the like. Therefore, it may be necessitated that each magnifying lens 105 is composed of a plurality of the lenses 107, as shown in FIG. 49. When, as in the above case, a plurality of the lenses 107 are combined so as to constitute a magnifying lens, non-spherical lenses or achromatic lenses are utilized as the lenses 107 so as to suppress aberrations.

Such arrangement, however, presents another problems that the apparatus becomes heavier and bulkier, and it becomes difficult for the apparatus to provide easy viewing due to the shorter distance between the eyes 106 and the lenses 107, as shown in FIG. 49.

It is also difficult to eliminate aberrations in peripheral parts of the image, even with the use of the non-spherical lenses.

Further, as to the arrangement of the display apparatus 101 shown in FIG. 47 wherein the image display elements 104 and the magnifying lenses 105 are installed apart from the eyes 106, a problem has been presented that the center of gravity is positioned apart form the head when the image display element 104 and the lenses 107 are heavy. This causes means for fixing the apparatus to the head to become bulkier, thereby causing the observer to have greater fatigue when wearing the apparatus.

Furthermore, when the apparent visual field is broadened with the number of pixels of the image display element 104 remaining the same, another problem arises that the pixels become less dense, thereby causing the image quality to deteriorate. On the other hand, an increase in the number of the pixels of the image display element 104 may cause the image display element to become bulkier or heavier, and lead to a problem of a rise in production costs.

As to the display apparatus 111 shown in FIG. 50, scanning at a great angle is impossible since the light 114 is deflected centering on a center of an entrance pupil of the eye 106, or a convolution point of the eye 106. This causes broadening the visual field to be difficult.

SUMMARY OF THE INVENTION

The object of the present invention is to provide a magnifying lens and a display apparatus incorporating the magnifying lens, which are smaller in size and lighter in weight, have a wider visual field, and ensure decrease in production costs.

In order to achieve the above object, the magnifying lens of the present invention comprises a plurality of compound lenses, which is formed by opposite two-dimensional negative lens array and a two-dimensional positive lens array, the two-dimensional negative lens array having a plurality of negative lenses, the two-dimensional positive lens array having a plurality of the positive lenses, each of the compound lenses having a pair of the opposite negative and positive lenses, the negative lenses being provided so that respective principal planes of the negative lenses are on a same first plane, the positive lenses being provided so that respective principal planes of the positive lenses are on a same second plane, wherein each pair of the negative and positive lenses is provided so that a straight line connecting the respective principal points of the negative and positive lenses intersects substantially at a point Xc, a distance Sc between the point Xc and the first plane of the two-dimensional negative lens array satisfying the following equation:

$$Sc = \frac{So \cdot Sd \cdot f2}{(So + f1)Sd - (f1 + f2)So} \quad (1)$$

where So (So<0) represents a distance from the first plane of the two-dimensional negative lens array to the object, Sd (Sd>0) represents a distance from the first plane of the two-dimensional negative lens array to the second plane of the two-dimensional positive lens array, f1 (f1<0) represents a focal distance of the negative lens, and f2 (f2>0) represents a focal distance of the positive lens.

The above-mentioned negative lens is an optical system which diverges light. The negative lens may be a single concave lens, or a multiple lens configuration. The above-mentioned positive lens is an optical system which converges light. The positive lens may be a single convex lens, or a multiple lens configuration.

For the following reason, each straight line connecting the respective principal points of the negative and positive lenses does not necessarily intersect strictly at the point Xc.

The compound lens is an optical system with which an image (virtual image) formed by the negative lens is magnified by the positive lens so that the image (virtual image) thus magnified can be observed. Light from an observed object enters the compound lens on the negative lens side, and outgoes thereof on the positive lens side, thereby reaching an eye. With this optical system, a distance between the object and the lens can be shortened, with a distance between the lens and the eye unchanged, compared with a conventional single-piece lens with the same magnifying power.

Light emitted from one point on the observed object enters a plurality of the compound lenses and reaches the eye. When the compound lenses are provided on a flat surface so that each straight line connecting the respective principal points of the negative and positive lenses of each compound lens intersects at the point Xc, the distance Sc between the point Xc and the positive lens array satisfying the above equation (1), it appears as if respective images produced by the compound lenses coincide with each other, as suggested by the paraxis theory.

In other words, with the magnifying lens as arranged above, luminous flux emitted from one point on the observed object is converged into one point on the retina of the eye, even though the luminous flux enters the eye through plural compound lenses. In short, it can be said that the above-described magnifying lens is a lens which causes an object and an image to correspond at a one-to-one ratio.

Comparing a lens array and a single lens which have the same diameter, the lens array composed of a plurality of lenses, each with a smaller diameter, has smaller weight and thickness than those of the single lens. Therefore, by using the lens array, the magnifying lens is made thinner and lighter than that composed of the single lens.

Furthermore, distortions or curves of the images accompanying the broadening of the visual field can be eliminated by, for example, changing focal distances of the compound lenses (composite focal distances of the negative and positive lenses) in the periphery of the lens array. Thus, it is possible to correct the images by changing various characteristics of each compound lens.

When each line connecting the respective principal points of the negative and positive lenses constituting each compound lens does not intersect at the point Xc, respective images of the compound lenses do not coincide with one another, thereby being diverged. However, even when the images are diverged, there would not be a problem in the case where such divergence is not recognized with the naked eye. Furthermore, even though the images are diverged to such an extent that it is recognized by the naked eye, the divergence is sometimes unnoticeable, depending on the quality of images of the observed object. For these reasons, the above-described straight lines do not necessarily intersect strictly at the point Xc.

It is preferable that the two-dimensional negative and positive lens arrays are provided on respective flat substrates, and the substrates are provided substantially in parallel. With this arrangement, each lens is provided on the flat substrate at a fixed position, thereby facilitating the positioning of the negative and positive lenses when producing the compound lenses with the negative and positive lenses.

Furthermore, with the above arrangement wherein the lenses are fixed on the substrates, visibility adjustment can be easily conducted, since the visibility adjustment is carried out by changing a distance between the substrates of the two-dimensional negative and positive lens arrays.

It is preferable that a light intercepting member is provided between the compound lenses, thereby forming a light intercepting frame which shield the compound lenses. The light intercepting member has a function preventing light passing through a negative lens constituting a compound lens from passing through a positive lens constituting another compound lens.

In the case where the intercepting member is arranged so that the intercepting member is sandwiched between the two-dimensional negative and positive lens arrays and holes are bored through the intercepting member between each pair of the negative and positive lenses constituting a compound lens, this arrangement facilitates providing the two-dimensional lens arrays in parallel.

It is also preferable that the intercepting member, at least surface thereof, is made of material which intercepts, or absorbs light.

In order to achieve the above-mentioned object, the display apparatus of the present invention comprises:

an optical system having an image display element for displaying images and a magnifying lens for magnifying the images displayed on the image display element so that the images are visible to naked eye; and arranging means for providing the optical system so that the images are visible to the naked eye, wherein the magnifying lens comprising a plurality of compound lenses, which is formed by opposite two-dimensional negative lens array and a two-dimensional positive lens array, the two-dimensional negative lens array having a plurality of negative lenses, the two-dimensional positive lens array having a plurality of the positive lenses, each of the compound lenses having a pair of the opposite negative and positive lenses, the negative lenses being provided so that respective principal planes of the negative lenses are on a same first plane, the positive lenses being provided so that respective principal planes of the positive lenses are on a same second plane, each pair of the negative and positive lenses is provided so that a straight line connecting the respective principal points of the negative and positive lenses intersects substantially at a point Xc, a distance Sc between the point Xc and the first plane of the two-dimensional negative lens array satisfying the following equation:

$$Sc = \frac{So \cdot Sd \cdot f2}{(So+f1)Sd - (f1+f2)So}$$

where So (So<0) represents a distance from the first plane of the two-dimensional negative lens array to the object, Sd (Sd>0) represents a distance from the first plane of the two-dimensional negative lens array to the second plane of the two-dimensional positive lens array, f1 (f1<0) represents a focal distance of the negative lens, and f2 (f2>0) represents a focal distance of the positive lens.

According to the above arrangement of the display apparatus, images displayed by the image display element are observed through the magnifying lens of the present invention. The following description will discuss the following three cases where different three types of magnifying lenses are respectively employed.

(1) In the case where a magnifying lens composed of compound lenses provided on a flat surface is employed:

Since with the magnifying lens of this type it is possible to shorten the distance between the image display element and the magnifying lens, the position of the image display element in the display apparatus is made closer to the observer's eye. Therefore, it is possible to reduce the depth of the display apparatus, and to make the center of gravity closer to the head. As a result, fatigue caused when the optical system is put on the head can be reduced. Since burden on arranging means for arranging the apparatus on the head is also reduced, simplification of the arranging means can be achieved.

(2) In the case where a magnifying lens composed of compound lenses provided on a spherical surface:

With the use of the magnifying lens of this type, it is possible to produce excellent pictures which have a wide visual field and less deterioration in the periphery. Therefore, since lenses do not have to be increased in number as is the conventional case, it is possible to achieve miniaturization and reduction of weight of the display apparatus which realizes a wide visual field.

(3) In the case where a magnifying lens composed of compound lenses provided on a cylindrical surface:

When the magnifying lens of this type is a magnifying lens composed of a linear compound lens array provided on a cylindrical surface in a horizontal direction of a picture, the display apparatus can have a greater visual angle in the horizontal direction of the picture. Therefore, it is preferable to use this magnifying lens so as to observe pictures for a wide rectangular screen, such as the cinema screen.

Furthermore, since an object plane of the magnifying lens is a cylindrical surface, such curved object plane can be easily obtained, for example, by providing linear image display elements on a cylindrical surface, or by curving a flat image display element in a cylindrical form.

The magnifying lens is an optical system which can converge light, and for example, a convex lense, an aggregate of a plurality of lenses, or a diffraction lens is used as the magnifying lens. The magnifying lens employed in the display apparatus is not restricted to that of the present invention.

Furthermore, in order to achieve the above object, the display apparatus of the present invention comprises:

an optical system having an image display element for displaying images, a screen on which the images are projected, a projection lens for projecting the images on the image display element on the screen, and a magnifying lens for magnifying the images displayed on the image display element so as to be visible to naked eye; and arranging means for providing the optical system in front of the observer's eye, wherein the magnifying lens comprising a plurality of compound lenses, which is formed by opposite two-dimensional negative lens array and a two-dimensional positive lens array, the two-dimensional negative lens array having a plurality of negative lenses, the two-dimensional positive lens array having a plurality of the positive lenses, each of the compound lenses having a pair of the opposite negative and positive lenses, the negative lenses being provided so that respective principal planes of the negative lenses are on a same first plane, the positive lenses being provided so that respective principal planes of the positive lenses are on a same second plane, each pair of the negative and positive lenses is provided so that a straight line connecting the respective principal points of the negative and positive lenses intersects substantially at a point Xc, a distance Sc between the point Xc and the first plane of the two-dimensional negative lens array satisfying the following equation:

$$Sc = \frac{So \cdot Sd \cdot f2}{(So+f1)Sd - (f1+f2)So}$$

where So (So<0) represents a distance from the first plane of the two-dimensional negative lens array to the object, Sd (Sd>0) represents a distance from the first plane of the two-dimensional negative lens array to the second plane of the two-dimensional positive lens array, f1 (f1<0) represents a focal distance of the negative lens, and f2 (f2>0) represents a focal distance of the positive lens.

According to the above arrangement, patterns displayed by the image display element are projected on the screen so that images are formed, and the images thus formed are observed through the magnifying lens. In short, an optical system wherein images formed by the projection lens are observed through the magnifying lens.

In the case where the magnifying lens has curve aberration, the curving of virtual images can be corrected by curving a projection plane. In the case where the magnifying lens has aberration which causes pincushion-type distortion, projecting lens is arranged so as to produce pictures with barrel-type distortion which is opposite to the pincushion-type distortion, so that the two types of distortion cancel each other.

Thus, utilizing the projection lens and the projection plane, it is possible to solve aberrations of the magnifying lens, without increasing the number of the magnifying lens or deforming the magnifying lens into a non-spherical form. This enables thinning and reducing weight of the magnifying lens, and cutting down costs of production of the magnifying lens, thereby leading to miniaturization and reduction in weight of the display apparatus.

As the screen, a thin board may be employed provided that images can be projected thereon, or an inner wall of the housing for housing the optical parts of the display apparatus may be utilized. With this arrangement as well, miniaturization, reduction of weight, and thinning of the display apparatus are enabled.

It is preferable that an optical path deflecting member is provided between the projection lens and the screen, which deflects light from the image display element through the projection lens onto the screen so as to scan and form images on the screen. With this arrangement of the display apparatus, output patterns of the image display element which partly displays an image, and the patterns projected on the screen are scanned so that an image is formed. The scan is carried out by the optical path deflecting member, which is composed of a rotating or vibrating mirror. The image thus formed on the screen is observed through the magnifying lens.

Therefore, it is found that applied to the display device which is arranged as above is not a conventional method whereby the patterns displayed by the image display element is directly mapped on the retina and scanned thereon, but a method whereby the patterns displayed by the image display element are mapped on the projection plane and scanned so that an image is formed.

Therefore, according to the conventional method, the rotation center of the scan is positioned at the convolution point of the eye, whereas according to the present method, the rotation center of the scan is positioned at the rotation center of the optical path deflecting member. As a result, the scan can be conducted in a wide range. In addition, width of an apparent visual field does not depend on the scanning range, but depends on an apparent visual field of the magnifying lens through which images formed on the projection plane by the scan are observed. Therefore, the apparent visual field is not limited by the scan.

Moreover, since the image display element may be composed of a single light emitting element, a single optical shutter, linearly aligned light emitting elements or linearly aligned optical shutters, miniaturization and reduction of weight of the display apparatus is enabled.

For a fuller understanding of the nature and advantages of the invention, reference should be made to the ensuing detailed description taken in conjunction with the accompanying drawings.

BRIEF DESCRIPTION OF THE DRAWINGS

FIGS. 1(a) and 1(b) are schematic perspective views showing an arrangement of a compound lens array as a magnifying lens in accordance with the first embodiment of the present invention.

FIG. 2 is a view illustrating relative positions of the compound lens array shown in FIGS. 1(a) and 1(b), an observer, and an image display element.

FIG. 29(a) is a view illustrating control on reflection in the case where a screen of the display apparatus has a white diffusing surface, while FIG. 29(b) is a view illustrating control on reflection in the case where the screen has a serrated reflection member.

FIG. 30(a) is a view illustrating the case where a swollen image in comparison with an original image is obtained when projected, whereas FIG. 30(b) is a view illustrating the case where a shrunk image in comparison with the original image is obtained when projected.

DESCRIPTION OF THE PREFERRED EMBODIMENTS

[First Embodiment]

Figure 3:
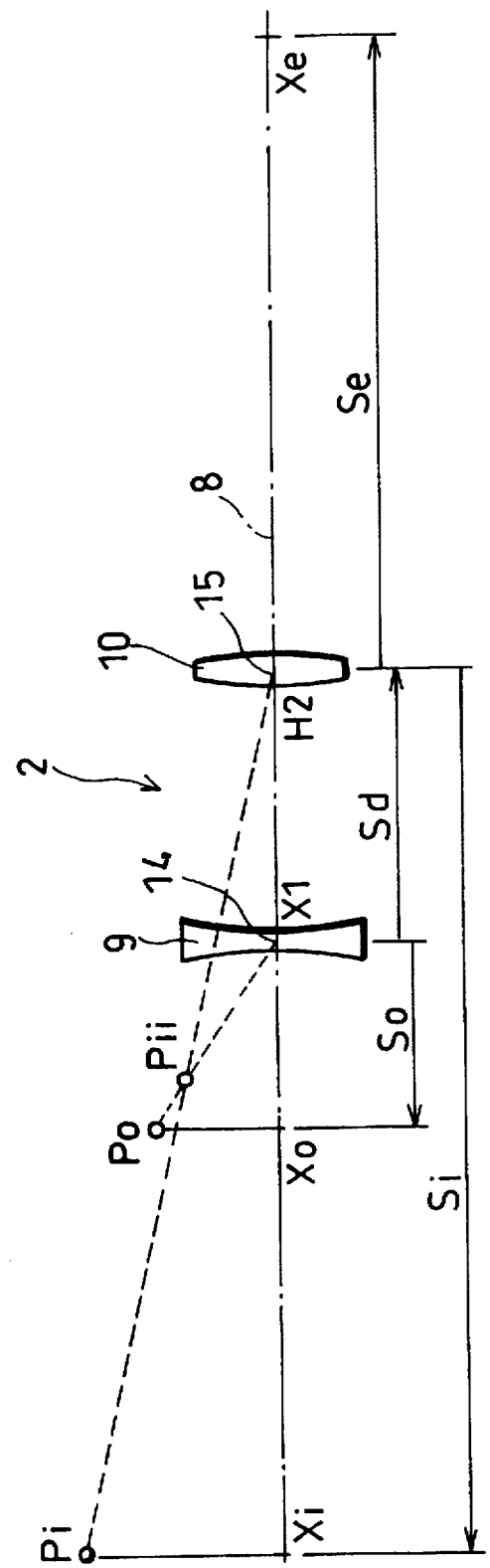
FIG. 3 is a view illustrating object-image correlations of compound lenses constituting the compound lens array shown in FIGS. 1(a) and 1(b).

The following description will discuss one embodiment of the present invention.

FIG. 1(a) illustrates a compound lens 1 as a magnifying lens in accordance with the present embodiment wherein a two-dimensional negative lens array 3 (hereinafter referred to as negative lens array 3) and a two-dimensional positive lens array 5 (hereinafter referred to as positive lens array 5) are provided so as to sandwich an light intercepting frame 4 as a light intercepting member.

As shown in FIG. 1(b), a plurality of 1 mm diameter (aperture) negative lenses 9 provided in a planar array constitute the negative lens array 3, whereas a plurality of 0.9 mm diameter positive lenses 10 provided in a planar array constitute the positive lens array 5. The negative lens array 3 and the positive lens array 5 are provided substantially parallel.

Each negative lens 9 is a divergent optical member, whereas each positive lens 10 is a convergent optical member. For purpose of illustration, thin single biconcave lenses are used as the negative lenses 9 whereas thin single biconvex lenses are used as the positive lenses 10 in the present embodiment. The thin lens here means a lens with a thickness which can be neglected when image formation correlations of the lens are described. In contrast, a thick lens means a lens with a thickness which cannot be neglected when image formation correlations of the lens are described. The thick lens will be referred to later.

The light intercepting frame 4 is made of resin colored by a black pigment such as carbon black, wherein a plurality of apertures 4a are provided so as to be bored through the light intercepting frame 4 from the side of the negative lens array 3 to the positive lens array 5. Each aperture 4a has a cylindrical shape with a diameter substantially the same as that of the negative lens 9 on the negative lens array 3 side and a diameter substantially the same as that of the positive lens 10 on the positive lens array 5 side. Each aperture 4a is provided so as to be bored through the light intercepting frame 4 between each pair of one negative lens 9 and one positive lens 10.

In other words, each compound lens 2 is composed of a pair of one negative lens 9 and one positive lens 10, and an aperture 4a of the light intercepting frame 4. Therefore, the compound lens array 1 is composed of a plurality of the compound lenses 2 provided in the planar array. With the compound lens 2, an image entering the negative lens 9 is enlarged by the positive lens 10 so as to be observed.

Though the compound lenses 2 are provided adjacent to one another in the planar array, the compound lenses 2 are not affected by incident lights to the neighboring ones because of the light intercepting frame 4 thus provided.

Thus, the compound lens array 1 has the following configuration: the negative lens array 3 has a plurality of the negative lenses 9 provided so that principal planes of the negative lenses 9 are provided on a same plane, the positive lens array 5 has a plurality of the positive lenses 10 provided so that principal planes of the positive lenses 10 are provided on a same plane, and the negative and positive lens arrays 3 and 5 are provided vis-a-vis each other so that each pair of a negative lens 9 and a positive lens 10 provided vis-a-vis each other constitutes each compound lens 2.

The negative lens array 3 and the positive lens array 5 are made of resin, and the resin is formed so as to have the above-described configuration. Resin, for example, methacrylic resin, is utilized, and it is molded into a predetermined form by the injection molding method, the transfer molding method, or the like.

In the case where the methacrylic resin is used to realize the lenses, acrylic resin is especially preferable among others. The acrylic resin has a high light transmittance, which is constant with respect to all the visible light regardless of wavelengths, and it is therefore superior to any other resin regarding transparency. The acrylic resin has a specific gravity of about half of that of glass, thereby enabling reduction of the weight of the negative lens array 3 and the positive lens array 5.

The light intercepting frame 4 is to be made of a resin colored by a black pigment such as carbon black as described above, and it is preferable that a resin utilized for realizing the light intercepting frame 4 can have a strong adhesion to the negative lens array 3 and the positive lens array 5. Furthermore, it is preferable that the resin used for realizing the light intercepting frame 4 is solid, not having elasticity. This is because in the case where pairs of the negative and positive lenses 9 and 10 respectively constitute the compound lenses 2, it is necessitated to keep constant the distance between the negative lenses 9 and the positive lenses 10.

It is preferable that utilized as such resin is the same material as that for the negative and positive lens arrays 3 and 5. For the present embodiment the acrylic resin is used. Therefore, utilizing as material a mixture of the acrylic resin and the carbon black which is compatible with the acrylic resin, the light intercepting frame 4 is formed by the injection molding method, or another method for molding the resin. Since the acrylic resin has substantially no elasticity thereby being solid, to maintain constant the distance between the negative lenses 9 and the positive lenses 10 is possible with the use of the acrylic resin.

Metal or wood may be utilized as material for the light intercepting frame 4 provided that it can keep constant the distance between the negative lenses 9 and the positive lenses 10. However, the use of metal causes the compound lens array 1 to become heavier compared with the case of the use of resin. In the case where wood is used, though it is lighter than metal, wood and resin are less compatible with each other when adhesion between them or processing together is attempted, compared with the case where resin is used as material for the lenses and the light intercepting frame 4 both.

As is clear from what has been described so far, it is preferable that the same material as that for the negative lens array 3 and the positive lens array 5, namely, the acrylic resin in this case, is used as material for the light intercepting frame 4, from the viewpoint for the compatibility with the negative lens array 3 and the positive lens array 5 when adhesion and processing is attempted. Note that resin adapted for realizing the light intercepting frame 4 is not restricted to the acrylic resin. Any resin may substitute for the acrylic resin provided that it does not have elasticity thereby being solid, and it has compatibility with the negative lens array 3 and the positive lens array 5 so as to be processed together. Other than the acrylic resin, utilized as material for the light intercepting frame 4 may be engineering plastics such as polyacetal or polyamide, polycarbonate resin, or epoxy resin.

As described above, the negative lenses 9 are divergent optical members while the positive lenses 10 are convergent optical members. In the present embodiment, for purposes of illustration, a single concave lens is used for each negative lens 9 while a single convex lens is used for the positive lens 10, as shown in FIGS. 1(a) and 1(b). However, each lens may have a multiple lens configuration. In other words, each divergent lens may be composed of a plurality of lenses, and likewise each convergent lens may be composed of a plurality of lenses. Further, instead of the concave lenses and the convex lenses, diffracting lenses such as grating lenses may be used as the negative and positive lenses 9 and 10.

Each of the two-dimensional lens arrays is produced by the resin molding method, but in order to produce the lens array, a cutting method may be applied for forming the lens configuration, or a lens having distributed refractive index may be produced by ion exchange applied to a surface of a substrate. Alternatively, the lens arrays may be produced by pasting lenses on a plane substrate. The compound lens array 1 may be produced by another method of housing each compound lens 2 into a lens-barrel and providing a plurality of such lens-barrels in a planar array.

The compound lens array 1 thus produced is, for use, placed between an image display element 6 and an eye 7 of the observer, and an image obtained by magnifying an image outputted by the image display element 6 is formed on the eye 7. Here, the compound lens array 1 is positioned so that a center position H1 of the negative lens array 3 and a center position H2 of the positive lens array 5 both fall on a line (optical axis 8) connecting from a center position X of the image display element 6 and a pupil position E of the eye 7.

In other words, respective lens planes of the negative lens array 3 and the positive lens array 5 of the compound lens array 1 are provided substantially parallel to an image forming plane of the image display element 6 on which an image is formed. Further, the image display element 6 and the compound lens array 1 are positioned so that an image formed by the image display element 6 reaches the pupil position E of the eye 7 through the compound lenses 2.

In this state, the observer observes the magnified image of the image formed by the image display element 6 through the compound lens array 1, by adjusting the following three distances So, Sd, and Se: (1) a distance So between the center position X of the image display element 6 and the center position H1 of the negative lens array 3; (2) a distance Sd (thickness of the compound lens array 1) between the center position H1 of the negative lens array 3 and the center position H2 of the positive lens array 5; and (3) a distance Se between the center position H2 of the positive lens array 5 and the pupil position E of the eye 7.

The following description will discuss object-image correlations of the compound lens 2 of the compound lens array 1, with reference to FIG. 3. Here, for purposes of illustration, the negative lens 9 is a single thin concave lens, while the positive lens 10 is a single thin convex lens. Note that the aperture 4a of the light intercepting frame 4 is omitted in the figure for convenience sake. Further, the compound lens 2 is disposed so that a principal point 14 of the negative lens 9 and a principal point 15 of the positive lens 10 both fall on the optical axis 8.

As described before, the compound lens 2 is a combination of the negative lens 9 and the positive lens 10, whereas it is a unit component for the compound lens array 1. The compound lens 2 is also an optical member with which alone an enlarged image of an object can be observed.

As shown in FIG. 3, with respect to a point (hereinafter referred to as an object point Po) over a position Xo which is a distance So (<0) away from a position H1 of the negative lens 9, a virtual image Pi is created by the compound lens 2 at a position Xi which is a distance Si (<0) away from a position H2 of the positive lens 10. The virtual image Pi is coincident with an image obtained when a virtual image (hereinafter referred to as an intermediate image Pii) created by the negative lens 9 with respect to the object point Po is observed, at a position Xe which is a distance Se (>0) away from the positive lens 10, through the positive lens 10 placed at the position H2 which is a distance Sd (>0) away from the position H1 of the negative lens 9.

Figure 4:
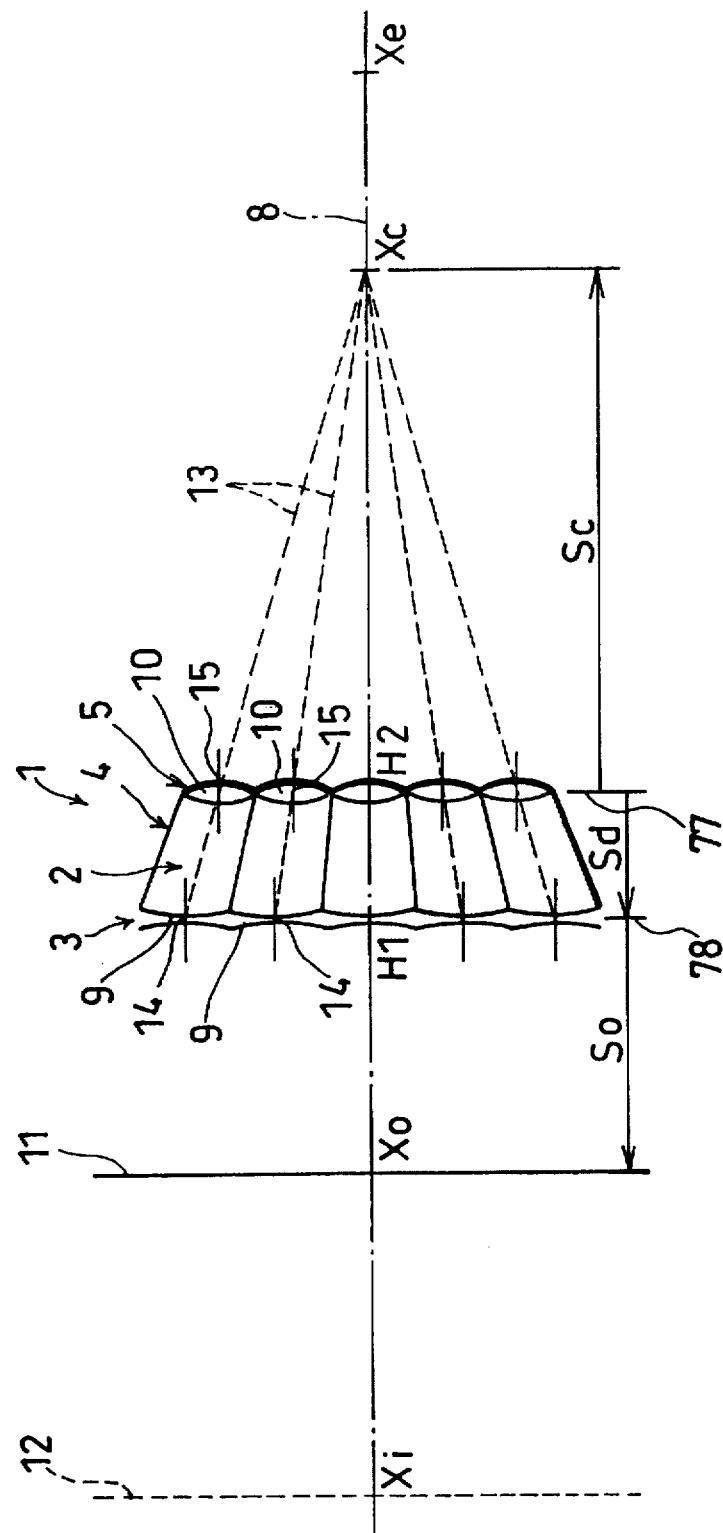
FIG. 4 is a view illustrating how the lenses are provided in the compound lens array shown in FIGS. 1(a) and 1(b).

The following description will discuss how the negative lenses 9 and the positive lenses 10 are provided in the negative lens array 3 and the positive lens array 5, respectively, with reference to FIG. 4.

The compound lenses 2, each composed of a pair of one negative lens 9 and one positive lens 10, are provided so that straight lines 13, each connecting the respective principal points 14 and 15 of the pairing negative and positive lenses 9 and 10, go through a point Xc on the optical axis 8 at a distance Sc from a principal plane 77 of the positive lens array 5. Here, an interval between the principal points 14 is greater than that between the principal points 15. This is because the diameter of the negative lens 9 is greater than that of the positive lens 10.

Visibility adjustment is carried out by moving the position Xi of an image surface 12 on the optical axis 8. Specifically, the visibility adjustment is carried out by changing the distances Sc and So, the distance Sc being from the principal plane 77 of the positive lens array 5 to the point Xc and the distance So being from a principal plane 78 of the negative lens array 3 to the position Xo of an object surface 11. The visibility adjustment is therefore conducted by moving the compound lens array 1 on the optical axis 8.

When the interval between the principal points 14 and the interval between the principal points 15 are respectively fixed, the distance Sc varies with the distance So. Therefore, the visibility adjustment can be conducted by moving the position Xo of the object surface 11 and the position H1 of the negative lens array 3.

In addition, since the negative lens array 3 and the positive lens array 5 are realized by forming a plurality of the negative lenses 9 and a plurality of the positive lenses 10 on plane substrates, respectively, the respective negative and positive lenses 9 and 10 on the plane substrates have fixed positions. This makes it easy to adjust the positions of the negative and positive lens arrays 3 and 5 so as to form the compound lens array 1.

Furthermore, since the lenses 9 and 10 are fixed on the plane substrates, the visibility adjustment can be achieved by changing the distance between the negative lens array 3 and the positive lens array 5. This makes it easy to adjust the visibility of the compound lens array 1.

Moreover, since the negative lens array 3 and the positive lens array 5 both have a flat board form, it is possible to keep the negative and positive lens arrays 3 and 5 parallel, by adjusting a shape of the light intercepting frame 4 sandwiched between the lens arrays 3 and 5.

Figure 5:
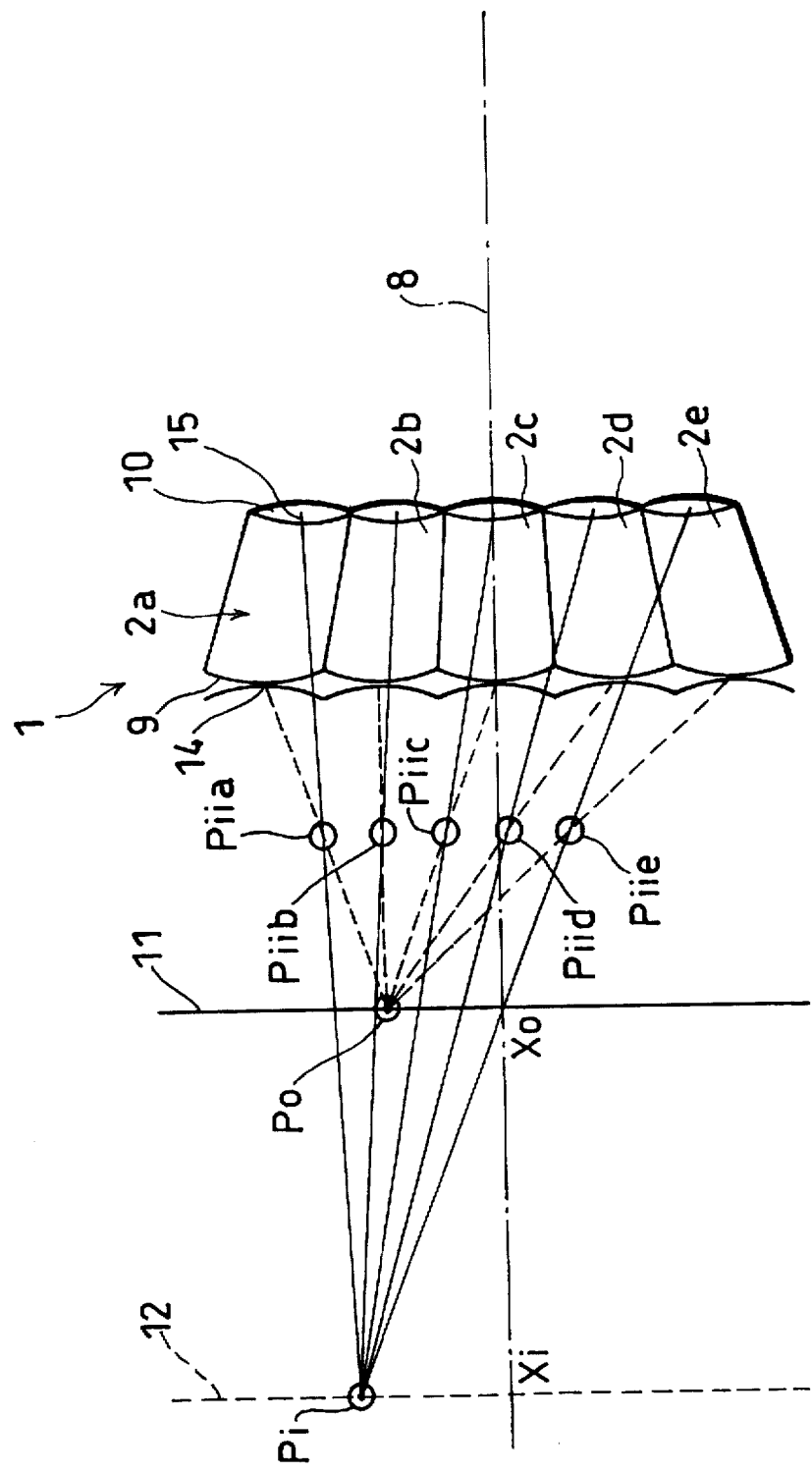
FIG. 5 is a view illustrating object-image correlations of the compound lens array shown in FIGS. 1(a) and 1(b).

The following description will discuss object-image correlations of the compound lens array 1, with reference to FIG. 5.

The number of the intermediate images Pii created by the respective compound lenses 2 with respect to the object point Po corresponds to the number of the compound lenses 2, as shown in FIG. 5. Note that, for example, a compound lens 2a creates an intermediate image having a corresponding subscript, that is, an intermediate image Piia. Respective images obtained when the respective intermediate images Pii are viewed through the positive lenses 10 of the corresponding compound lenses 2 coincide with an image Pi, according to the paraxis theory. Therefore, when light emitted from the object point Po enters the eye 7 through a plurality of the compound lenses 2, the light is converged on one point on the retina of the eye 7.

To be more specific, light emitted from one point on an observed object enters the eye 7 through a plurality of the compound lenses 2. When the compound lenses 2 are provided in a planar array so that the lines 13, each of which goes through the respective principal points 14 and 15 of the pairing negative and positive lenses 9 and 10, are converged at the point Xc which is the distance Sc away from the positive lens array 5, respective images produced by the compound lenses 2 appear as if they are converged into a single image, which is suggested by the paraxis theory. Therefore, when a luminous flux emitted from one point of the observed object enters the eye 7 through the plural compound lenses 2, the luminous flux is converged on one point of the retina. This makes it clear that the compound lens array 1 allows an object and an image to correspond at one-to-one ratio.

In addition, since the lens thickness is reduced by forming the lenses in an array, the lens weight and thickness can be reduced, in comparison with a single lens having the same focal distance. The following description will explain the reason. Generally a lens diameter $\Phi^2$, a focal distance $f_0$, a refractive index n, and a lens thickness $d_0$ satisfy the following equation (2):

$$d_o = \frac{\phi^2}{8(n-1)} \cdot \frac{1}{f_0} \qquad (2)$$

With the above equation (2), it is clear that the lens thickness $d_0$ increases in proportion to the lens diameter $\Phi^2$. Therefore, given the same focal distance $f_0$, the lens with a smaller lens diameter $\Phi^2$ has a smaller lens thickness $d_0$. Therefore, by arraying a plurality of lenses with a small lens diameter $\Phi^2$ so that the lens array has the same diameter $\Phi^2$ of that of the single lens, it is possible to reduce the lens weight and thickness while to allow the lens array to have the same focal distance, compared with the single lens.

Furthermore, distortions and curves in the image which are caused when the visual field is broadened can be eliminated, for example, by changing the focal distance of the compound lenses 2 (the composite focal distance of the negative and positive lenses 9 and 10) in the periphery of the lens array.

Thus, it is possible to correct the image by changing various characteristics of the individual compound lenses 2.

Here, when the intersection point of the lines 13 (see FIG. 4), each of which goes through the principal points 14 and 15 of each pairing negative and positive lenses 9 and 10 constituting each compound lens 2, does not coincide with the point Xc on the optical axis 8, the respective images of the compound lenses 2 are not converged, but diverged. However, even though the image is diverged, there is no problem if such divergence is not recognized with the naked eyes. This is because the naked eye 7 recognizes the respective images Pi of the compound lenses 2 as one image when the divergence of the images Pi falls outside the range of the resolution of the naked eye 7. Therefore, the intersection point of the lines 13 which go through the principal points 14 and 15 of the negative and positive lenses 9 and 10 need not strictly coincide with the point Xc, and the lines 13 need not intersect at one point. Furthermore, divergence of images cannot be recognized in some cases due to image qualities, even though the divergence is within the range of the resolution of the naked eye 7. For these reasons, as regards the array of the compound lenses 2, there is no practical problem even though the intersection point of the lines 13 and the point Xc do not strictly coincide.

Figure 6:
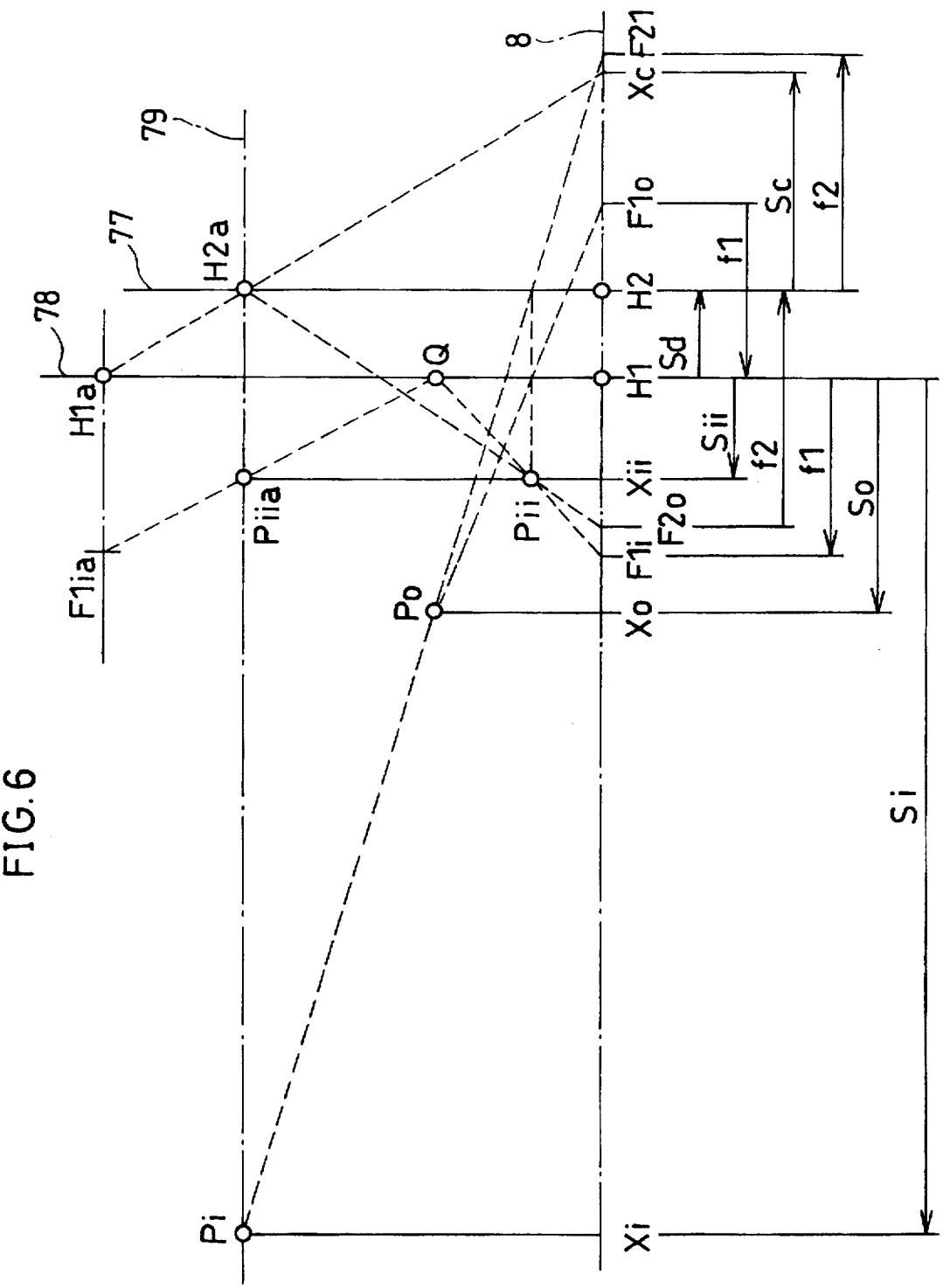
FIG. 6 is a view illustrating image formation correlations of the compound lens array shown in FIGS. 1(a) and 1(b).

The following description will discuss the image formation correlations in the compound lens array 1, with reference to FIG. 6.

Reference numerals and codes used in FIG. 6 are:

Po: object point (a point on an observed object),

Pi: image point (a virtual image of the object point produced by the compound lens array 1), H1: principal point of a first negative lens, H2: principal point of a first positive lens, H1a: principal point of a second negative lens, H2a: principal point of a second positive lens, Pii: first intermediate image (a virtual image of the object point produced by the first negative lens), Piia: second intermediate image (a virtual image of the object point produced by the second negative lens), F1i: focal point position of the first negative lens on the image side, F1o: focal point position of the first negative lens on the object side, F2o: focal point position of the first positive lens on the object side, F2i: focal point position of the first positive lens on the image side, F1ia: focal point position of the second negative lens on the image side, Xi: position of the image point on the optical axis 8, Xo: position of the object point on the optical axis 8, Xii: position of the intermediate image on the optical axis 8, Xc: intersection point of the optical axis 8 and a line connecting the principal point of the second negative lens and the principal point of the second positive lens, Q: point satisfying distance PoXo=distance QH1, So (<0): object distance (XoH1), Si (<0): image distance (XiH2), Sii (<0): intermediate image distance (XiiH1), f1 (<0): focal distance of the first and second negative lenses (F1iH1, H1F1o), f2 (>0): focal distance of the first and second positive lenses (H2F2o, F2iH2), Sd (>0): distance between a principal plane of the negative lens and a principal plane of the positive lens (H2H1), and Sc (>0): distance XcH2.

The above numerals and codes are described in FIG. 6, while distances in a direction orthogonal to the optical axis 8 are only defined in the following description so that the figure may be simplified.

Yi: height of the image point (PiXi),

Yo: height of the object point (PoXo),

Yii: height of the first intermediate image (PiiXii)

Yiia: height of the second intermediate image (PiiaXii),

Yh1: interval between the first negative lens and the second negative lens in the negative lens array (hereinafter referred to as negative lens interval) (H1aH1), and Yh2: interval between the first positive lens and the second positive lens in the positive lens array (hereinafter referred to as positive lens interval) (H2aH2).

In FIG. 6, a plane orthogonal to the optical axis 8 and containing the points H1 and H1a is a principal plane 78 which is shared by the negative lenses, while a plane orthogonal to the optical axis 8 and containing the points H2 and H2a is a principal plane 77 which is share by the positive lenses.

Furthermore, for convenience sake, the respective principal points H1 and H2 of the first negative and positive lenses are both provided on the optical axis 8. The combination of the first negative lens and the first positive lens is called a first compound lens. The second negative and positive lenses are provided apart from the optical axis 8. In particular, the positive lens interval and the height of the second intermediate image are set so as to coincide (Yh2=Yiia). Namely, the object point Piia of the second positive lens is set so as to fall on an optical axis 79 of the second positive lens.

Therefore, the image point Pi of the second positive lens also appears on the optical axis 79 of the second positive lens, thereby causing Pi, Piia, and H2a to appear in a straight line. This arrangement makes it easier to derive a relational expression indicating image formation correlations.

Here, general relational expressions on the negative and positive lenses are shown below.

First, since the object point and the image point in the case of the negative lens are the points represented as Po, and Pii or Piia, respectively, an equation (3) below is obtained on the negative lens:

$$\frac{1}{Sii} = \frac{1}{f1} + \frac{1}{So} \quad (3)$$

Next, since the object point of the positive lens is either the point Pii or the point Piia, and the image point of the positive lens is the point Pi which is common, an equation (4) below is obtained on the positive lens:

$$\frac{1}{Si} = \frac{1}{f2} + \frac{1}{Sii} \quad (4)$$

Based on the above general relational equations on the lenses, the following description will discuss how to derive a relational expression on the image formation correlations on the compound lens array 1.

First of all, regarding the second positive lens, light emitted from the object point Po acts on the image side (right to the principal plane 77 of the positive lens) of the second positive lens as though the light is emitted from the point Pi. Here, a line connecting the point Pi and the principal point H2a of the second positive lens is parallel to the optical axis 79 of the second positive lens. Therefore, the light emitted from the object point Po becomes parallel to the optical axis 79 after passing through the principal point H2a.

Next, regarding the first positive lens, the object point of the same corresponds to the point Pii. According to the rules on the image formation of a positive lens in accordance with the paraxis theory, light emitted from the lens's focal point position on the object side goes in parallel with the optical axis 8 in the image side area, due to the refraction of the lens. A focal point position of the first positive lens on the object side is a point denoted as Fli. According to the above-mentioned rule, light proceeding along a line connecting Fli and the object point Pii of the first positive lens also becomes parallel to the optical axis 8 on the right side of the principal plane 77 of the first positive lens.

From what have been so far described, in the case where the point H2a falls on a product of the line connecting the point Fli and the point Pii, light emitted from the point Po becomes parallel to the optical axis 8 after passing through the point H2a. In other words, any light passing through the point H2a becomes the same, whether it passes through the first positive lens or the second positive lens. This means that the first and second positive lenses have the common image point Pi with respect to the object point Pii of the first positive lens and the object point Piia of the second positive lens, respectively. In short, an image (Pi) is viewed at the same position, whether through the first positive lens or the second positive lens.

Thus, it is found that a requisite concerning the positive lenses is that a product of the line connecting the points Fli and Pii should pass through the point H2a.

With the above described requisite, a relational expression can be derived from proportional relations concerning a triangle formed by the points F2o, H2a, and H2 in the figure. The following equation (5) is obtained:

$$\frac{Yiia}{F2oH2} = \frac{Yii}{F2oXii} \quad (5)$$

Then, focusing on the negative lenses, according to the rules on the image formation by a negative lens in accordance with the paraxis theory, a height of the point Q from the optical axis 8 is the same as the height of the object Po, the point Q being an intersection point where the first negative lens and the line connecting the focal point position of the first negative lens and the image point of the first negative lens intersect. Likewise, a height of the point Q from the optical axis 79 is the same as the height of the object Po. Therefore, the following relational expressions (6) and (7) can be derived from proportional relations between a triangle formed by the points Fli, Q, and H1 as the peaks, and a triangle formed by the points Flia, Q, and H1a as the peaks:

$$\frac{Yii}{F1iXii} = \frac{Yo}{F1iH1} \quad (6)$$

$$\frac{(Yh1 - Yiia)}{Fh1Xii} = \frac{(Yh1 - Yo)}{Fh1H1} \quad (7)$$

From the above equations (5), (6), and (7), the following equation (8) is obtained:

$$Sii = \frac{f1 \cdot Yiia \cdot Sd}{(f2 \cdot Yh1 + f1 \cdot Yo)} \quad (8)$$

Furthermore, from the equation (3), the following equation (9) is obtained:

$$So = \frac{f1 \cdot Yo \cdot Sd}{(f2 \cdot Yh2 + f1 \cdot Yo - Yo \cdot Sd)} \quad (9)$$

Next, a triangle formed by the points H1, H1a, and Xc as the peaks is taken into consideration so as to obtain the point Xc on the optical axis 8, and the following equation (10) is derived from proportional relations concerning the above triangle and the above equations (8) and (9):

$$Sc = \frac{So \cdot Sd \cdot f2}{(So + f1)Sd - (f1 + f2)So} \quad (10)$$

The above equation (10) is the conditional expression for determine disposition of the lenses.

Here, the distance Si from the principal point H1 of the first negative lens to the virtual image Pi (the point Xi on the optical axis 8) is found using the following equation (11):

$$Si = \frac{(So - Sd)f1 \cdot f2 - So \cdot Sd \cdot f2}{(So + f1)(f1 - Sd) + So \cdot f1} \quad (11)$$

When Si=−∞, the following equation (12) is derived from the above equation (11), and the position of the object point on the optical axis 8 is determined using $$So = \frac{f1(Sd - f2)}{f1 + f2 - Sd} \quad (12)$$

Generally, in the case where an interval between lenses in the two-dimensional lens array closest to the eye is greater than the diameter of the pupil of the eye, an observed image is sometimes partly shadowed due to a light intercepting frame or parts other than the lenses.

Such invisible parts are created in the following case. A luminous flux emitted from a point of an object enters several neighboring compound lenses 2, and then, emitted to the observer are respective luminous fluxes from the compound lenses 2 which are substantially parallel each other. In this case, parts other than the lenses of the lens array 3 or the light intercepting frame cast shadow, thereby causing the shadow and the luminous flux to reach the observer. When the shadow covers the pupil of the eye, the point of the object is unseen. Therefore, as a whole, it appears as if a part of the picture is masked.

Such a phenomenon can be prevented, if the pupil of the observer is larger than the shadow, whereby at least one of luminous fluxes from the compound lenses enters the pupil. Here, an interval between the luminous fluxes emitted from the adjacent compound lenses is, at most, not more than the interval between the lenses of the two-dimensional lens array closest to the observer. Therefore, when the lens interval is reduced to not more than half of the pupil of the observer, not less than one luminous flux is allowed to enter the pupil. Thus, the problem that the picture is partly invisible can be solved.

Figure 7:
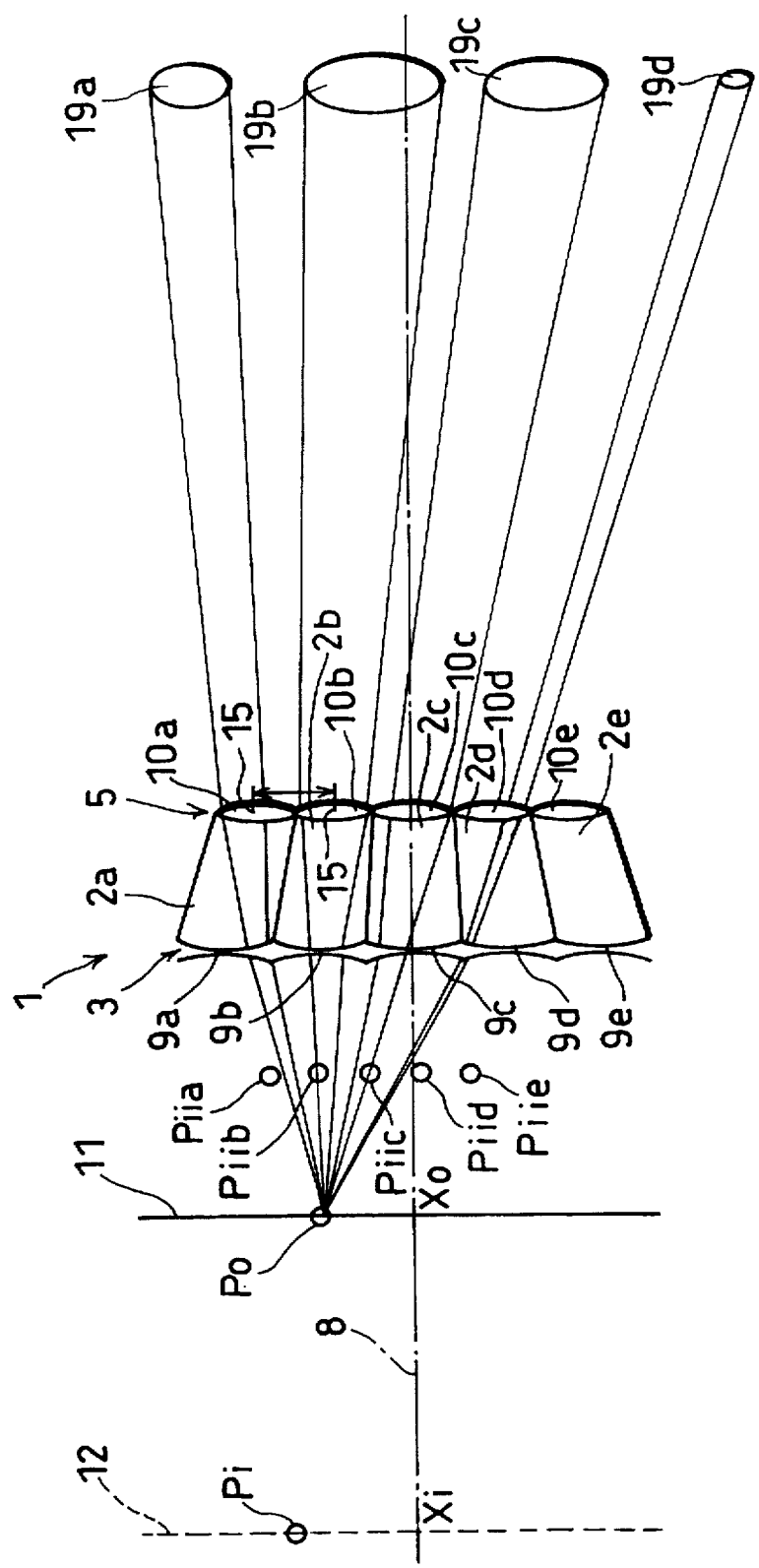
FIG. 7 is a view illustrating luminous fluxes from an object point on an object plane of the compound lens array shown in FIGS. 1(a) and 1(b) to an image side of the same.

The following description will discuss the luminous fluxes from the object point through the compound lens array 1 to the image side (observer side), with reference to FIG. 7. Note that a convergence point of the luminous fluxes on the image side is at the position of the image Pi. Respective luminous fluxes passing through the compound lenses 2a, 2b, ... are denoted as 19a, 19b, ..., so that the luminous fluxes 19 respectively have the same subscripts of those of the corresponding compound lenses 2. Note that the reason why there is no luminous flux passing through the compound lens 2e is that an intermediate image Piie cannot be seen through a positive lens 10e of a compound lens 2e, being blocked by the light intercepting frame 4.

Thus, the luminous fluxes 19 from the object point Po become dispersed, being blocked by the light intercepting frame 4 and parts other than the lenses in the two-dimensional lens array, as shown in FIG. 7. When the pupil of the eye 7 falls on not a luminous flux but a gap between the luminous fluxes, the object point Po is unseen. In this case, when it is attempted to see the object surface 11 in whole, it appears as if there are defects, or shadows, all over the image. This problem can be solved by decreasing intervals between luminous fluxes from neighboring compound lenses 2 so that at least either of the luminous fluxes enters the pupil. Therefore, so as to prevent the image from being seen as if there are defects or shadows, the interval between the principal points of the positive lenses 10 is set to not more than half of the diameter of the pupil. Note that each interval between the luminous fluxes should be set at most two times as great as the interval between the principal points 15 of the positive lenses 10.

In the described arrangement, the compound lenses 2 constituting the compound lens array 1 are optical members wherein an image (virtual image) produced by the negative lenses 9 is magnified by the positive lenses 10 so as to allow the enlarged image (virtual image) to be viewed. In other words, light from an observed object enters the negative lenses 9 of the compound lenses 2, goes out of the positive lenses 10, and reaches the eye 7. With this compound lens array 1, a distance between the object and the lenses becomes shorter whereas a distance between the lenses and the eye remains the same, compared with a conventional single magnifying lens with the same magnifying power.

Figure 8:
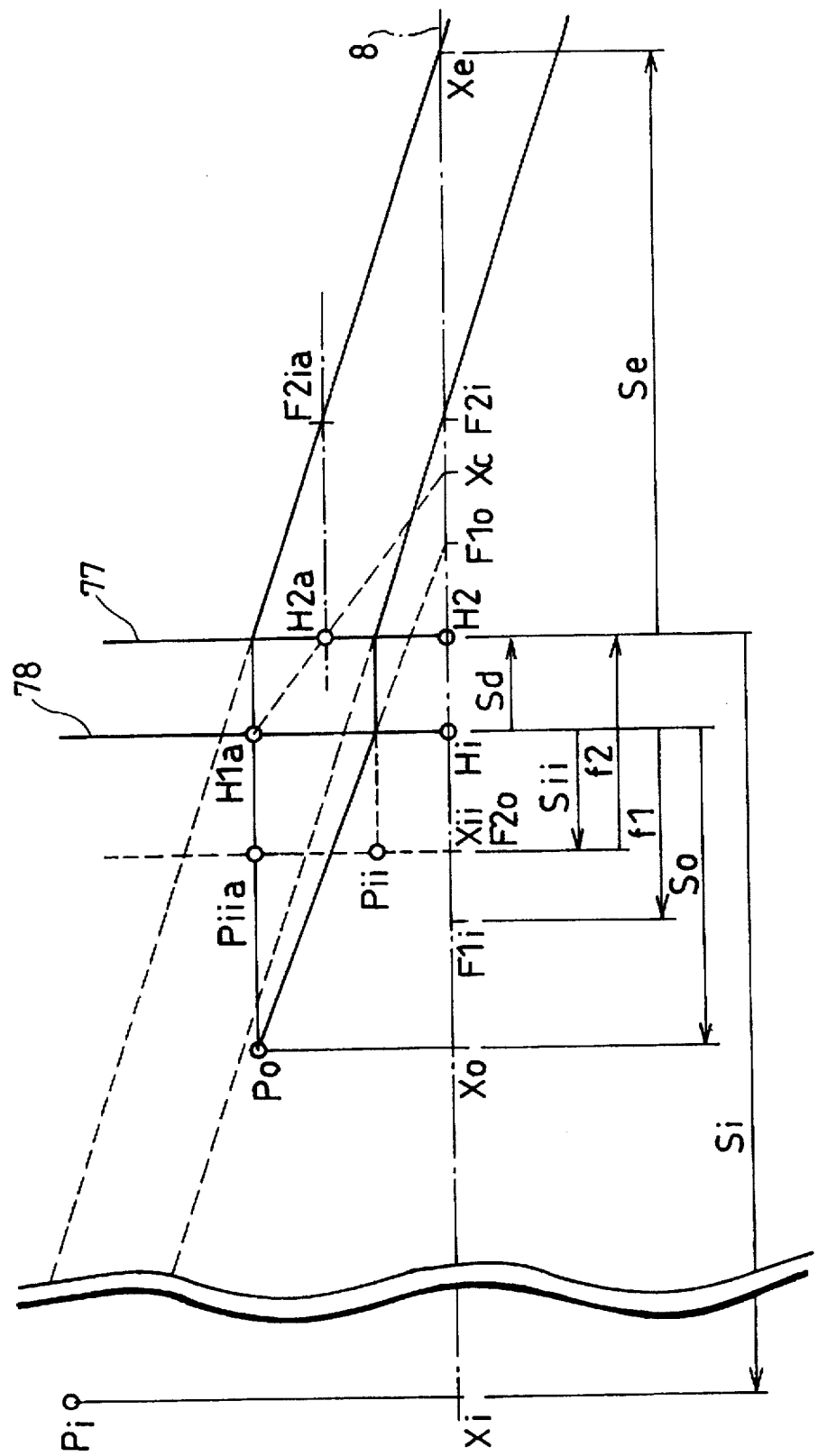
FIG. 8 is a view illustrating a definition of the magnification of the compound lens array shown in FIGS. 1(a) and 1(b).

The following description will discuss the distance between the lens and the eye, and also will explain the reason why with the compound lens 2 the distance between the lens and the eye remains the same whereas the distance between the object and the lens becomes shorter, with reference to FIG. 8.

First of all, a magnifying power of a usual single lens is defined as a magnifying power when an image Pi is at infinity and the eye is at a focal point position on the image side. An equation expressing the magnifying power is given as:

$$m = \frac{\tan(t)}{\tan(u)} \quad (13)$$

wherein m represents the magnifying power of the lens, t represents an angle to the optical axis at which the light emitted from a point P on an observed object proceeds in the image side area, and u represents an angle formed by the optical axis and a line connecting the point P and the eye when the eye watches the point P without any lens at a distance of distinct vision of 250 mm.

With the distance of distinct vision of 250 mm and using the equation (13), the magnifying power m of a positive lens with a focal distance of f is given as:

$$m = \frac{250}{f} \quad (14)$$

Since the eye is placed at the focal point position on the image side of the lens, the distance between the eye and the lens is f. The distance between the object and the lens is also f, since an image produced by the lens is set to be at infinity according to the definition of the magnifying power. Note that the light from the object proceeds parallel to the optical axis until the light enters the lens.

The following description will discuss a definition of a magnifying power of the compound lens array 1 in accordance with the present embodiment with reference to FIG. 8. In this case, the image Pi is assumed to be at infinity. Namely, Si=31 ∞. This is because the image Pi is positioned on the opposite side to the observer with respect to the principal plane 77 of the positive lens 10. In this case, an angle t at which the light proceeds in an area on the image side of the positive lens 10 (right side of the principal plane 77 of the positive lens 10) is obtained using the following equation (15):

$$\tan = \frac{Yo}{Se} \quad (15)$$

In this case, the eye is placed at a point where light from the object point Po which is parallel to the optical axis 8 crosses the optical axis 8 in the image side area, as is the case with the conventional lens. The position of the eye in this case is represented as Xe in the figure. A distance from the principal plane 77 of the positive lens 10 to the point Xe is represented as Se. The distance Se is equivalent to the focal distance f of the single lens. The single lens has the same distance between the object and the lens as the distance f, whereas a distance between the object and the compound lens array 1 is a distance between a point H2 and a point Xo, namely, (Sd−So). The point H2 is a point where the principal plane 77 and the optical axis 8 cross, that is, the starting point of the distance Se, while the point Xo is a point where the optical axis 8 and a line from the object point Po which is orthogonal to the optical axis 8 cross.

Therefore, that the distance between the object and the compound lens array 1 is shorter than the distance between the object and the single lens can be proved by showing that the distance Sd−So is shorter than the distance Se. The following description will explain that the distance Sd−So is shorter than the distance Se regarding the compound lens array 1.

From proportional relations shown in FIG. 8, the distance Se is given as:

$$Se = \frac{f2(f1 + So)}{f1} \quad (16)$$

On the other hand, when Si is set to infinity, namely, Si=−∞, So is expressed by an equation (17) below which is derived from the equation (12):

$$So = \frac{f1(Sd - f2)}{f1 + f2 - Sd} \quad (17)$$

With the above equation (17), Sd is given as:

$$Sd = \frac{(f1 + f2)So + f1 \cdot f2}{So + f1} \quad (18)$$

Using the above equations (16), (17), and (18), Se−(Sd−So)>0 can be proved by an equation (19) below:

$$Se - (Sd - So) = \frac{f1(f1 + f0)}{f1} - \frac{(f1 + f2)So + f1 \cdot f2}{So + f1} + So \quad (19)$$

$$= \frac{f2 \cdot So^2 + So \cdot f1 \cdot f2 + So^2}{f1^2 + So \cdot f1}$$

Since f2>0, f1<0, and So<0, the following are derived: f2·So²>0, So·f1·f2>0, So²>0, f1²>0, and So·f1>0. Therefore, Se−(Sd−So)>0.

With what is described above, it is found that in the compound lens array 1, the distance between the lens and the object can be shortened, while the distance between the lens and the eye remains the same, compared with the conventional single lens with the same magnifying power.

It is preferable that there should be a distance between the lens and the eye to some extent, so as to ensure comfortableness for the observer. For example, a wide distance between the lens and the eye is required when the observer wears glasses. On the other hand, a smaller distance between the object and the lens is preferable in view of miniaturization. Therefore, the compound lens array 1 of the present embodiment has advantages that a distance is ensured between the lens and the eye while the distance between the object and the lens can be shortened in comparison with the case of the conventional lens. In other words, the compound lens array 1 has advantages of being a compact optical system and ensuring comfortableness for the observer.

Furthermore, the compound lens array 1 of the present embodiment has a shorter distance between the image display element 6 and the lens in comparison with the conventional single lens with the same magnifying power. Therefore, in the case where the compound lens array 1 is installed in a display apparatus of a hand-held or headgear-mounted type for personal use which the observer wears on somewhere of the body such as the head so as to watch TV or movies, the position of the image display element 6 can be positioned closer to the eye of the observer. In addition, the center of gravity is also made closer to the head. As a result, fatigue caused when the apparatus is put on the head can be reduced. Since burden on fixing means for fixing the apparatus on the head is also reduced, simplification of the fixing means can be achieved.

Note that though thin lenses are used as the negative lenses 9 and the positive lenses 10 in the present embodiment, others may be utilized. It is also within the contemplation of the invention that thick lenses are used as the negative lenses 9 and the positive lenses 10. In such a case, as shown in FIG. 9, it is also required that each lens has respective principal points on the image and object sides, and that each interval of the lenses on the principal planes (each distance between the principal points) is made clear.

Figure 9:
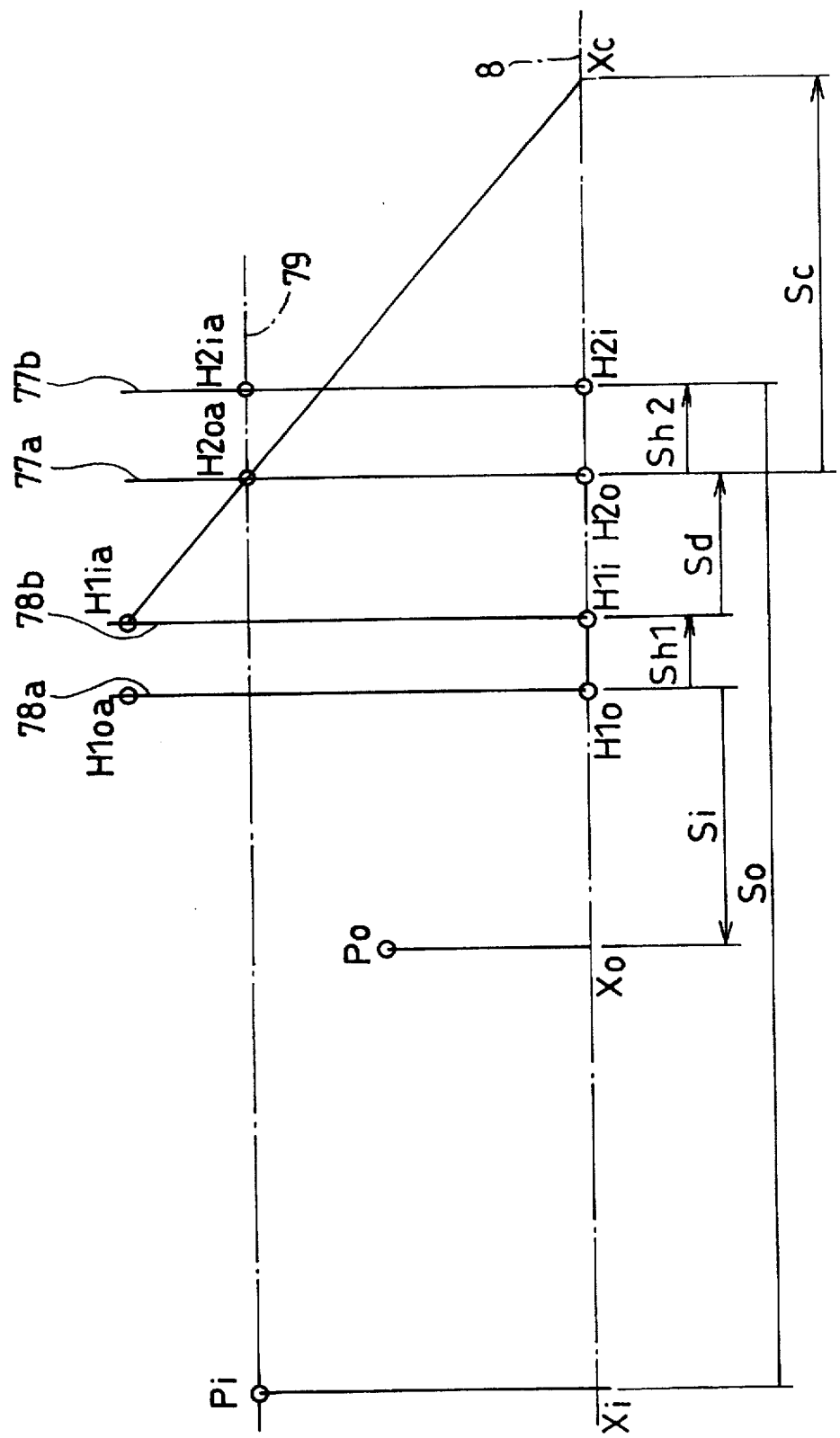
FIG. 9 is a view illustrating image formation correlations of a compound lens array in the case where thick lenses are used as both positive and negative lenses constituting the compound lenses.

The following description will explain the reference numerals used in FIG. 9.

H1o: principal point of first negative lens on the object side;

H1i: principal point of first negative lens on the image side;

H1oa: principal point of second negative lens on the object side;

H1ia: principal point of second negative lens on the image side;

H2o: principal point of first positive lens on the object side;

H2i: principal point of first positive lens on the image side;

H2oa: principal point of second positive lens on the object side;

H2ia: principal point of second positive lens on the image side;

Sh1(>0): interval of negative lenses on the principal plane (interval of principal points of first negative lenses);

Sh2(>0): interval of positive lenses on the principal plane (interval of principal points of first positive lenses).

Other reference numerals and marks represent the same things as those used in FIG. 6 represent.

In FIG. 9, a plane which has the points H1o and H1oa and which is orthogonal to the optical axis 8 is a principal plane 78a which the negative lenses share on the object side, while a plane which has the points H1i and H1ia and which is orthogonal to the optical axis 8 is a principal plane 78b which the negative lenses share on the image side. A plane which has the points H2i and H2ia and which is orthogonal to the optical axis 8 is a principal plane 77a which the positive lenses share on the object side, while a plane which has the points H2o and H2oa and which is orthogonal to the optical axis 8 is a principal plane 77b which the positive lenses share on the image side.

For convenience sake, the respective principal points H1o, Hoi, H2o, and H2i of the first negative and positive lenses are provided on the optical axis 8. The first negative and positive lenses constitute a first compound lens. The second negative and positive lenses are provided apart from the optical axis 8. The principal points of the second negative and positive lenses are provided on an optical axis 79 so that each interval Yh2 of the positive lenses and a height Yiia of an intermediate image from the optical axis 8 are coincident (Yh2=Yiia). This means that an intermediate image (not shown) as the object point of the second positive lens is set on the optical axis 79.

Therefore, an image point Pi of the second positive lens appears on the optical axis 79 of the second positive lens, the points Pi, Piia, and H2oa appear on a line as a result. This makes it easy to derive a relational expression on the image forming relations. As a result, the same relational expression as that derived from FIG. 6 can be obtained in the case of the thick lenses. [Second Embodiment]

The following description will discuss another embodiment of the present invention. The members having the same structure (function) as those in the above-mentioned embodiment will be designated by the same reference numerals and their description will be omitted.

Figure 10:
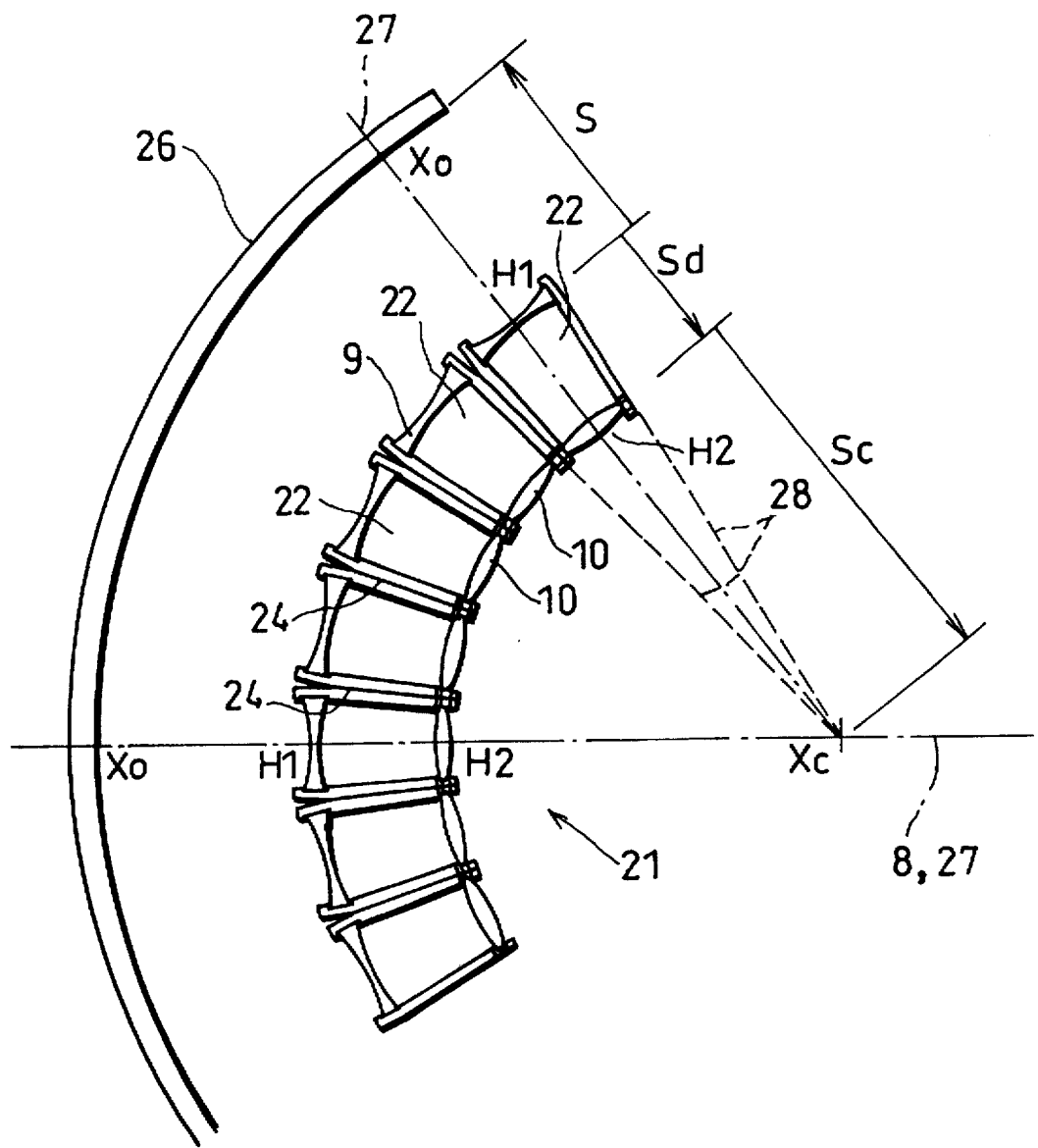
FIG. 10 is a cross-sectional view of a compound lens array in accordance with another embodiment of the present invention.

As shown in FIG. 10, a compound lens array 21 in accordance with the present embodiment has compound lenses 22. Each compound lens 22 is composed of a negative lens 9 and a positive lens 10 which share a lens central axis 27. The compound lens 22 has a function shown in FIG. 3 and every compound lens 22 is in rotation symmetry with respect to the lens central axis 27, as described in conjunction with the first embodiment.

The compound lenses 22 are provided on a spherical surface having a point Xc as the center, the point Xc being on an optical axis 8 and a distance of Sc away from the positive lens 10 on the axis. Each compound lens 22 is positioned so that a principal point H2 of the positive lens 10 of the same is positioned on a spherical surface with a radius of Sc and the point Xc as a center and a principal point H1 of the negative lens of the same is positioned on a spherical surface with a radius of (Sc+Sd) and the point Xc as a center. As a result, the compound lenses 22 provided on a spherical surface constitute the compound lens array 21. Therefore, any lens central axis 27 of the compound lens 22 can constitute the optical axis 8 of the compound lens array 21. Here, for purposes of illustration, a lens central axis 27 of a compound lens 22 located in the center of the compound lens array 21 is given as the optical axis 8.

Figure 11:
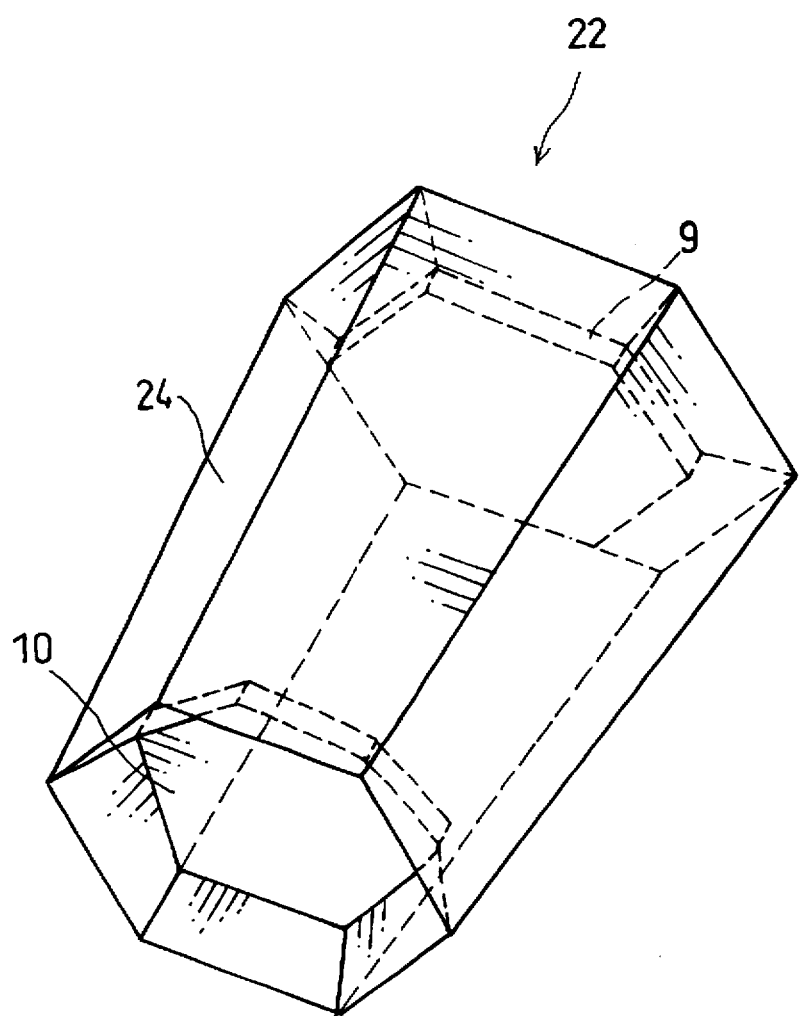
FIG. 11 is a perspective view illustrating one example of a lens-barrel for housing each compound lens provided in the compound lens array shown in FIG. 10.
Figure 12:
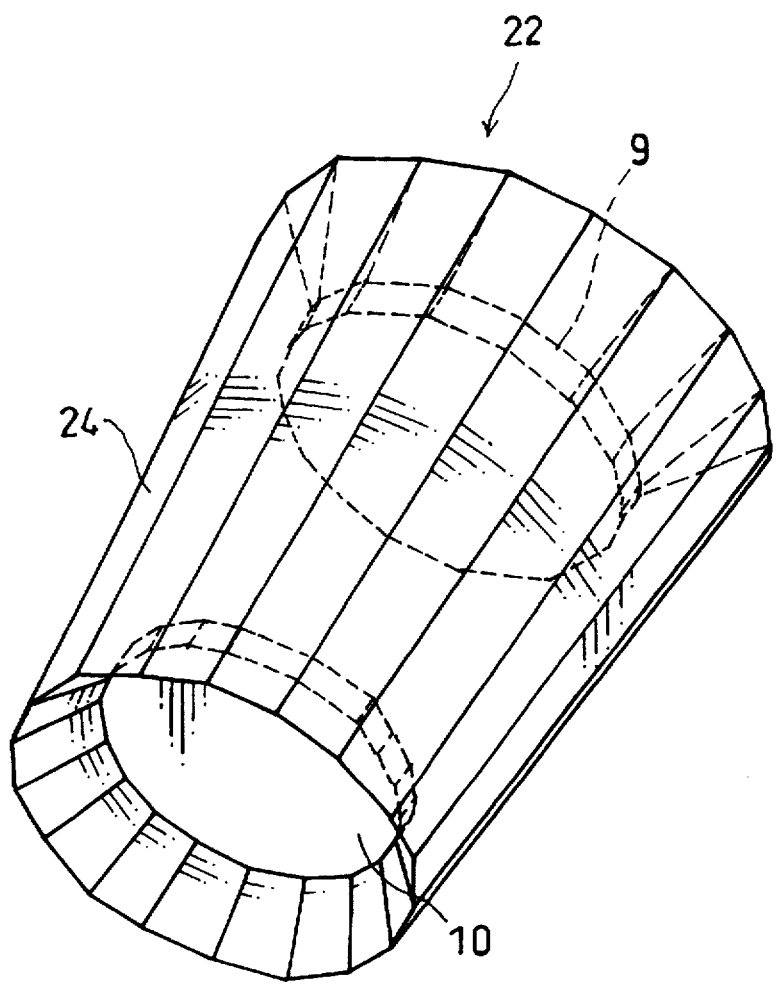
FIG. 12 is a perspective view illustrating another example of a lens-barrel for housing each compound lens provided in the compound lens array shown in FIG. 10.

FIG. 10 illustrates a fashion of arraying the compound lenses 22, whereby each compound lens 22 is housed in a cylinder 24 which has a light intercepting function. To describe this more concretely, each light intercepting cylinder 24 is shaped so that products 28 of generatrices or ridge lines of circumferential surfaces of the light intercepting cylinders 24 intersect at a point Xc when the light intercepting cylinders 24 are provided side by side so that generatrices or ridge lines of the circumferential surfaces of the neighboring cylinders 24 fall on each other. In such a case, the compound lenses 22 are as a result provided on a spherical surface with the point Xc as a center. In other words, each light intercepting cylinder is formed so that the aperture on the negative lens 9 side is greater than the aperture on the positive lens 10 side, so that the compound lenses 22 are provided on the spherical surface with the point Xc as the center when the compound lenses 22 are provided so that the generatrices or ridge lines of the light intercepting cylinders 24 coincide with those of the neighboring ones. Here, it is preferable that each light intercepting cylinder 24 has a hexahedral cylindrical shape as shown in FIG. 11, or a polyhedral cylindrical shape as shown in FIG. 12.

As described above, each light intercepting cylinder 24 as a lens-barrel for housing each compound lens 22 has a shape such that the products 28 of the generatrices or the ridge lines of the cylinders intersect at the point Xc on the optical axis 8 of the compound lens array 21, and the light intercepting cylinders 24 are provided with their sides adhered one another, as shown in FIG. 10. As a result, the negative lenses 9 and the positive lenses 10 which are housed in the light intercepting cylinders 24 are provided on respective spherical surfaces which both have the point Xc on the optical axis 8 as their coincident center. Thus, by disposing the light intercepting cylinders 24 in the above-described form, the compound lens array 21 provided on a spherical surface can be easily obtained.

Further, since each compound lens 22 is formed so that the negative lens 9 and the positive lens 10 have a coincident lens central axis 27, it can be formed in rotation symmetry with respect to the lens central axis 27. Therefore, production is easy even when single lenses substitute for the compound lenses, since the single lenses are likewise formed in rotation symmetry.

Figure 13:
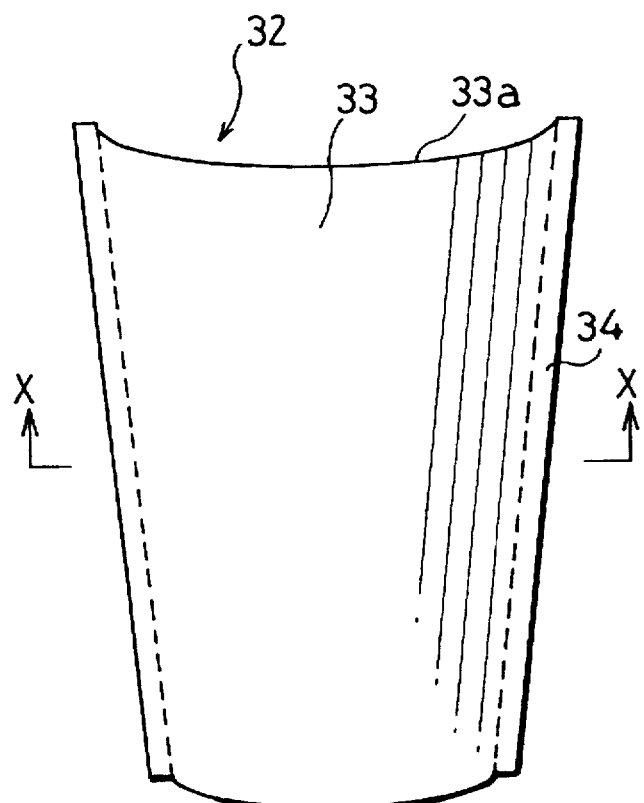
FIGS. 13 (a) and 13(b) are views illustrating a compound lens composed of a single-piece lens, FIG. 13 (a) being a side view while FIG. 13(b) being a cross sectional view of the compound lens shown in the FIG. 13(a) along the X—X arrow line.
Figure 13:
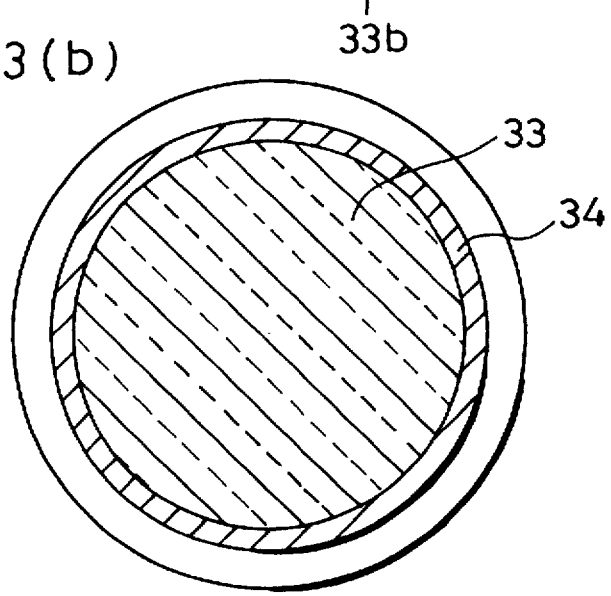

Compound lenses 32 each of which is composed of a single-piece lens 33 shown in FIGS. 13(a) and 13(b) may substitute for the above compound lenses 22 so as to constitute the compound lens array 21. Each single-piece lens 33 has a concave surface 33a on one side, while a convex surface 33b on the other side. The concave surface 33a has the same function as that of the negative lens, while the convex surface 33b has the same function as that of the positive lens. On a circumferential surface of each lens 33, a cylindrical light intercepting member 34 is provided. Note that FIG. 13(b) is a cross-sectional view of the lens 33 shown in FIG. 13(a), which is obtained by cutting the lens 33 along an X—X arrow line.

By using the single-piece lenses 33 constituting the compound lenses 32, the number of lenses decreases, thereby causing costs to decrease. In this case also, as is the case with the compound lenses 22, when each light intercepting member 34 is formed so that generatrices or ridge lines of s circumferential surface of the same intersect at the point Xc on the optical axis 8 of the compound lens array 21 and the lenses 33 are disposed with the sides of the light intercepting members 34 adhered one another, the lenses 33 are provided on a spherical surface with the point Xc on the optical axis 8 as the center. Thus, by providing the light intercepting members 34 (the lenses 33) having the above-mentioned shape, the compound lens array can be easily obtained.

When the single-piece lenses 33 are used so as to constitute the compound lenses 32, the light intercepting member 34 can be omitted and instead, for example, black pigment may be applied over the circumferential surfaces of the lenses 33 so as to have a function as a light intercepting member. This arrangement allows the light intercepting member 34 for housing the lenses 33 to be omitted, thereby simplifying the compound lens array configuration. As a result, decrease in costs is achieved.

Figure 14:
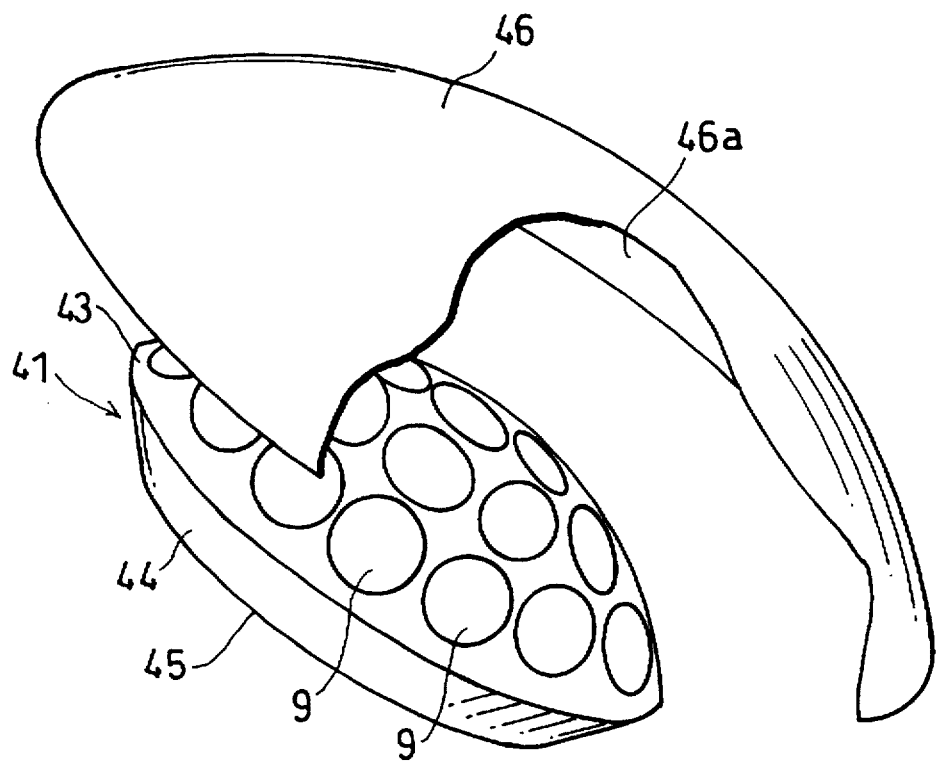
FIG. 14 is a schematic view illustrating an arrangement of another example of the compound lens array shown in FIG. 10.

The compound lens array 21 having the compound lenses 22 provided on a spherical surface may be composed of a two-dimensional negative lens array and a two-dimensional positive lens array formed on respective spherical-curving substrates and a light intercepting frame sandwiched therebetween. For example, a compound lens array 41 shown in FIG. 14 may be thought of as such compound lens array, which has a two-dimensional positive lens array 45 and a two-dimensional negative lens array 43 which are provided on respective spherical surfaces, and has a light intercepting frame 44 provided therebetween.

Figure 15:
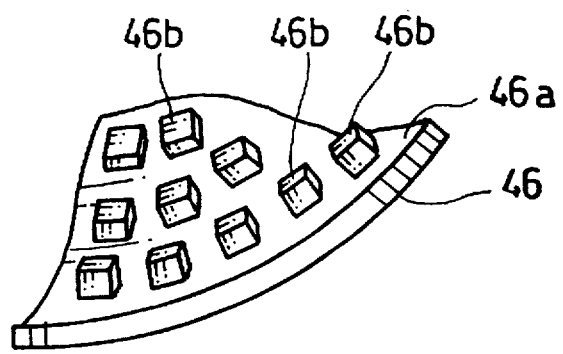
FIG. 15 is an enlarged view illustrating a principal part on a screen side of an image display element suitable for the compound lens array shown in FIG. 14.

Since an object plane of the compound lens array 41 is curved in a spherical form, it is preferable that an image display element 46 to be observed is curved in a spherical form in accordance with the form of the object surface of the compound lens array 41, that is, the form of the two-dimensional negative lens arrays 43. The image display element 46 curving in a spherical form is composed of a multiple-layered matrix-form distributing substrate 46a curved in a spherical form and LED chips 46b provided thereon, as shown in FIG. 15.

Instead of the method providing LED chips 46b on a spherical substrate, other methods for realizing the image display element 46 in a spherical form may be applied, such as a method whereby EL elements or fluorescent display elements are provided on a spherical surface. Alternatively, a liquid display device or a braun tube curving in a spherical form may be used. There is another arrangement wherein a lens is provided in front of a flat image display element so as to curve an image plane into a spherical form. There is still another arrangement wherein the composite focal distances of the compound lenses 2 become longer from the center to the periphery of the compound lens array 41 so that the object plane of the compound lens array 41 is flatten so that a flat image display element 6 can be observed.

Figure 16:
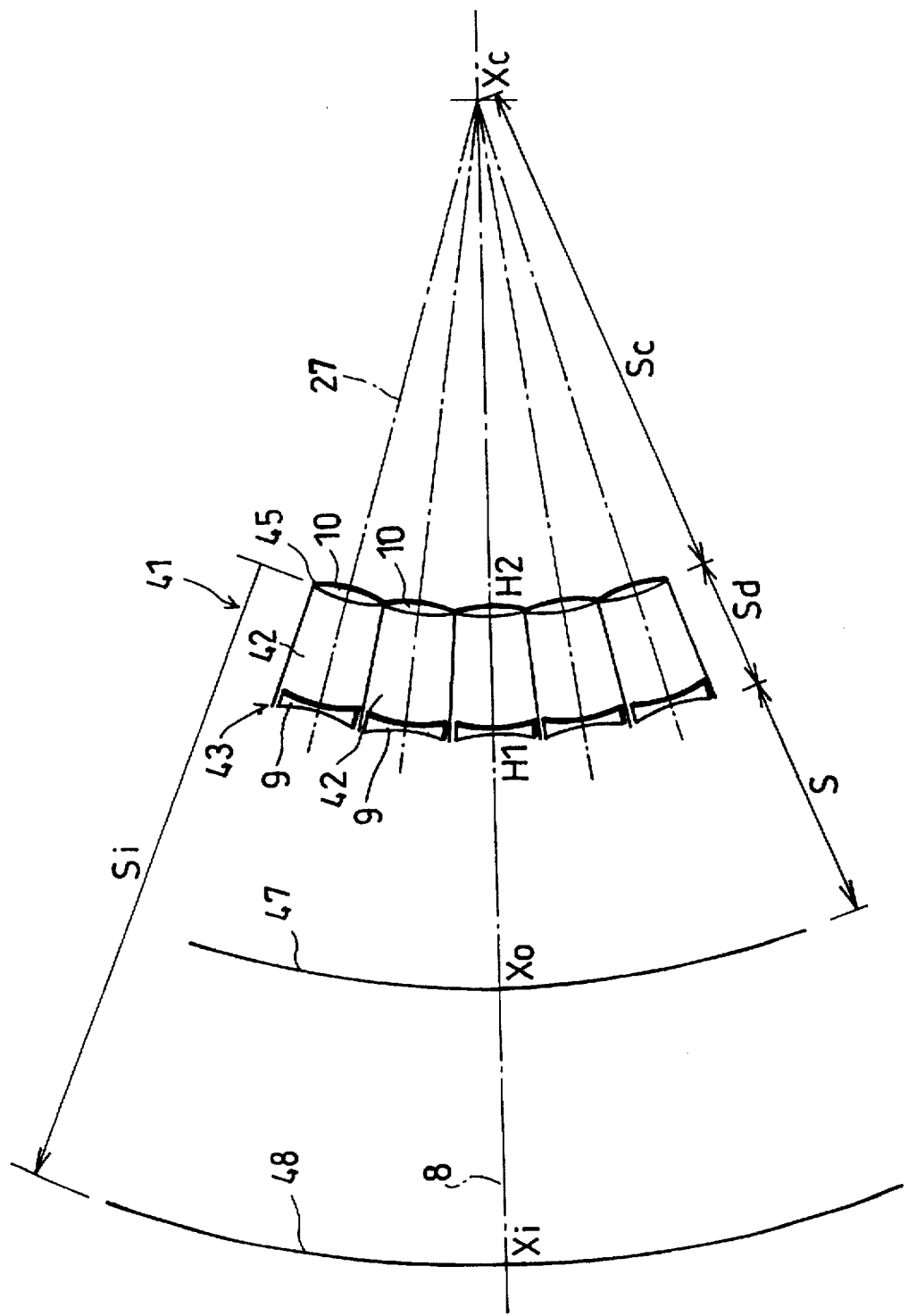
FIG. 16 is a view illustrating how the lenses are provided in the compound lens array shown in FIG. 10.
Figure 17:
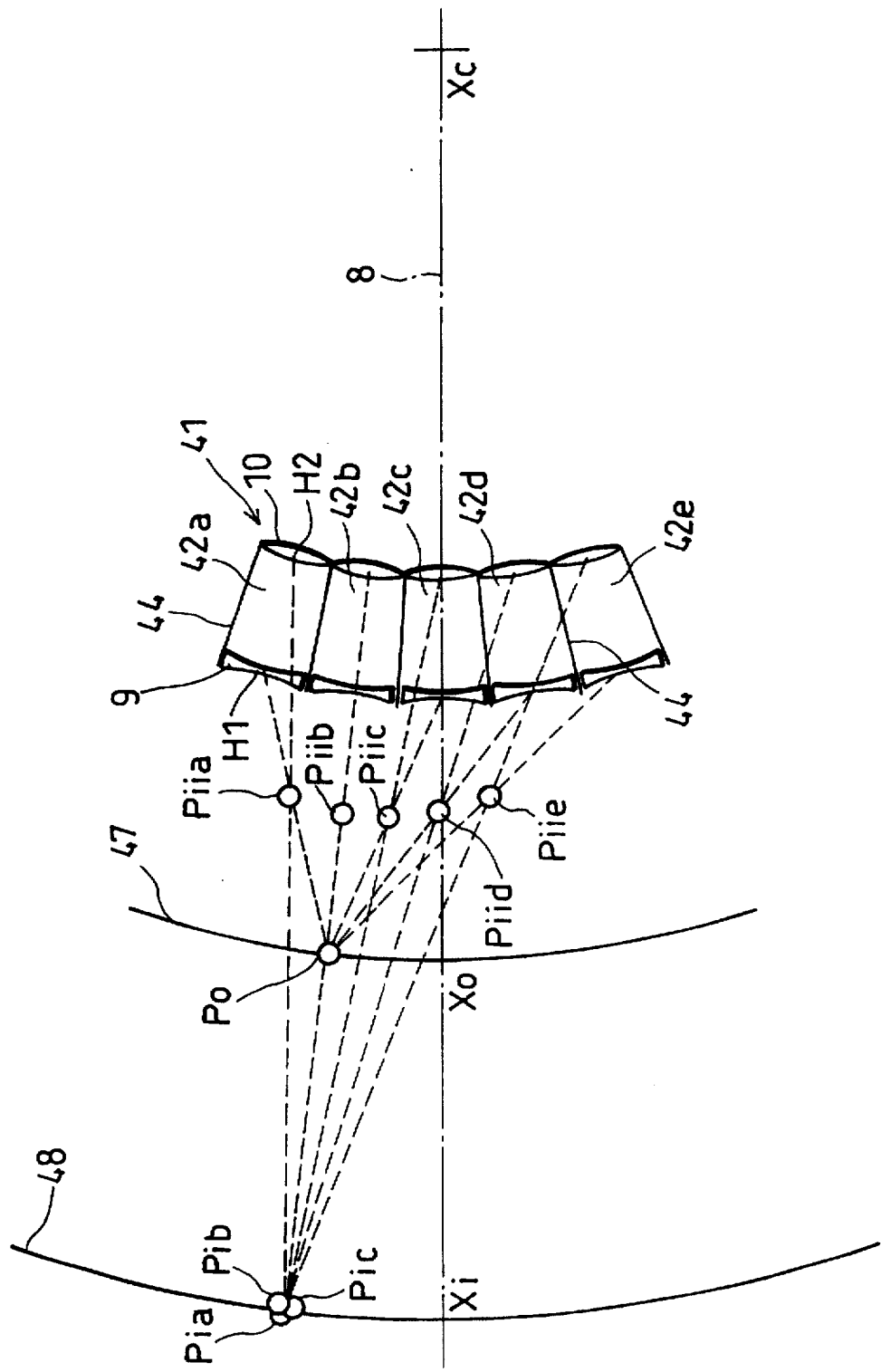
FIG. 17 is a view illustrating object-image correlations of the compound lens array shown in FIG. 10.
Figure 18:
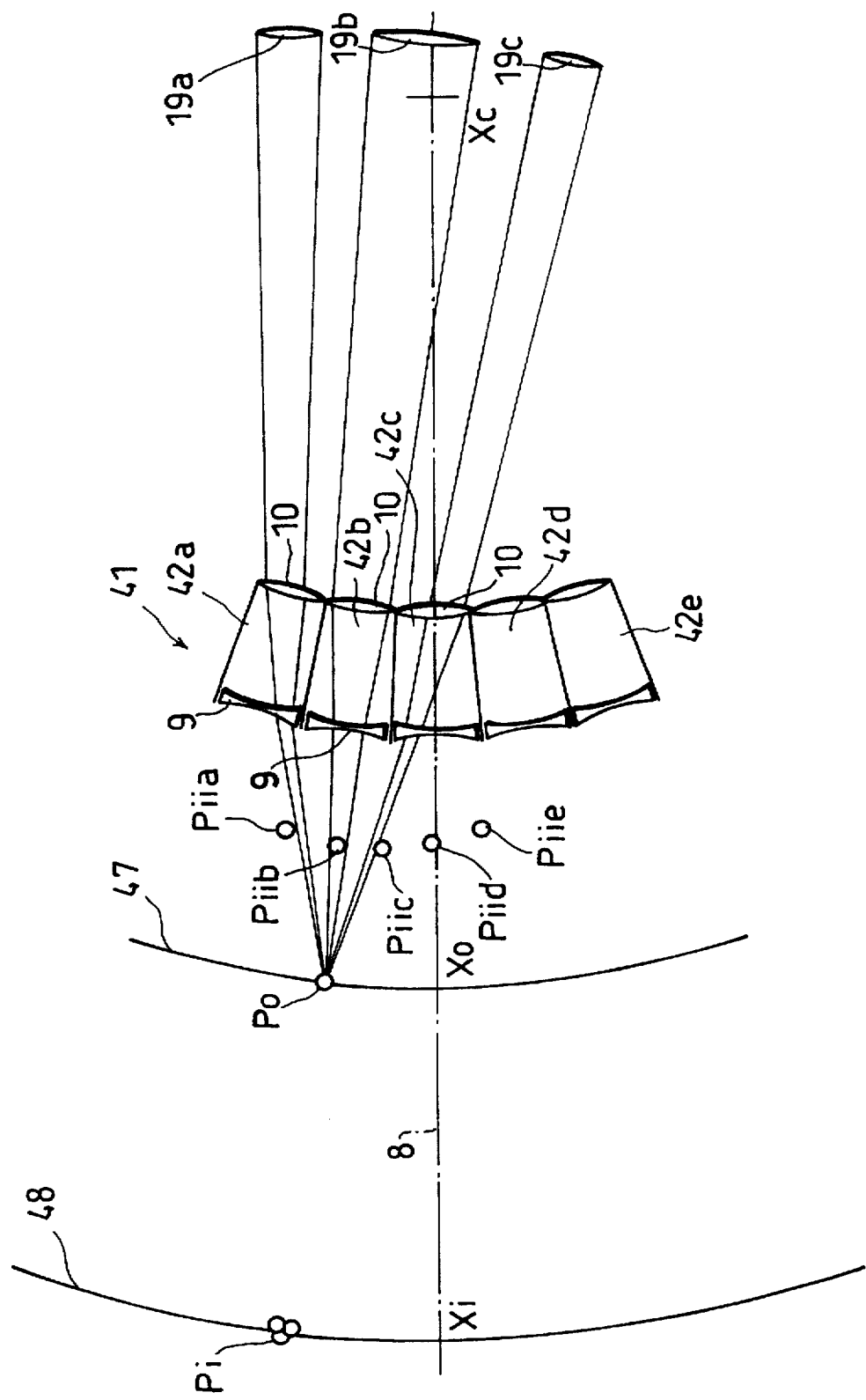
FIG. 18 is a view illustrating luminous fluxes from an object point on an object plane of the compound lens array shown in FIG. 10 to an image side of the same.

The following description will discuss how the spherical object plane of the image display element 46 of the compound lens array 41 can be observed, with reference to FIGS. 16 through 18. As is the case with the first embodiment, the negative lenses 9 are thin concave lenses, and the positive lenses 10 are thin convex lenses. Each pair of one negative lens 9 and one positive lens 10 constitutes a compound lens 42.

First of all, the following description will explain positions of the two-dimensional negative lens array 43 and the two-dimensional positive lens array 45 which constitute the compound lens array 41.

The compound lens array 41 is arranged in the following manner as shown in FIG. 16: a principal point H2 of the two-dimensional positive lens array 45 is positioned on a spherical surface having a radius of Sc and the point Xc as a center, and a principal point H1 of the two-dimensional negative lens array 43 is positioned on a spherical surface having a radius of (Sc+Sd) and the same center.

An object plane of one compound lens 42 is a plane which contains a point Xo, which is on a lens central axis 27 and a distance of S(<0) away from a negative lens 9 of the compound lens 42. Thus, each compound lens 42 has different object planes. Therefore, an object plane 47 of the compound lens array 41 is defined as a plane obtained by approximately averaging the object planes of the compound lenses 42, which is on a spherical surface having a radius of (Sc+Sd−S) and the point Xc as a center. In this case, an image plane 48 is disposed at a distance of Si from the positive lenses 10 of the compound lenses 42.

Secondly, the following description will discuss the object-image relations on the compound lens array 41, with reference to FIG. 17.

With respect to an object point Po on the object plane 47, intermediate images Pii the number of which agree with the number of the compound lenses 42 are produced. Note that a compound lens 42a, for example, produces an intermediate image which has the corresponding subscript, namely, Piia. In the figure, intermediate images Piid and Piie are not seen through the positive lenses 10, since being blocked by the light intercepting frame 44. Therefore, images produced on the image plane 48 by the compound lens array 41 are images Pia through Pic produced by the compound lenses 42a through 42c.

Thus, an image Pi with respect to the object point Po is not integrated, but diverged. Such divergence of the image Pi stems from that the respective object planes of the compound lenses 42 do not conform with the object plane 47 of the compound lens array 41. This can be solved by reducing the lens diameter of each compound lens 42 and decreasing respective intervals of the principal points of the lenses on the respective spherical surfaces.

By decreasing a lens diameter so as to decrease the principal point intervals, a so-called angle of visibility of a compound lens becomes smaller. Therefore, the number of the compound lenses 42 through which the object point Po can be seen decreases, thereby causing the images Pi produced by the compound lenses 42 to decrease in number.

In addition, by reducing the intervals of the principal points, angles made by the respective lens central axes 27 of the compound lenses 42 concerning the image Pi become smaller, thereby causing the image Pi to be diverged to a smaller extent. By thus causing the image Pi to be less diverged, the image Pi is seen as one integrated image. When, for example, each negative lens 9 has a focal distance f1 of −15 mm, each positive lens 10 has a focal distance f2 of 20 mm, each interval Sd between lenses is 10 mm, each angle at which the lens central axes 27 of the neighboring compound lenses 42 cross is about 2°, and each negative lens 9 has a diameter of 1 mm, the divergence of the image Pi is within one minute of the angle of visibility. This is acceptable in practical use.

Thirdly, the following description will discuss luminous flux reaching from the object point Po to the image side, with reference to FIG. 18.

As above described, since all the lens central axes 27 of the compound lenses 42 go through the point Xc, a luminous flux 19b passing through the point Xc passes through a compound lens 42b positioned closest to the object point Po. In this case, since the luminous flux 19b passes near the lens central axis of the compound lens 42b, the luminous flux 19b is hardly affected by aberration of the lens. Therefore, an image with less aberration can be obtained when the eye is placed at the point Xc.

Further, regarding the compound lens array 41 composed of the compound lenses 42 which has a wider apparent visual field, an image is observed by using a luminous flux passing through a compound lens closest to an object point, whether it is in the center or the periphery of the visual field. Therefore, it is possible to obtain good images at any time.

Incidentally, light emitted from one point on an observed object passes through a plurality of compound lenses 42 and enters the eye. In this case, strictly speaking, the respective compound lenses 42 produce respective images which do not coincide with each other. The reason is that since the compound lenses 42 are provided on the spherical surface having the point Xc as the center, respective object planes of the compound lenses 42 are individual tangential planes of the spherical surface having the point Xc as the center. In short, since being tangential planes at different positions on the spherical surface which by no means coincide with each other, respective object planes of the compound lenses by no means coincide with each other.

Since the object planes of the compound lenses 42 thus do not coincide with one another, respective images do not coincide with one another in principle. Therefore, respective images of the compound lenses 42 with respect to one object point do not coincide with one another but diverge. However, by decreasing the lens diameter of each compound lens 42, it is possible to reduce the number of images with respect to one object point and to suppress the divergence of the images. This is because each compound lens 42 is composed of at least two lenses which respectively have functions as aperture stop, and therefore causes an observable range to be narrowed when the lens diameter is decreased. As a result, the compound lenses through which one object point is observed decrease in number. In short, images corresponding to the object point decrease in number. A decrease in the number of the images leads to elimination of images causing greater divergence. Furthermore, a decrease in the lens diameter causes an angle made by optical axes of neighboring compound lenses to become smaller, thereby causing the divergence to become smaller.

Therefore, when the respective deviations of the images produced by the compound lenses 42 with respect to a same object point are converted into angles of visibility, and the angles of visibility thus obtained are below resolution of the naked eye, the diverged images are recognized as one image by the naked eye. Thus, by decreasing the lens diameter, the present optical system is able to ensure quasi one-to-one correspondence between objects and images.

In addition, when the convolution point of the eye of the observer is placed at the point Xc, it is possible to have a view through any compound lens 42 from on its optical axis. Therefore, there is no difference concerning image formation between the center and the periphery of the visual field. In other words, even when an apparent visual field is broadened by arraying the compound lenses 42 in a wider range, deterioration does not occur in a periphery of an image, unlike the case of the conventional lenses. Furthermore, there is no need to increase the number of the lenses so as to correct aberration.

Moreover, when the lens diameter of the compound lenses 42 is decreased, respective luminous fluxes passing near the optical axes of the compound lenses 42 are observed, thereby ensuring that excellent images with less aberration are obtained from the respective compound lenses 42. Such a decrease in the lens diameter also leads to a decrease in the thickness of the lenses, thereby leading to a decrease in the weight of the lenses.

Therefore, by using compound lenses having a smaller diameter and by observing from the vicinity of the point Xc, it is possible to provide an optical system which is smaller in size, thinner, and lighter in weight, which has a wide apparent visual field, and which provides excellent images with less aberration.

As has been described so far, with the compound lens array 41, it is possible to obtain panoramic pictures without deterioration of image quality in the periphery of the lenses. With the above described arrangement, unlike the conventional magnifying lenses, it is possible to achieve a wider visual field without increasing the number of lenses. Therefore, miniaturization and a decrease in the weight of a display apparatus incorporating the compound lens array 41 can be achieved.

It is also possible to easily obtain panoramic pictures, which was impossible with the conventional lenses.

Furthermore, comfortableness is not ruined when broadening the visual field is attempted, since a wider visual field is achieved while the distance between the eye and the lenses is ensured.

[Third Embodiment]

The following description will discuss still another embodiment of the present invention. The members having the same structure (function) as those in the above-mentioned embodiment will be designated by the same reference numerals and their description will be omitted.

Figure 19:
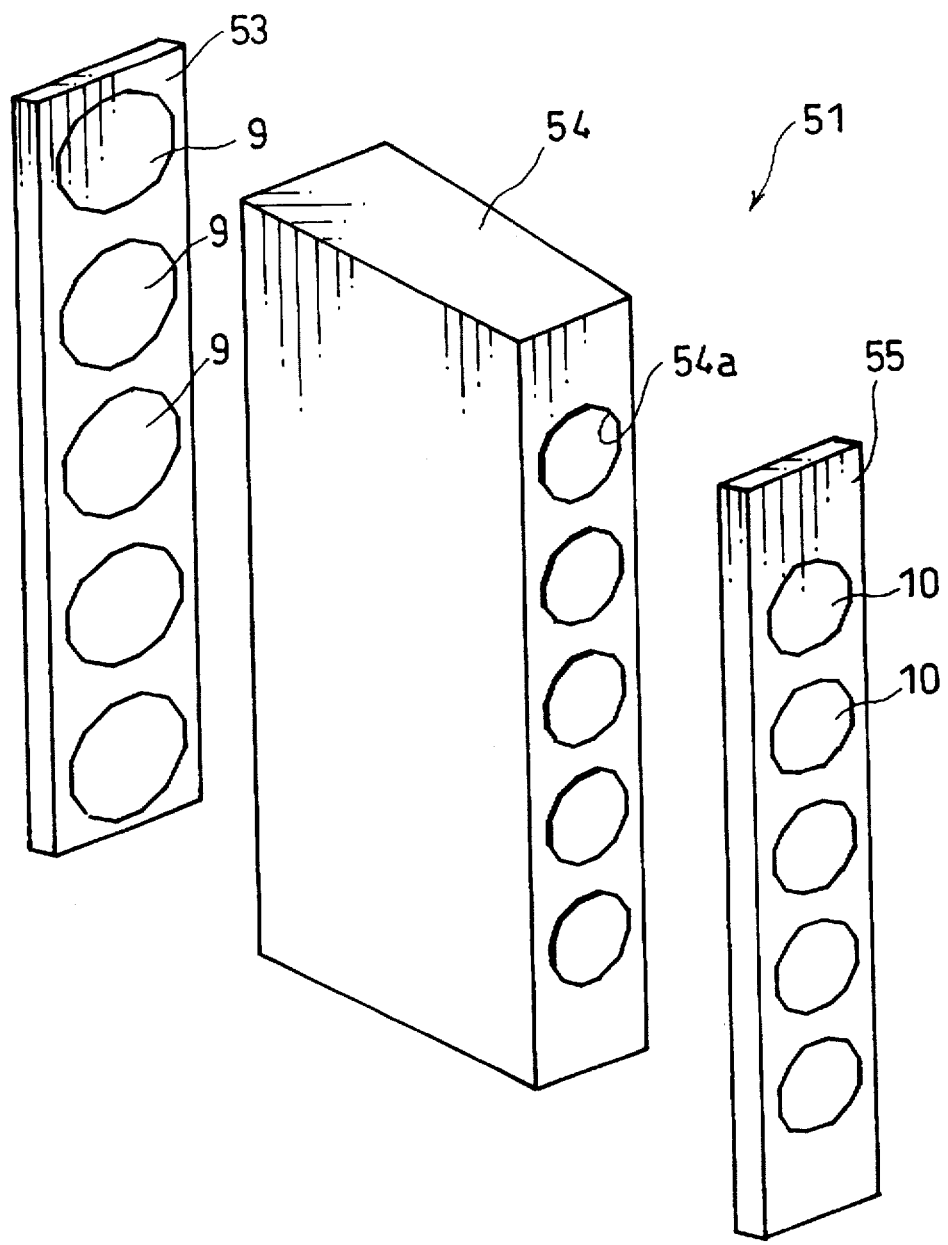
FIG. 19 is a schematic perspective view illustrating a dissected linear compound lens array in accordance with still another embodiment of the present invention.

A compound lens array 51 in accordance with the present embodiment is composed of a two-dimensional negative lens array 53 and a two-dimensional positive lens array 55, and a light intercepting frame 54 sandwiched therebetween, as shown in FIG. 19.

The two-dimensional negative lens array 53 is made of resin formed in a plate on which negative lenses 9 are linearly aligned. The two-dimensional positive lens array 55 is made of resin formed in a plate on which positive lenses 10 are aligned. In the light intercepting frame 54 there are provided apertures 54a, which are linearly aligned, so that the negative lenses 9 of the two-dimensional negative lens array 53 and the positive lenses 10 of the two-dimensional positive lens array 55 correspond to one another at a one-to-one ratio.

Therefore, the two-dimensional negative lens array 53 and the two-dimensional positive lens array 55 holding the light intercepting frame 54 therebetween, each pair of one negative lens 9 and one positive lens 10 constitutes a compound lens.

Figure 20:
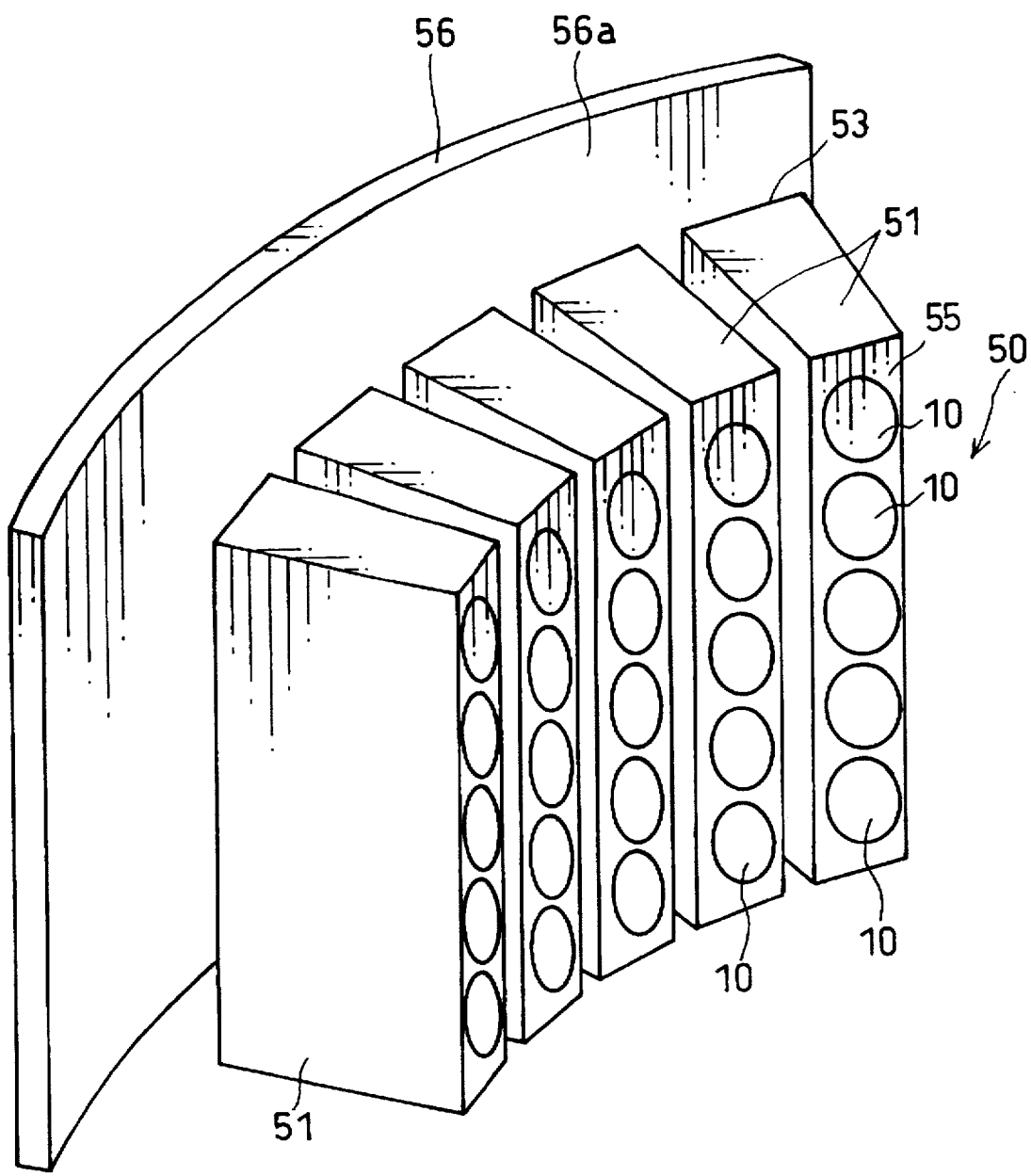
FIG. 20 is a schematic view illustrating an arrangement of a magnifying lens composed of the linear compound lens arrays shown in FIG. 19.
Figure 21:
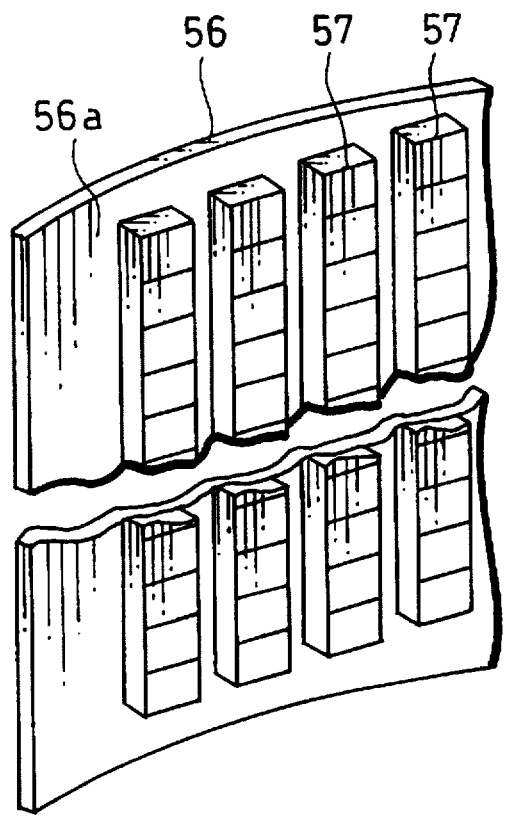
FIG. 21 is a view illustrating an image display element suitable for the magnifying lens shown in FIG. 20.

When the compound lens array 51 is actually used, a plurality of the linear compound lens arrays 51 are provided on a cylindrical surface so as to form a magnifying lens 50, as shown in FIG. 20. Since an object plane of the magnifying lens 50 is curved in a cylindrical form, an image display element 56 composed of pixels provided on a cylindrical surface is employed. The image display element 56 is realized by providing a linear LED array 57 on a cylindrical surface on an inner side 56a of the image display element 56, as shown in FIG. 21. Note that though the LED array 57 is adapted for light generation in the present embodiment, another light emitting element may substitute for it. Alternatively, an optical shutter such as liquid crystal may be used as well.

The linear compound lens arrays 51 are disposed in accordance with the first embodiment (see FIG. 10). To be more specific, though not shown in any figure, each linear compound lens array 51 is provided on a cylindrical surface which has a point Xc as the center, the point Xc being on the optical axis of the linear compound lens array 51. Note that the linear compound lens array 51 may be a compound lens array having a plurality of rows of the negative lenses 9 provided in a same two-dimensional lens array and a plurality of rows of positive lenses 10 provided in a same two-dimensional lens array.

The light intercepting frame 54 of the linear compound lens array 51 is shaped so that extensions of side surfaces of the light intercepting frame 54 contain the point Xc, which is positioned a distance of Sc away from a principal plane of the two-dimensional positive lens array 55 (see FIG. 10).

The above-mentioned arrangement has the following advantages: production is easy since in a generatrix direction of the cylindrical surface the compound lenses 52 are flatly provided, while with the arrangement in a circumferential direction it is possible to easily obtain a wide apparent visual field with less aberration. In addition, all the compound lens arrays to be used as the linear compound lens arrays 51 provided on the cylindrical surface are produced in a same shape. In other words, lens arrays which are mass-produced thereby lowering costs can be used as the compound lens arrays 51. Therefore, lowering costs of the magnifying lens 50 as a whole can be expected.

Thus, the magnifying lens 50 for magnifying images displayed by the image display element 56 which curves in a cylindrical form is realized by arraying the linear compound lens arrays 51 on the cylindrical surface. Here, when each light intercepting frame 54 as a lens-barrel for housing the linear compound lens array 51 has a shape broadening toward the image display element 56, the same arrangement as that wherein the compound lens arrays 51 are arrayed on a desired circumferential surface is easily achieved, only by adhering the linear compound lens arrays 51 side by side.

Furthermore, it is possible to provide he compound lens arrays 51 on a cylindrical surface which has the point Xc as the center, by forming each compound lens array 51 so that the point Xc on the optical axis of the above-described linear magnifying lens 51 falls on extensions of the side surfaces of the compound lens arrays 51 on the image side.

As has been described, with the magnifying lens 50 in accordance with the present embodiment wherein the linear compound lens arrays 51 are aligned in the horizontal direction of a screen so as to be provided on a cylindrical surface, it is easy to obtain a greater angle of visibility in the horizontal direction of the screen. Therefore, the magnifying lens 50 is applicable to a cinema screen-type image display apparatus 56. Furthermore, the object plane being curved in a cylindrical form, such a curve of the object plane can be easily realized by providing linear image display elements 56 on a cylindrical surface, or by curving a planar image display element 56 in a cylindrical form.

[Fourth Embodiment]

The following description will discuss still another embodiment of the present invention. The members having the same structure (function) as those in the above-mentioned embodiment will be designated by the same reference numerals and their description will be omitted.

Figure 22:
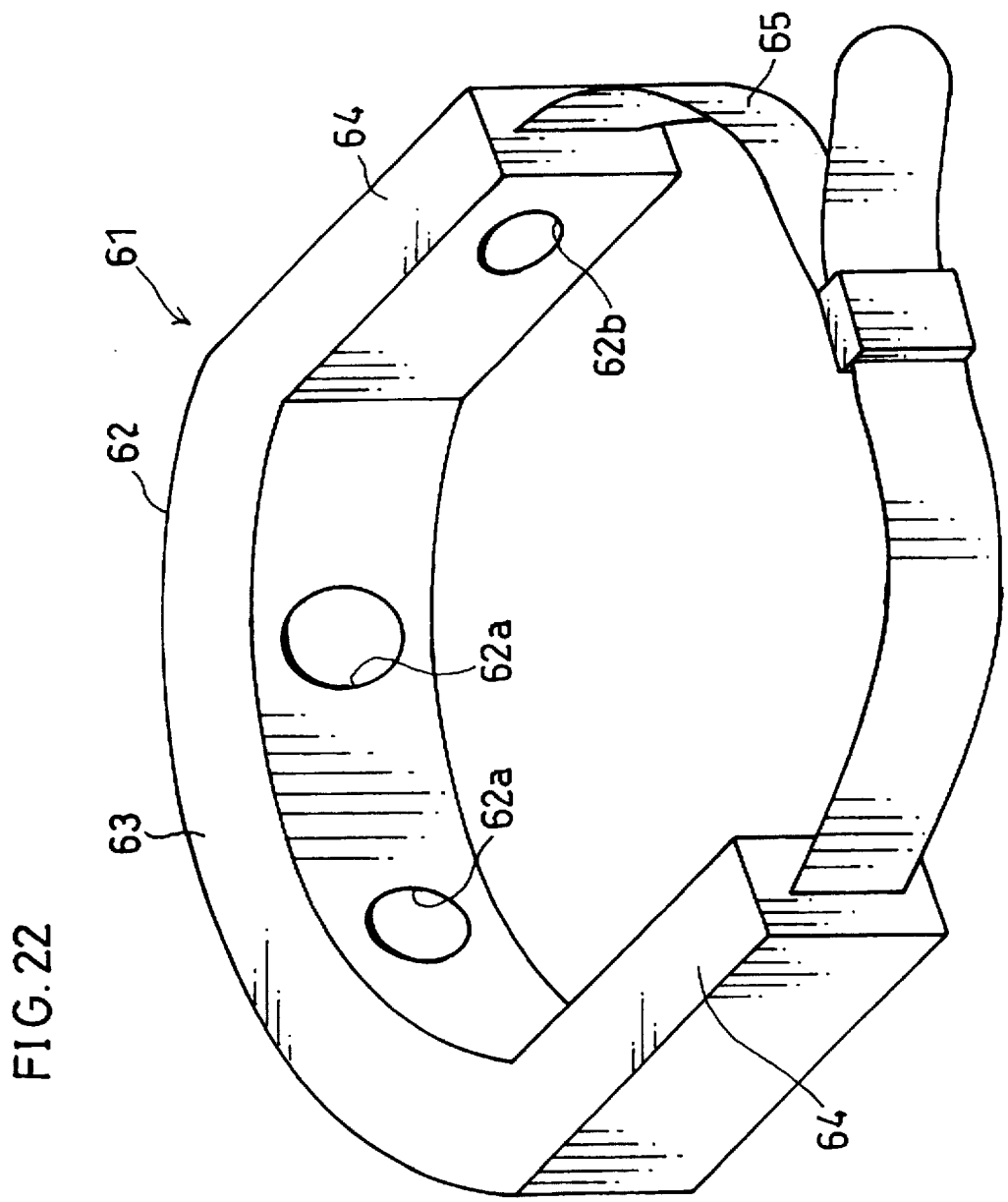
FIG. 22 is a schematic view illustrating an arrangement of a display apparatus in accordance with still another embodiment of the present invention.

As shown in FIG. 22, a display apparatus 61 in accordance with the present embodiment has a housing 62 as arranging means which has a shape of the letter U (a goggle-like shape), and a band 65 connecting the ends of the housing. The housing 62 also has a visual unit 63 which is an optical system provided in the front part, aural units 64 provided on the both sides, and a control unit (not shown) for controlling the visual and aural units 63 and 64. Usually the display apparatus 61 is fitted to the head with the band 65 so that the visual unit 63 and the aural units 64 correspond to the eyes and ears of the observer, respectively, and pictures of TV or videos are displayed in front of the eyes of the observer.

Note that for purposes of illustration figures wherein the band 65 is omitted are used in the following description.

As shown in FIG. 23(a), in the front part of the housing 62 wherein the visual unit 63 is provided, there are provided two apertures 62a with an interval therebetween which corresponds to the interval between the eyes, so that the observer observes pictures displayed by the visual unit 63 through the apertures 62a. In the side parts of the housing 62 wherein the aural units 64 are provided, there are provided apertures 62b, one in each side part, through which the observer hears music or the like.

Figure 23:
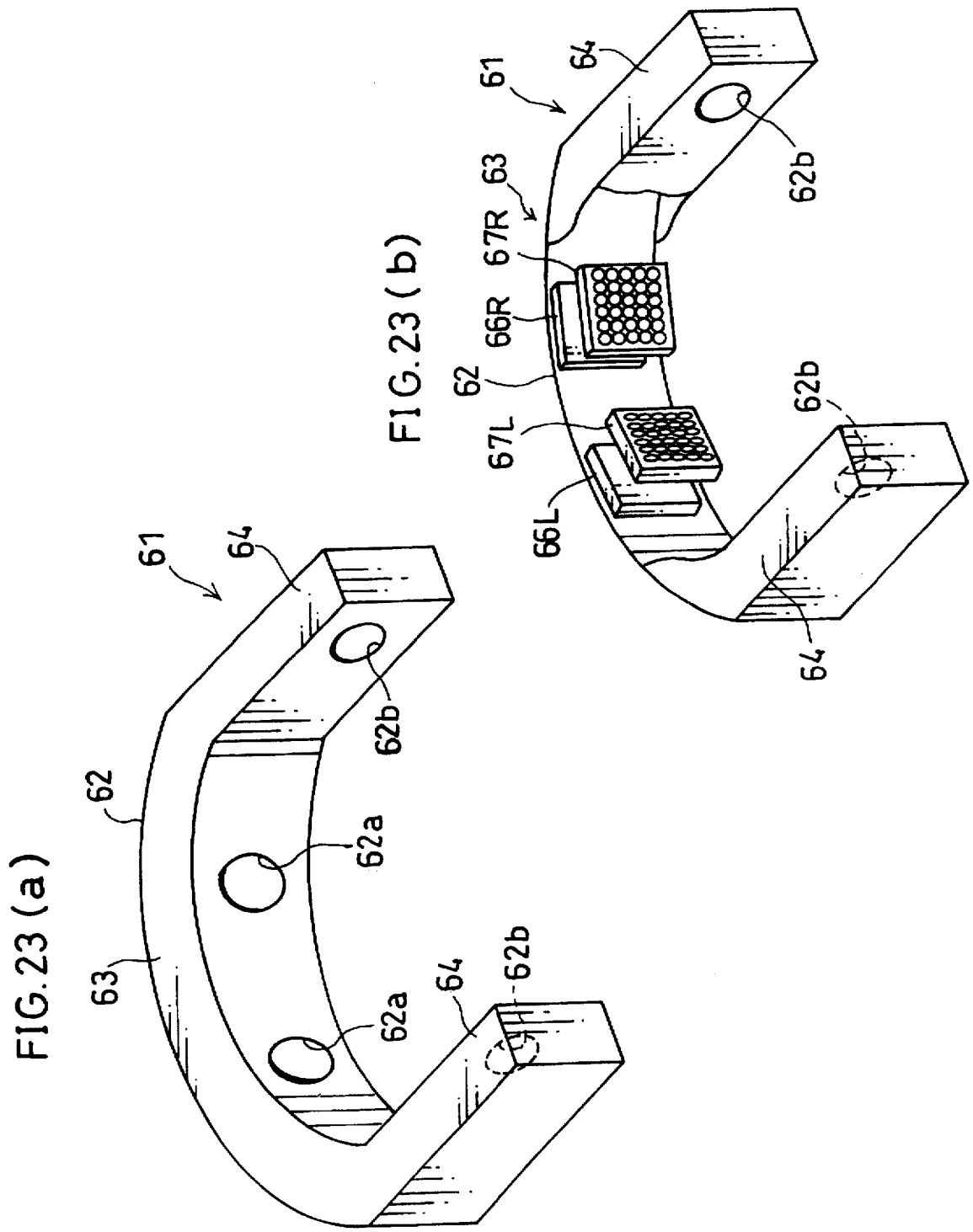
FIGS. 23(a) and 23(b) are schematic views illustrating an arrangement of the display apparatus shown in FIG. 22 in the case where the compound lens array shown in FIGS. 1(a) and 1(b) is adapted as a magnifying lens in the display apparatus.

The visual unit 63 has, at positions corresponding to the two apertures 62a in the housing 62, image display elements 66L and 66R for displaying pictures and magnifying lenses 67L and 67R, respectively, as shown in FIG. 23 (b) . The magnifying lenses 67L and 67R are adapted for magnifying the pictures displayed by the image display elements 66L and 66R, and are composed of compound lens arrays in accordance with the first embodiment.

Figure 24:
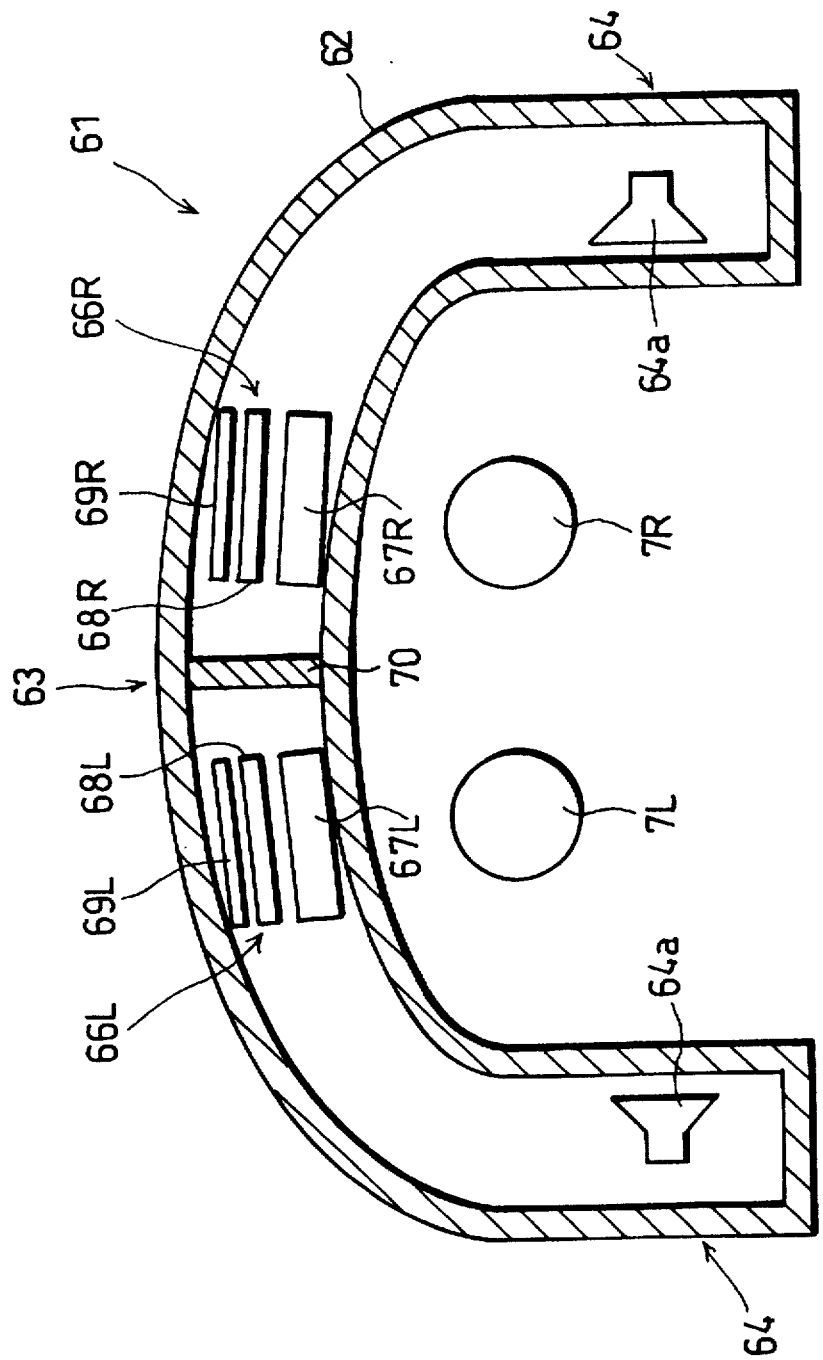
FIG. 24 is a schematic cross-sectional view of the display apparatus shown in FIG. 23.

The image display elements 66L and 66R are, as shown in FIG. 24, composed of liquid crystal panels 68L and 68R having liquid crystal elements, and backlights 69L and 69R for irradiating the liquid crystal panels 68L and 68R from behind, respectively. The aural units 64 respectively has speakers 64a at positions corresponding to the apertures 62b in the side parts of the housing 62 (see FIG. 24).

Therefore, the observer observes, with the left eye 7L, images displayed by the image display element 66L provided on the left side in the figure, through the magnifying lens 67L, while the observer hears sounds from the speaker 64a on the left side with the left ear which is not shown. Likewise, the observer observes, with the right eye 7R, images displayed by the image display element 66R provided on the right side in the figure, through the magnifying lens 67R, while the observer hears sounds from the speaker 64a on the right side with the right ear which is not shown.

In the substantially central part of the housing 62, there is provided an interceptive divider 70 which divides the visual unit 63 into right and left sections. With this arrangement, light from the left section of the visual unit 63, i.e., light from the magnifying lens 67L which has been generated by the backlight 69L and has passed through the liquid crystal panel 68L, is prevented from entering the eye 7R, and likewise light from the right section of the visual unit 63 is prevented from entering the eye 7L.

Since the compound lens arrays in accordance with the first embodiment are used as the magnifying lenses 67 in the above-described arrangement, a distance between the lenses and the display devices, that is, a distance between the magnifying lenses 67 and the image display elements 66, can be shortened in comparison with the case wherein single lenses are used as the magnifying lenses. The display apparatus 61 as a result has a center of gravity closer the eyes of the observer, thereby reducing the burden of weight on means (such as the band 65) for fixing the display apparatus 61 to the head.

Here, in the case where the magnifying lenses 67 have curve aberration, curves of virtual images can be corrected by curving a projection plane. In the case where the magnifying lenses 67 have aberration which causes bobbin-type distortion, projecting lenses are arranged so as to produce pictures with barrel-type distortion which is opposite to the bobbin-type distortion, so that the two types of distortion cancel each other. Thus, utilizing the projection lenses and the projection plane, it is possible to solve aberrations of the magnifying lenses 67, without increasing the number of the lenses or deforming the lenses into a non-spherical form. This enables thinning and reducing weight of the magnifying lenses, and cutting down costs of production of the magnifying lenses, thereby leading to miniaturization and reduction in weight of the display apparatus.

Furthermore, since a thin plate, or an inner wall of the housing 62 for holding the optical parts of the display apparatus can be utilized as the projection plane, this enables miniaturization, reduction in weight, and thinning of the display apparatus.

Figure 25:
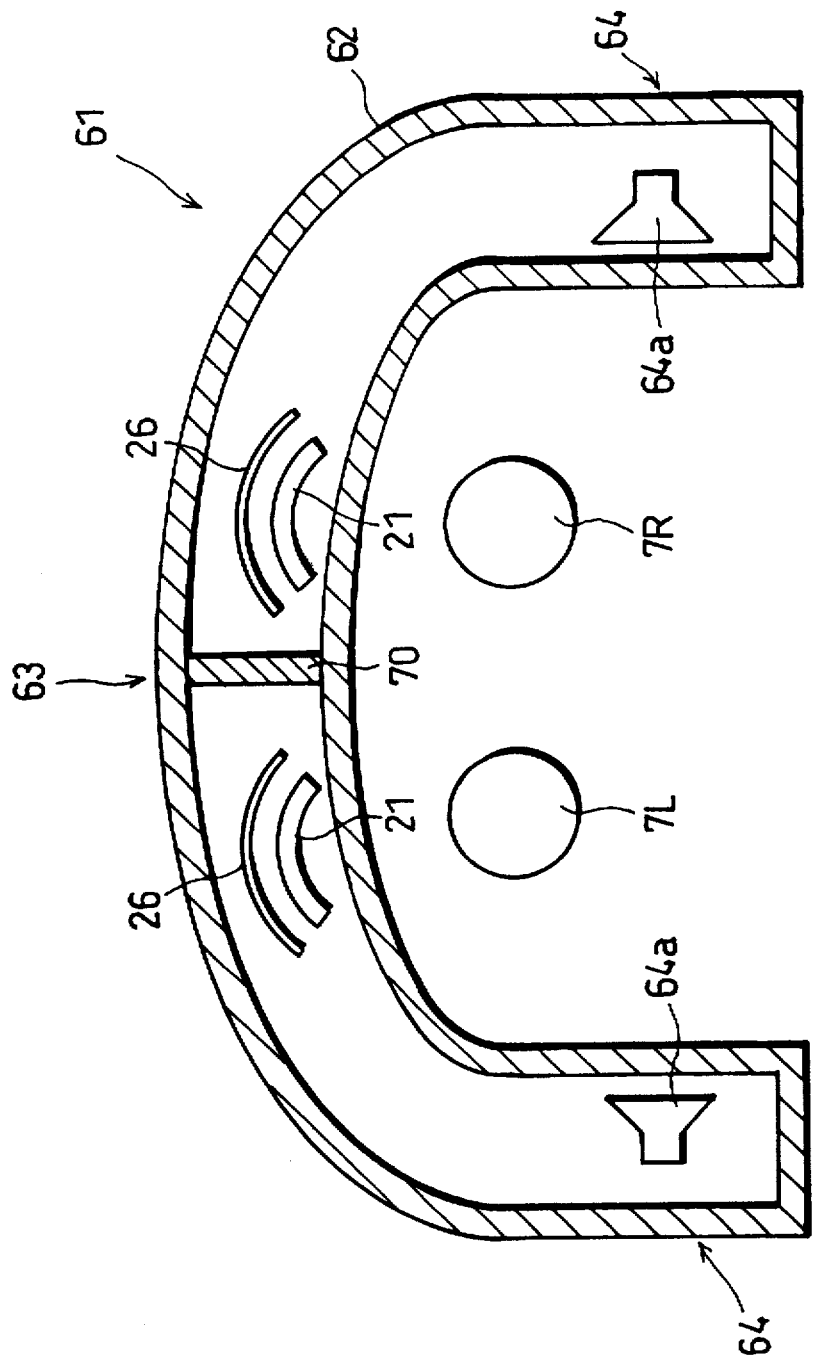
FIG. 25 is a schematic cross-sectional view of the display apparatus shown in FIG. 22 in the case where the compound lens array shown in FIG. 10 is adapted as a magnifying lens in the display apparatus.

As shown in FIG. 25, the compound lens arrays 21 in accordance with the second embodiment can be utilized as the magnifying lenses 67. The image display element 26 to be observed through the compound lens array 21 is curved in a spherical form, and the compound lens array 21 is formed in accordance with the form of the screen of the image display element 26, thereby having a spherical form as well. Using such compound lens array 21, it is possible to produce excellent pictures which have a wide apparent visual field and less aberration. In the case where the image display element 26 is flat, a wide visual field can be obtained by sequentially changing the focal distances of the compound lenses from the center to the periphery of the compound lens array 21 so as to make the object plane flat.

Though being not shown in figures, the display apparatus may have, as the magnifying lenses 67, the compound lens arrays 51 in accordance with the third embodiment. Since with this apparatus it is possible to produce pictures with a visual field which is wide in the horizontal direction, the apparatus is suitable for displaying pictures for a wide rectangular screen, such as the cinema screen.

By providing picture input terminals (not shown) respectively to the image display element 66L in the left section and the image display element 66R in the right section which constitute the visual unit 63 of the display apparatus 61, and by supplying slightly displaced images with respect to a same object respectively to the input terminals, the observer is caused to view two independent pictures with the left and right eyes, respectively. This means that when pictures filmed with two cameras placed at different positions, i.e., slightly displaced images with respect to a same object, are supplied to the display apparatus 61 through the picture input terminals, it is possible to obtain a three-dimensional pictures by seeing the pictures with the right and left eyes separately.

An acceleration sensor may be incorporated in the display apparatus 61 so as to detect motions of the head, so that the display apparatus 61 has a system to change the point of view with respect to the pictures, in response to the motions of the head.

By incorporating the acceleration sensor as described above, it is possible to measure rotation and transfer of the head by the acceleration sensor installed in the display apparatus 61, with the display apparatus 61 fixed on the head of the observer. With this arrangement whereby the point of view with respect to pictures which the observer watches is changed in proportion to the rotation and transfer of the head, the observer is given a feeling as if he/she were in the pictures.

The feeling of being in pictures can be achieved by, other than changing point of view, the wide apparent visual field and pictures of the excellent quality. These are easily ensured by using various technologies proposed in the present invention.

Note that the band 65 provided on the back side of the housing 62 is used as means for fixing the display apparatus 61 onto the head or other part of the body, but such a manner of fixing may be varied in many ways. For example, the housing 62 may be formed in a helmet-like shape, or a glasses-like shape. Alternatively, the display apparatus 61 may be a hand-held type or may be held with other means without any fixing means to the head, like binoculars.

The image display element be either a braun tube, EL elements, fluorescent tube, spontaneous light emitting elements such as light emitting diodes, or a shutter array which controls penetration or reflection of light, such as a liquid display device.

Furthermore, so as to dispose the optical system such as the visual unit in front of the observer's eyes, the optical system may be fixed on the head by using arranging means such as a helmet, a headband, or earpieces, as described above. Alternatively, a wristband may be provided to the optical system, so that the optical system is disposed in front of the observer's eyes by holding it with the wrist band. Furthermore, a fixing member such as a screw hole may be provided to the optical system so that the optical system may be fixed to an external holding member such as a tripod.

An adjusting system for adjusting the distance between the image display element and the magnifying lens may be provided to the optical system. This arrangement is for the visibility adjustment.

[Fifth Embodiment]

The following description will discuss still another embodiment of the present invention. The members having the same structure (function) as those in the above-mentioned embodiment will be designated by the same reference numerals and their description will be omitted. Since the aural units of the display apparatus is fully described in conjunction with the fourth embodiment, the visual unit will be focused on, not only in the description in conjunction with the present embodiment, but also in those in conjunction with the sixth through eighth embodiments.

Figure 26:
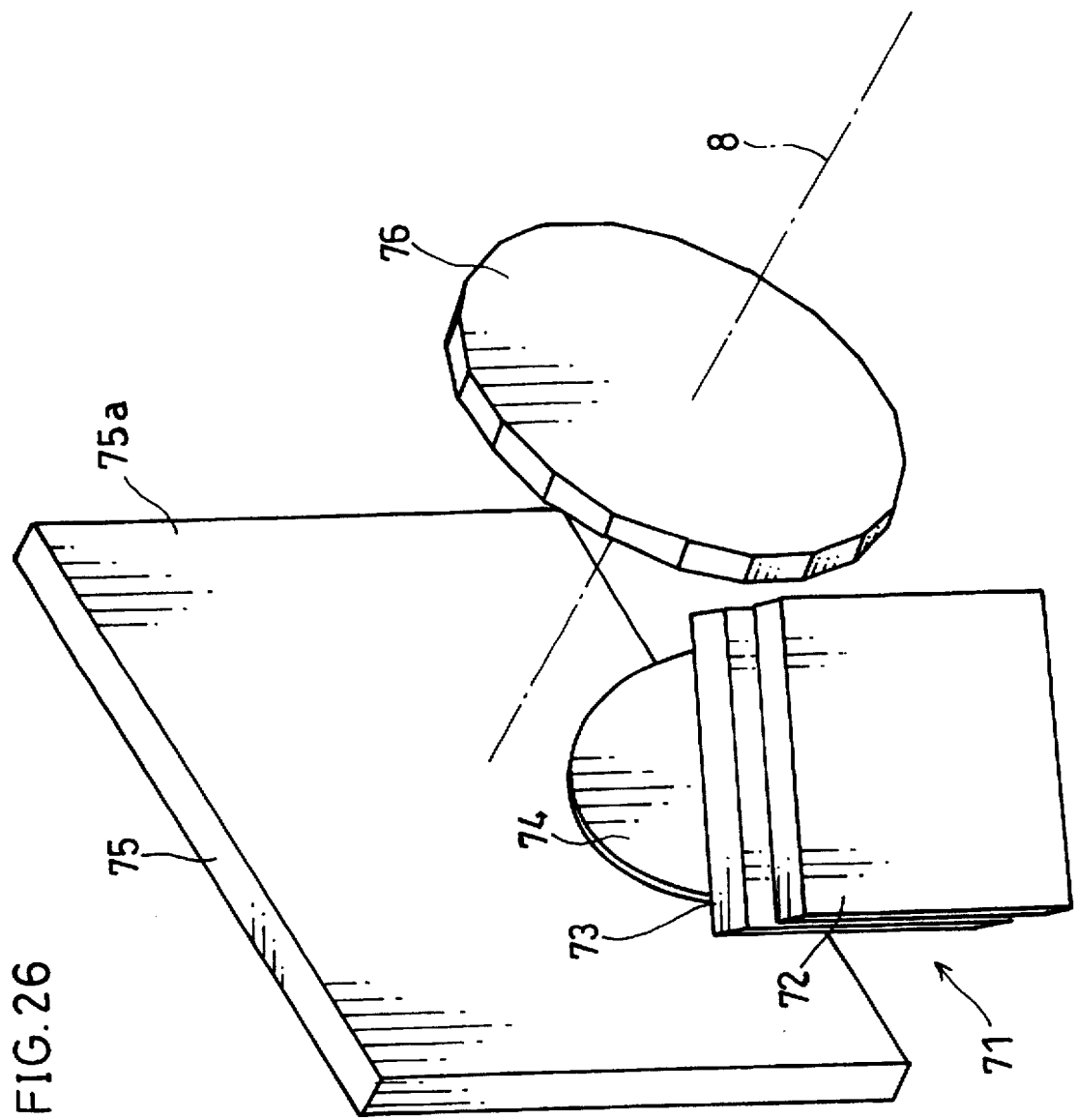
FIG. 26 is a schematic view illustrating an arrangement of a display apparatus in accordance with still another embodiment of the present invention.

A display apparatus in accordance with the present embodiment includes a visual unit which, as shown in FIG. 26, has an image display element 71, a projection lens 74, a screen 75, and a magnifying lens 76.

The image display element 71 is composed of a liquid crystal panel 73 composed of liquid crystal elements and a backlight 72 provided behind the liquid crystal panel 73. The projection lens 74 is for magnifying and projecting images formed by the image display element 71. On the screen 75, the images formed by the image display element 71 are projected. The magnifying lens 76 is for magnifying the images projected on the screen 75. Note that the magnifying lens 76 may be a single lens, a multiple lens configuration, or any of the compound lens arrays in accordance with the first through third embodiments.

Figure 27:
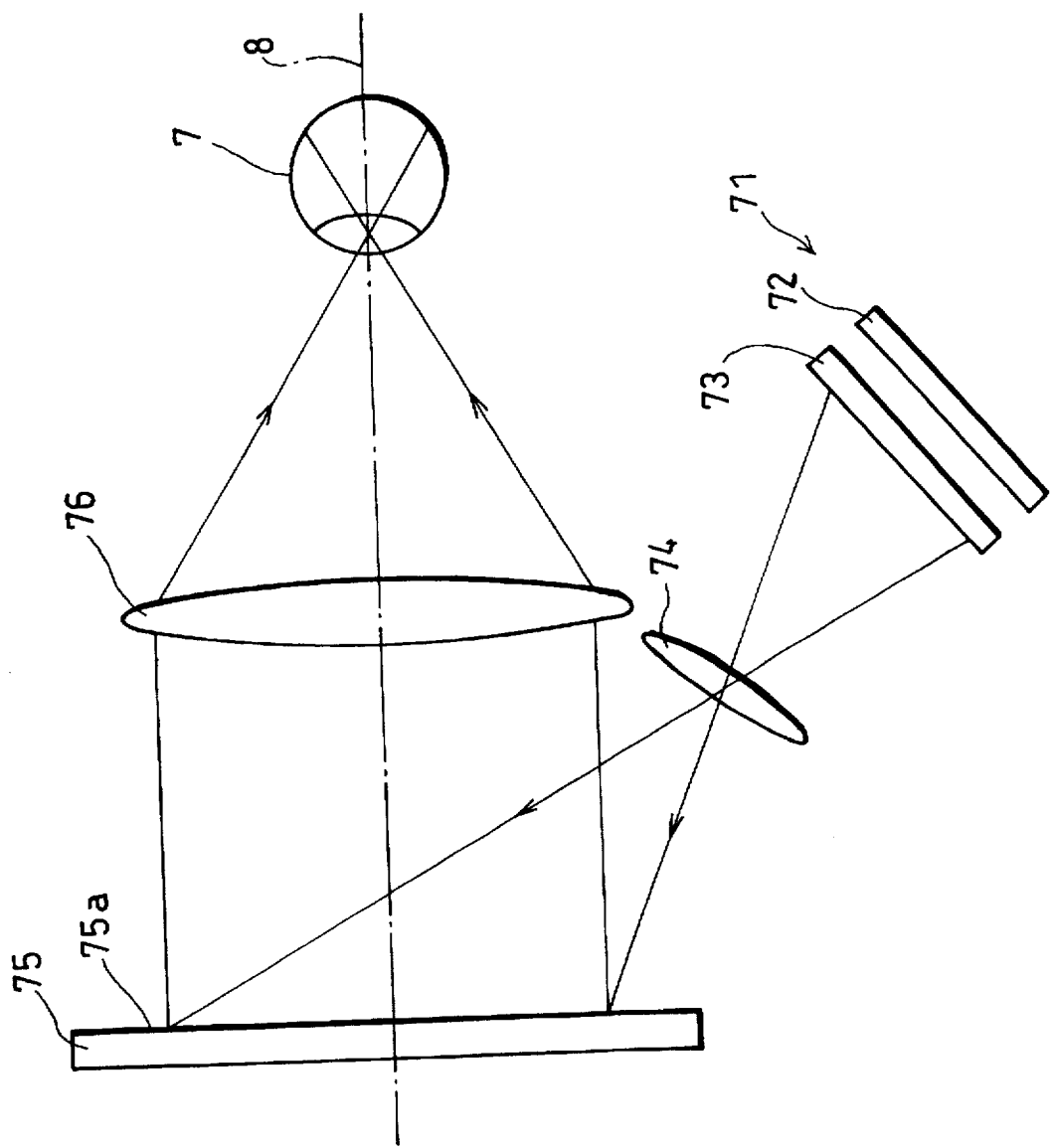
FIG. 27 is a view illustrating an optical path of the display apparatus shown in FIG. 26.

As shown in FIG. 27, in the visual unit arranged as above of the display apparatus, an image displayed on the liquid crystal panel 73 is lit up from behind by the backlight 72, and is magnified and projected by the projection lens 74 onto a screen plane 75a of the screen 75. The image thus magnified and projected on the screen 75 is magnified by the magnifying lens 76. Then, the image is projected on the eye 7 which is placed on a side opposite to the position of the screen 75 with respect to the magnifying lens 76, and at the same time at the focal point of the magnifying lens 76 on an optical axis 8 of the same lens.

In other words, with the display apparatus arranged as above, images displayed by the image display element 71 are projected by the projection lens 74 onto the projection plane 75a of the screen 75, and the images thus projected are observed through the magnifying lens 76.

Figure 28:
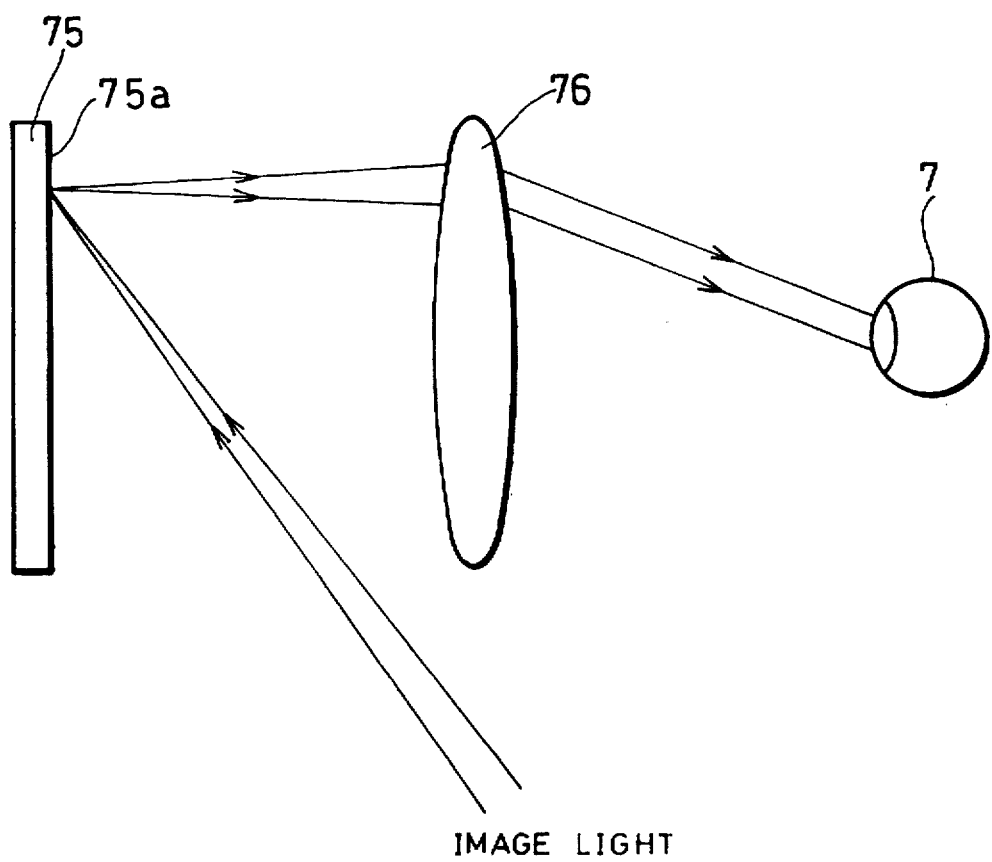
FIG. 28 is a view illustrating reflection of a luminous flux by a projection plane of the display apparatus shown in FIG. 26.

It is preferable that light from the image display element 71 (hereinafter referred to as "image light") is effectually reflected by the projection plane 75a of the screen 75 and enters the eye 7 through the magnifying lens 76, as shown in FIG. 28.

Figure 29A:
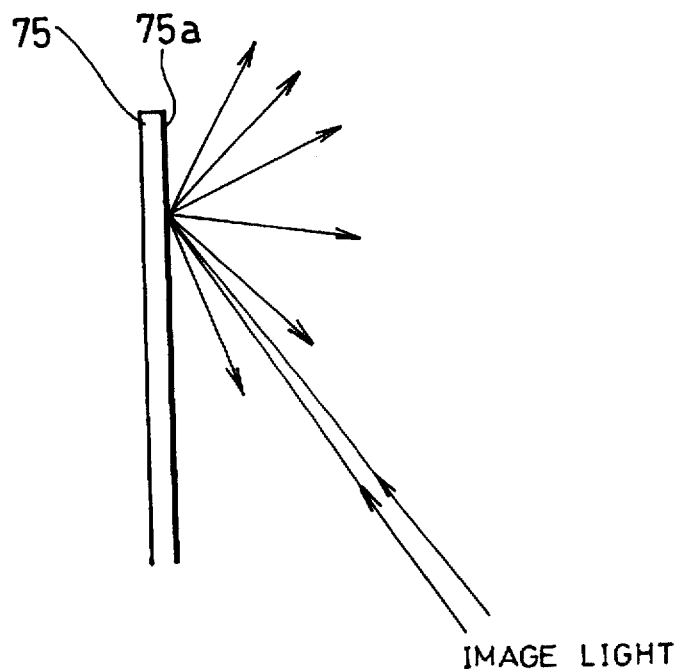
FIGS. 29(a) and 29(b) are views illustrating control on reflection of the projection plane of the display apparatus shown in FIG. 26.

However, generally a white diffusing surface is used as the projection plane 75a of the screen 75. With the screen 75 to which the white diffusing surface is adapted, the image light is scattered when reflected, as shown in FIG. 29(a). Therefore, light which is actually observed as image light is a part of the light reflected and scattered at the screen 75. To be more specific, as shown in FIG. 28, only a part of the scattered light which is produced when the light from the image display element 71 is reflected by the projection plane 75a enters the eye 7 through the magnifying lens 76.

Figure 29B:
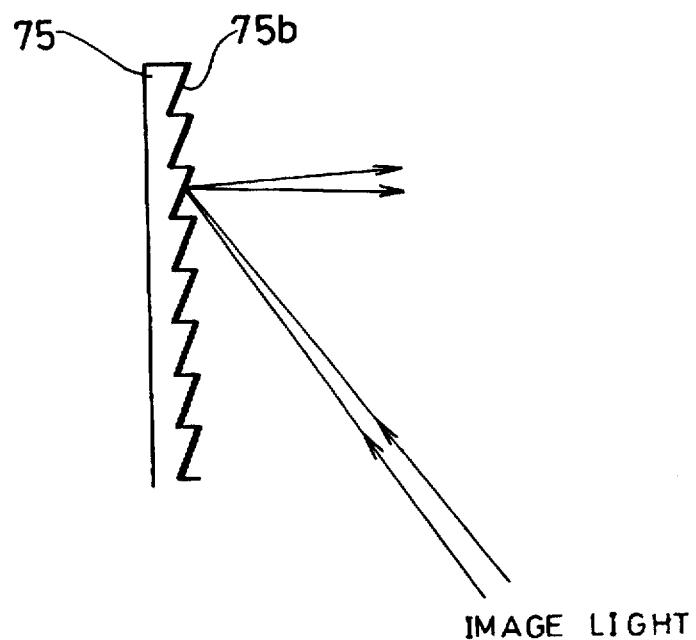

In contrast, when the projection plane 75a of the screen 75 has not the white diffusing surface but a serrated reflection member 75b shown in FIG. 29(b) which is produced by applying fine processing to the surface of the screen 75, an angle of reflection of the reflected light can be easily controlled by changing the serrature of the serrated reflection member 75b. Thus, by using the screen 75 shown in FIG. 29(b) with which the light is directed to the magnifying lens 76 without scattering, the image light is effectually utilized. When the serrated reflection member 75b has mirror-finished surfaces, the effectuality is further enhanced.

Figure 30A:
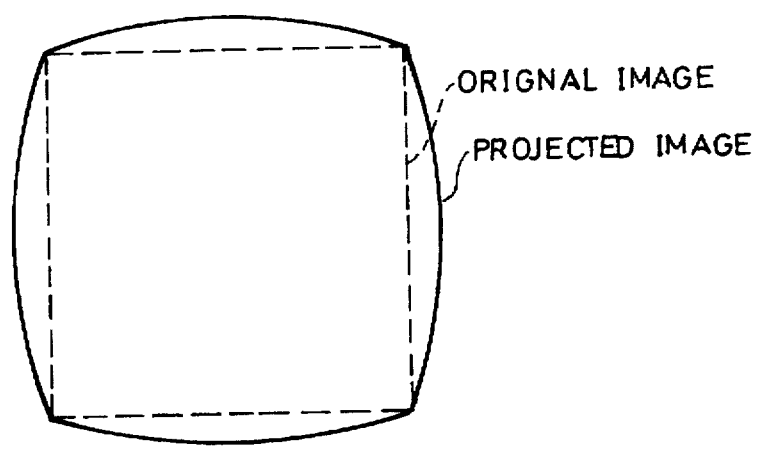
FIGS. 30(a) and 30(b) are views illustrating distortion of an image caused by a usual lens.
Figure 30B:
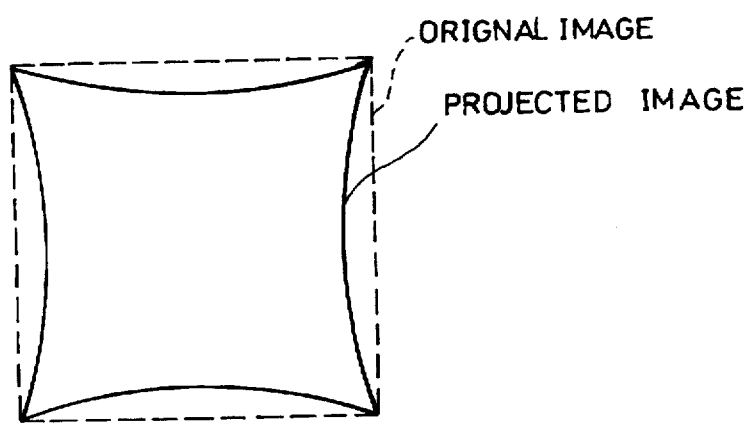
Figure 31:
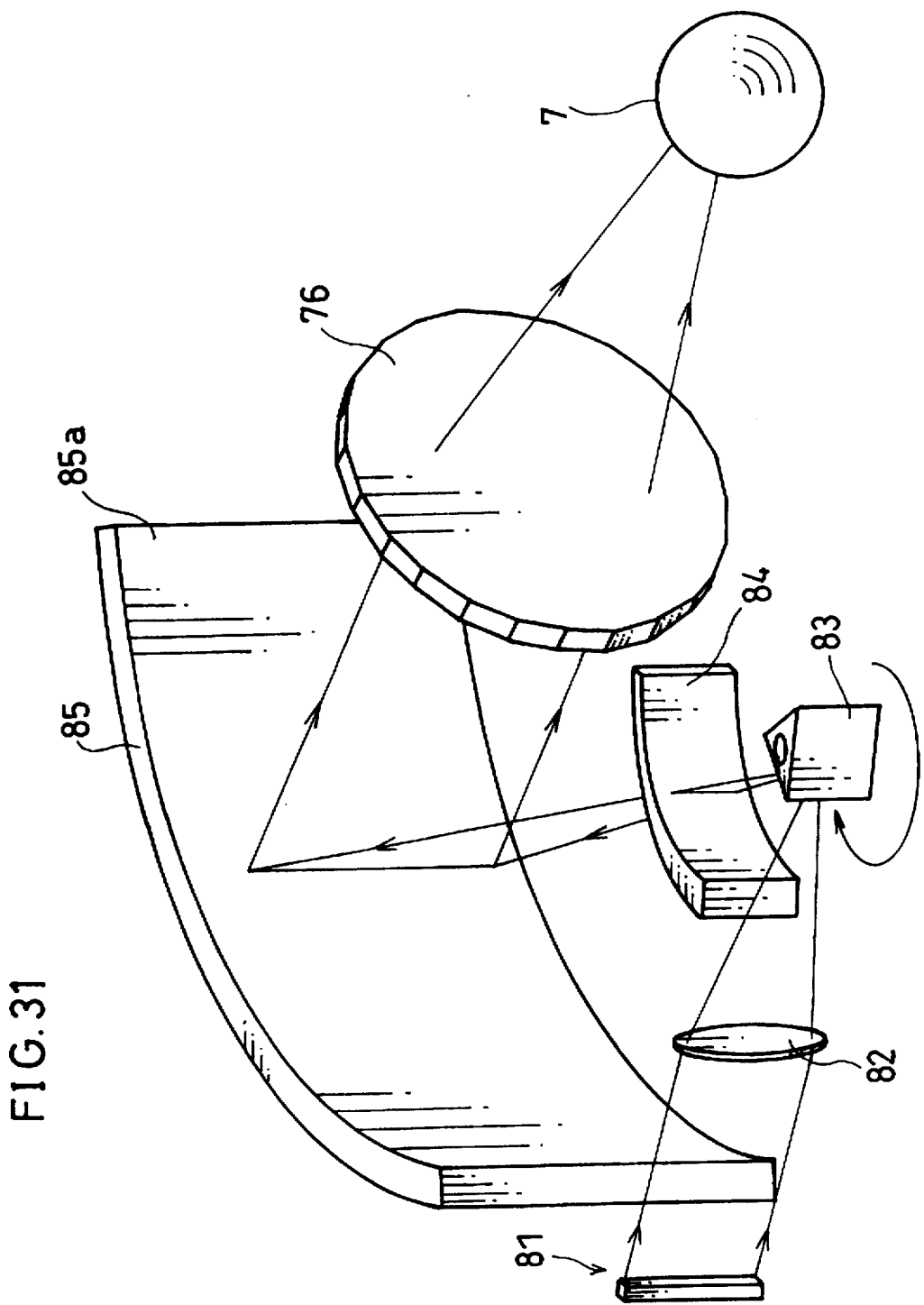
FIG. 31 is a schematic view illustrating an arrangement of the display apparatus shown in FIG. 26 in the case where a scan optical system is used in the display apparatus.

In the case where the projected images are observed through the magnifying lens 76 as described above, the following correcting functions, for example, may be given to the magnifying lens: (1) a function of causing a projected image (solid line) to be swollen in the periphery with respect to an original image (broken line) as shown in FIG. 30(a); and (2) a function as shown in FIG. 30(b) causing the projected image (solid line) to be shrunk in the periphery with respect to the original image (broken line). Such arrangement ensures that the distortion due to the magnifying lens 76 is cancelled. In order to correct the above-described distortion in the projected image due to the magnifying lens 76, forms of the projection lens 74 and the projection plane 75a of the screen 75 may be properly adjusted.

Since the above-described display apparatus is designed so that the light from the image display element 71 is projected onto the screen 75 and the projected image is observed through the magnifying lens 76, only the screen 75 is required to be placed in the part in front of the eye in the display apparatus, and the image display element 71 is not required to do so. In addition, the screen 75 can be made thinner and lighter in weight in comparison with the image display element such as a liquid crystal display panel or a light emitting device. Therefore, the arrangement also has an effect of reducing the weight of the part of the display apparatus before the eye. Since the display apparatus as a whole is thus thinned and the part in front of the eye is made lighter in weight, burden on the head of the observer can be reduced.

Furthermore, since image formation is carried out by projection, it is easier to form images on a curved surface. Arrangements wherein a scan optical system is adapted for projecting images on a curved surface will be discussed in the following descriptions on other embodiments.

[Sixth Embodiment]

The following description will discuss still another embodiment of the present invention.

A display apparatus in accordance with the present embodiment has a visual unit which is composed of a linear display device 81 as a image display element, a projection lens 82, a polygon mirror 83, a projection plane 85, and a magnifying lens 76.

The projection lens 82 is for magnifying and projecting outputs from the linear display device 81. The polygon mirror 83 is optical path deflector shaped in a triangular prism with three reflecting planes, which revolves so as to deflect outputs of the linear display device 81. On the projection plate 85, light deflected by the polygon mirror 83 is projected. The magnifying lens 76 is for magnifying the projected image on the projection plate 85. Note that as is the case of the fifth embodiment, the magnifying lens 76 may be a single lens loupe, a multiple lens configuration, or any of the compound lens arrays in accordance with the first through third embodiments.

Figure 32:
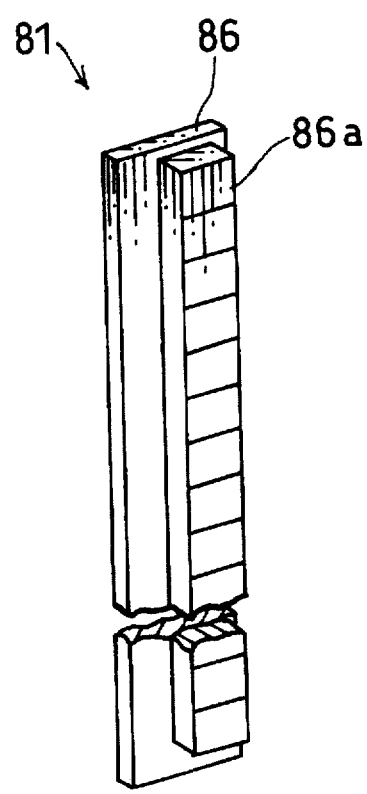
FIG. 32 is a schematic perspective view illustrating an image display element for use in the display apparatus shown in FIG. 31.

Used as the linear display device 81 is an LED array 86 composed of a plurality of LEDs 86a linearly aligned, as shown in FIG. 32. The projection plate 85 has a projection plane 85a with a predetermined curvature.

In the display apparatus thus arranged, light emitted from the LEDs 86a which are selectively lit up in the LED array 86 of the linear display device 81 is projected to the polygon mirror 83 through the projection lens 82, deflected by the polygon mirror 83, and then, projected to the projection plane 85a with a predetermined curvature of the projection plate 85. Therefore, the display apparatus utilizes the afterimage phenomenon so as to form images on the retina of the eye 7.

Specifically, in the above-mentioned display apparatus, light emitted by the linear display device 81 is scanned and projected onto the projection plate 85 by the polygon mirror 83 which is a scan optical system, and linear images thus formed on the projection plate 85 are sequentially scanned in the scan direction on the projection plate 85, so as to be recognized as one picture due to the afterimage phenomenon.

Pictures are formed by the above-described display apparatus on a cylindrical surface with the polygon mirror 83 as the center. In the case where the cylindrical surface and the projection plane 85a of the projection plate 85 do not conform to one another, it is necessary to provide a correction lens 84 between the projection plate 85 and the polygon mirror 83 so that the pictures formed by the polygon mirror 83 have the same curvature as that of the projection plane 85a of the projection plate 85.

It is preferable to use an f·θ lens for the above correction. The f·θ lens has a function of conforming an image formation position of projected images to the position of the projection plane and controlling a scanning speed on the projection plane so that the scanning speed is kept constant. However, when the projection plane is provided on a spherical surface having the polygon mirror as the center, the image formation position of the projected images substantially coincides with the projection plane without correction. In this case, the correction lens such as the f·θ lens is unnecessary.

According to the above arrangement of the display apparatus, an output from the linear display device 81 as a display device for displaying a part of the whole picture is mapped on the projection plane 85a, and the image mapped on the projection plane is scanned, so as to cause the picture to be formed. Note that the scan is carried out by the polygon mirror 83 as optical path deflecting means. The image mapped on the projection plane 85a is observed through the magnifying lens 76.

The optical path deflector is not restricted to the polygon mirror 83, and any member may be adaptable provided that it has a function of deflecting the light from the linear display device 81, for example, a member which deflects the optical path by means of vibration or rotation, such as a mirror vibrated by a member which vibrates by electromagnetic effects, electrostatic effects, piezoelectric effects, or the like, or a vibrating member as above which is given a reflecting function by Al deposition.

In the case of the rotary polygon mirror, an angle of deflection of the optical path is changed during rotation of the mirror. In the case of the vibrating mirror, an angle or a position of the optical path is changed during reciprocating rotary motion of the mirror, so that images are formed on the screen.

In the case where the optical path is deflected in a single direction, it is preferable that a linear image display element in which pixels are linearly aligned is used as the image display element. Note that pixels may be aligned in a single row, in a plurality of rows, or in a houndstooth form. In such a case, an output pattern of the linear image display element is changed in response to the optical path deflecting motion, so as to form two-dimensional images.

In the case where the optical path is deflected in plural directions, a point light source may be used as the image display element for projection, and light for projection may be supplied from outside.

To obtain chromatic images, a plurality of light emitting element, each having a different color, or a light emitting element array may be adapted.

Applied to the display apparatus of the present invention is not the conventional scanning method whereby direct light from displayed images is projected directly on the retina during a scan, but a method whereby the images are mapped on the projection plane 85a and scanned. According to the conventional method, the center of rotation for the scan needs to coincide with the convolution point of the eye. In contrast, with the present display apparatus, the center of rotation for the scan may be positioned at the center of rotation of the polygon mirror 83 as optical path deflecting means, thereby allowing the scan to cover a wider range without awkwardness.

Further, since the width of the apparent visual field depends not on the range of the scan but on the apparent visual field of the magnifying lens 76 for observing images formed by scanning on the projection plane, the scan by no means limit the apparent visual field. Therefore, it is preferable to use any of the compound lens arrays in accordance with the first through third embodiments as the magnifying lens 76, since such arrangement not only ensures a wider visual field, but also causes the display apparatus to become smaller in size and lighter in weight.

The linear display device 81 is not restricted to the LED array 86. Anything may be adapted as the linear display device 81 provided it is able to display linear images, for example, a single light emitting element, a linear array of light emitting elements, a single optical shutter, or a linear array of optical shutters. By using such member as the linear display device 81, the display apparatus can be smaller in size and lighter in weight.

Figure 33:
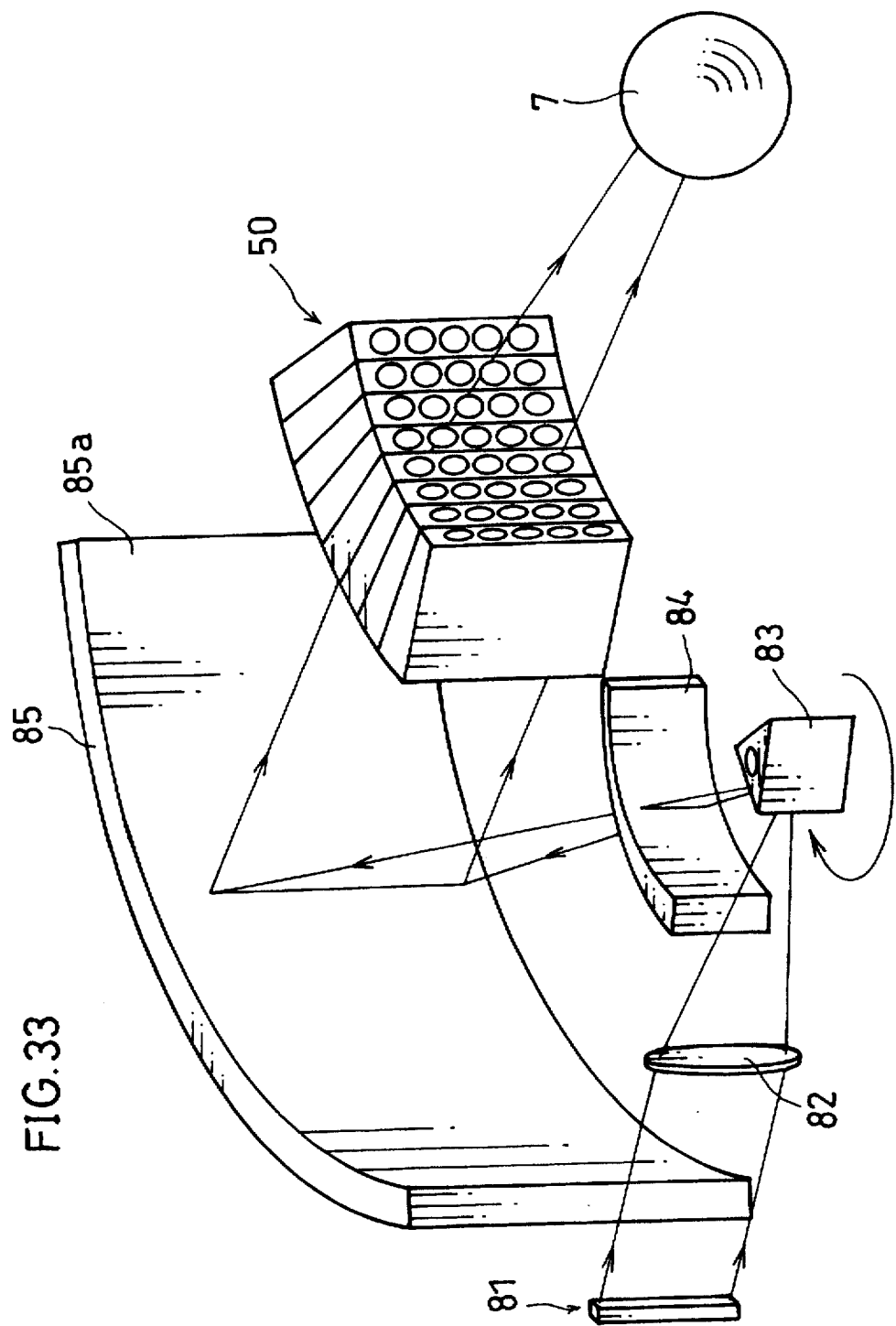
FIG. 33 is a schematic view illustrating an arrangement of the display apparatus shown in FIG. 31 in the case where the magnifying lens shown in FIG. 20 is adapted as a magnifying lens in the display apparatus.
Figure 34:
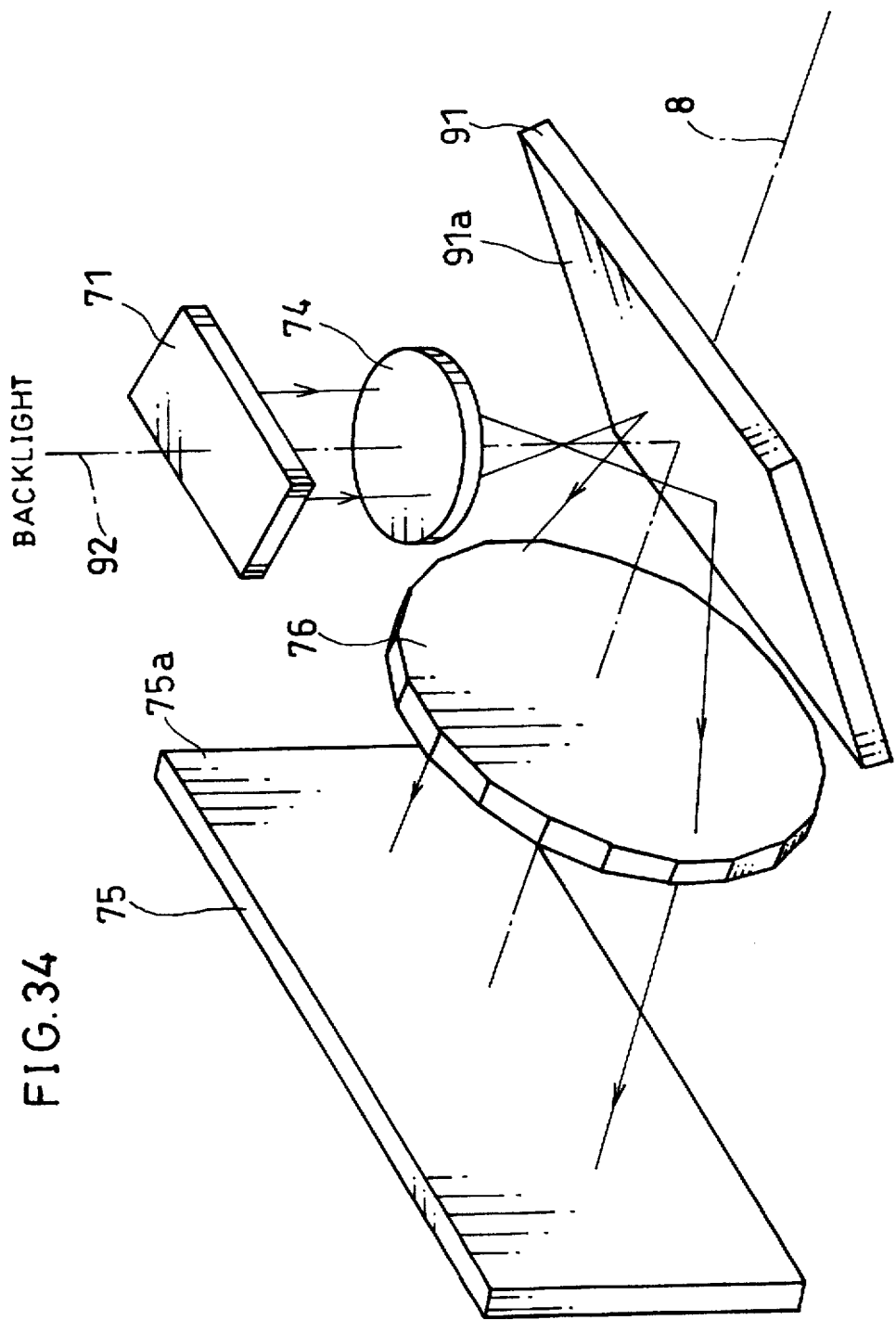
FIG. 34 is a schematic view illustrating an arrangement of a display apparatus in accordance with still another embodiment of the present invention.

The magnifying lens 50 in accordance with the third embodiment may substitute for the magnifying lens 76, as shown in FIG. 33. In the case with the magnifying lens 50, outputs from the linear display device 81 is mapped and scanned on the projection plane 85a of the projection plate 85 curved in a cylindrical form having the position (Xc in FIG. 10) of the eye 7 on the optical axis of the magnifying lens 50. Here, since the polygon mirror 83 is not placed at the center of curvature of the projection plate 85, the correction lens 84 for correcting the image formation position is provided between the linear display device 81 and the projection plate 85.

Image formation on the projection plane 85a may be carried out by two-dimensional scan of a point light source, instead of the method as described. Used as the point light source in this case may be a quasi point light source realized by applying a pinhole mask over an LED or a lamp, or preferably, a coherent light source such as a semiconductor laser so as to form images with high resolution.

[Seventh Embodiment]

The following description will discuss still another embodiment of the present invention.

A display apparatus in accordance with the present embodiment includes a visual unit composed of an image display element 71, a projection lens 74, a half mirror 91 as optical path separator, a magnifying lens 76, and a screen 75.

The screen 75, the magnifying lens 76, and the half mirror 91 are provided in this order so that their centers, namely, the image center, the lens center and the mirror center, fall on an optical axis 8. The screen 75 and the magnifying lens 76 are provided so that their surfaces are parallel to each other. The half mirror 91 is tilted at a predetermined angle with respect to the optical axis 8 so that a reflection plane 91a of the same is placed apart from a lens surface of the magnifying lens 76. The projection lens 74 and the image display element 71 are provided so that an optical axis 92 pierces the same at their respective lens centers, the optical axis 92 being orthogonal to the optical axis 8 and passing through the mirror center of the reflection plane 91a of the half mirror 91.

With the above arrangement of the display apparatus as optical system, outputs of the image display element 71 composed of a liquid crystal display panel are mapped on a projection plane 75a of the screen 75 through the projection lens 74 composed of a single lens and the magnifying lens 76, and the image thus mapped is observed through the magnifying lens 76. Here, though in the present embodiment single lenses are used as the projection lens 74 and the magnifying lens 76 both, this may be varied in many ways. Any optical system may be used as the same provided that it is a convergent optical system. Such optical system may be a multiple lens configuration, a diffraction lens, or any of the compound lens arrays in accordance with the first through third embodiments.

Since the liquid crystal display panel is used as the image display element 71, a backlight is provided so as to light up the image display element 71 from behind. As the screen 75, a screen having a white diffusing surface is employed.

With the display apparatus thus arranged, it is possible to project images on the screen 75 from the front since the magnifying lens 76 is adapted for projection of images. As a result, distortion of images projected on the projection plane 75a of the screen 75 is reduced in comparison with the case where the images are obliquely projected without the magnifying lens 76.

However, the arrangement wherein the projected images are observed also from the front of the projection plane 75a may cause a problem that the image display element 71 and the projection lens 74 hinder the observation.

To cope with this, the half mirror 91 is provided between the projection lens 74 and the magnifying lens 76 so as to separate an optical path (first optical path) from the image display element 71 to the projection plane 75a and an optical path (second optical path) from the projection plane 75a to the eye 7 of the observer. Specifically, it is arranged that the optical path from the image display element 71 to the projection plane 75a is bent by the reflection of the half mirror 91, while the optical path from the projection plane 75a to the eye 7 of the observer penetrates the half mirror 91.

Figure 35:
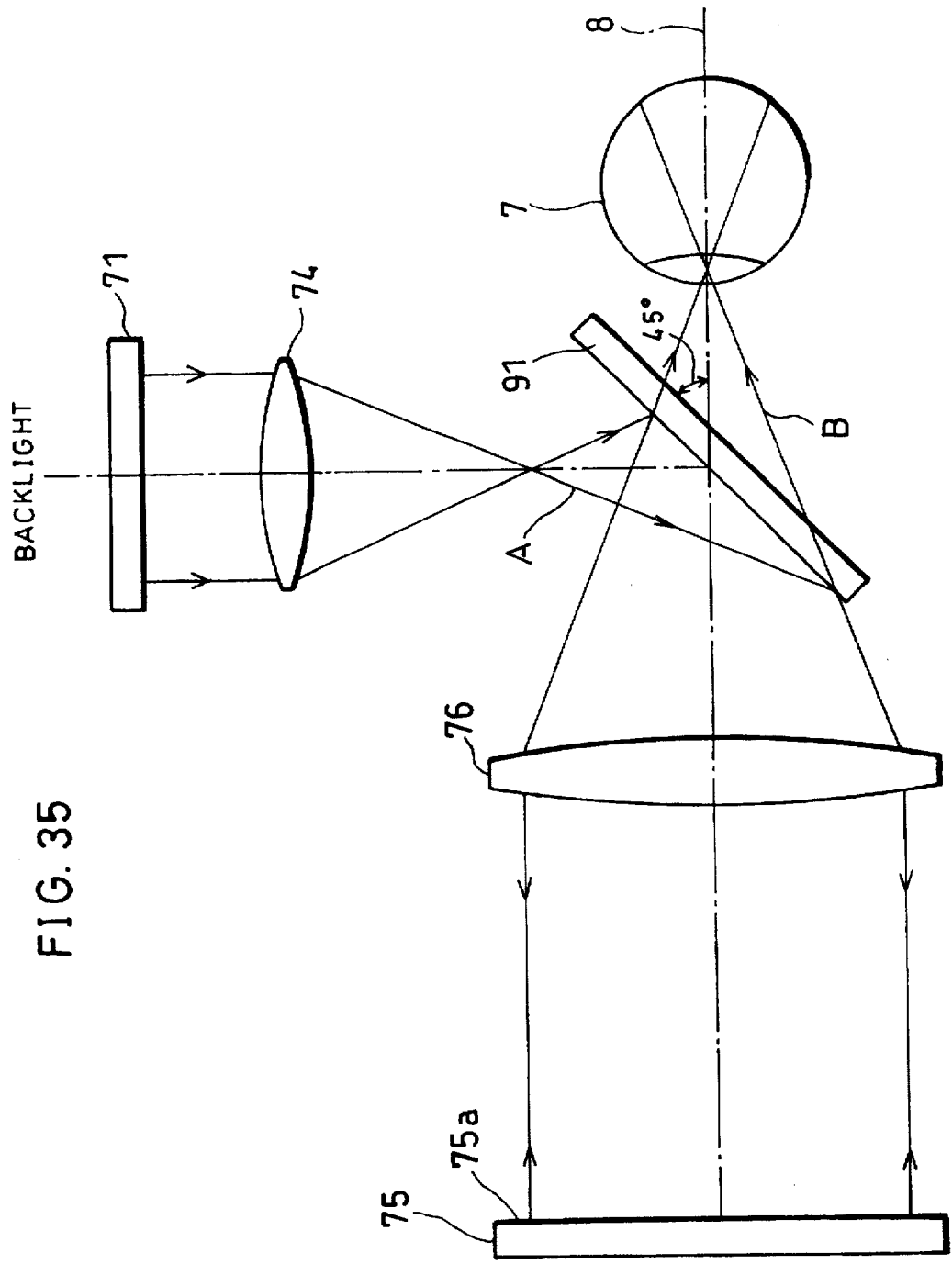
FIG. 35 is a view illustrating optical paths of the display apparatus shown in FIG. 34.

Hereinafter light going along the optical path from the image display element 71 to the projection plane 75a is referred to as an optical path A, while light going along the optical path from the projection plane 75a to the eye 7 of the observer is referred to as an optical path B, as shown in FIG. 35. The optical path A is defined as a ray orthogonal to the image display element 71, while the optical path B is defined as a ray passing through the center of the entrance pupil. In the case of a wide screen-type display apparatus, the principal ray B may be defined as a ray passing through the convolution point of the eye 7.

As described above, the display apparatus has the half mirror 91 between the magnifying lens 76 and the eye 7 so as to separate a principal ray A for projection and a principal ray B for observation of images. Here, as described, the principal ray A goes along an optical path which starts at the image display element 71, proceeds through the projection lens 74, the half mirror 91, and the magnifying lens 76 in this order, and reaches the projection plane 75a. The principal ray B goes along an optical path which starts at the projection plane 75a, goes through the magnifying lens 76, and the half mirror 91 in this order, and reaches the eye 7. The principal ray A is bent at an angle of 90° by the half mirror 91 so as to be directed to the projection plane 75a. The optical path B is arranged so as to penetrate the half mirror 91. Thus, the principal rays A and B are arranged so as to coincide with, or come very close to, each other only from the half mirror 91 to the projection plane 75a.

Thus, asymmetric distortion in images is eliminated by projecting and observing the images from the front of the projection plane. In order to do so, it is necessary to make the optical paths A and B coincide with, or come very close to, each other, as described above. For this reason, the optical paths A and B are separated by the half mirror 91 so that the image display element 71 and the projection lens 74 do not fall on the way from the projection plane 75a to the eye 7 even though the optical paths A and B coincide with each other.

Figure 36:
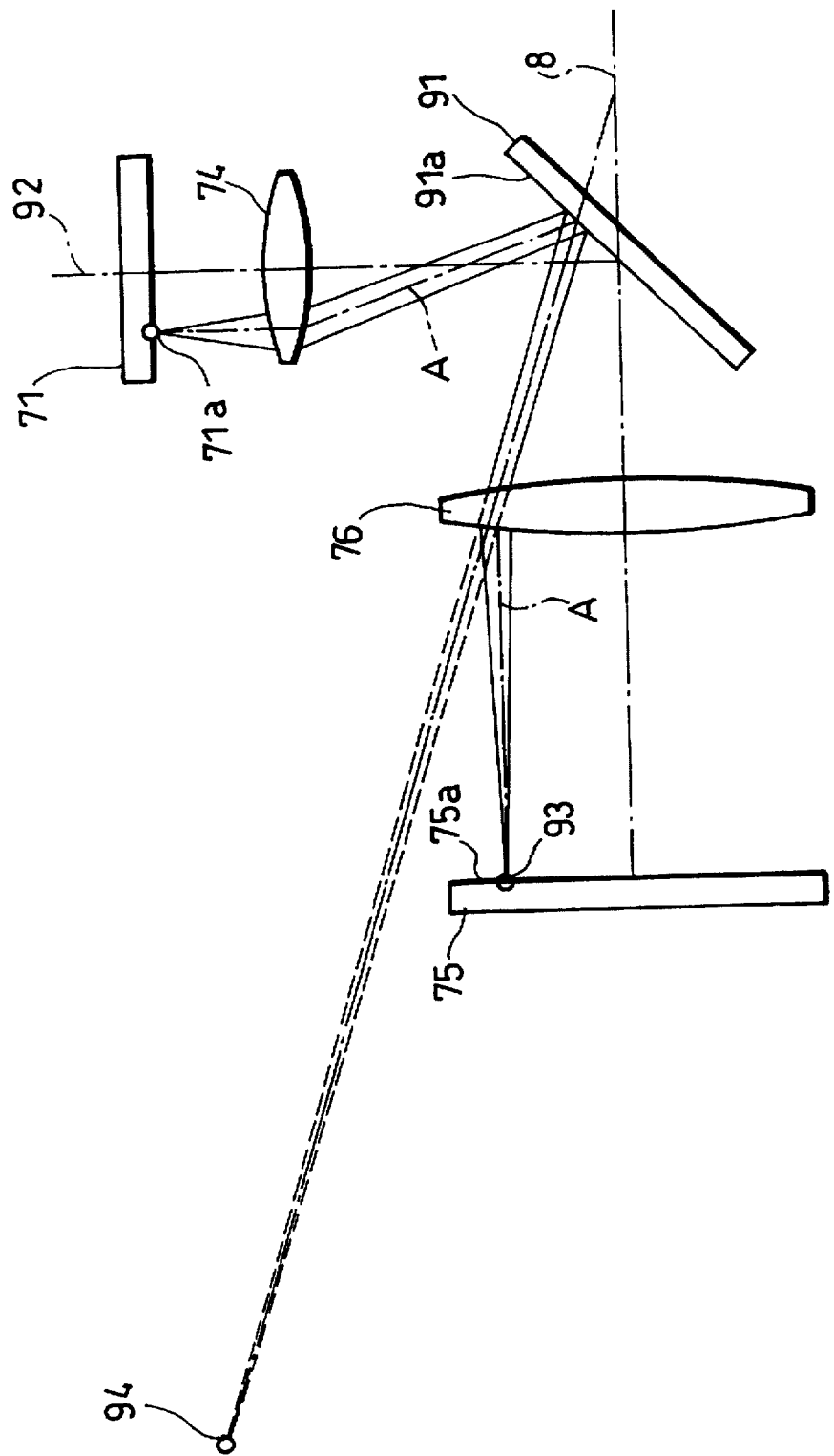
FIG. 36 is a view illustrating a first optical path from an image display element to a projection plane in the display apparatus shown in FIG. 34.
Figure 37:
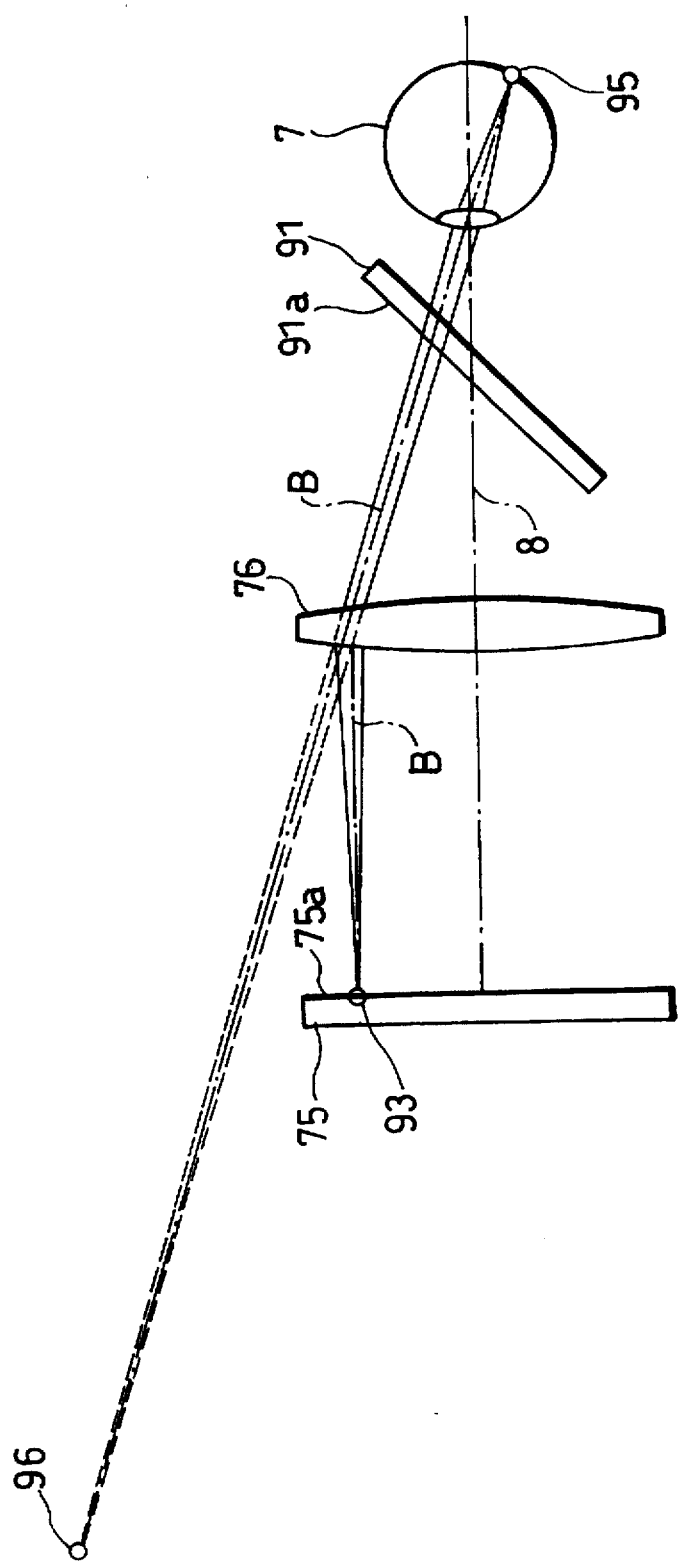
FIG. 37 is a view illustrating a second optical path from the projection plane of the display apparatus shown in FIG. 34 to the eye.

The following description will discuss image formation correlations of the display apparatus thus arranged, with reference to FIGS. 36 and 37. Note that in FIG. 36, a group of rays reaching the projection plane 75a of the screen 75 from one point 71a on the image display element 71 through the projection lens 74, the half mirror 91, and the magnifying lens 76 is represented as a luminous flux A. Likewise, in FIG. 37, a group of rays reaching the eye 7 from one point 93 on the projection plane 75a of the screen 75 through the magnifying lens 76 and the half mirror 91 is represented as a luminous flux B.

When a convergent point 94 of the luminous flux A from the projection lens 74 shown in FIG. 36 falls on a plane on which a virtual image 96 by the magnifying lens 76 shown in FIG. 37 is formed, the luminous flux A is converged on the projection plane 75a by the projection lens 74 and the magnifying lens 76, thereby forming an image 93. The image 93 thus formed on the projection plane 75a is projected on an point 95 on the retina of the eye 7 through the magnifying lens 76.

Thus, with the display apparatus, images are formed by projecting outputs of the image display element 71 onto the projection plane 75a through the two lenses, namely, the projection lens 74 and the magnifying lens 76. In other words, the image formation position of the outputs through the projection lens 74 does not fall on the projection plane 75a but coincides with the position of a virtual image (indicated by the point 96 in FIG. 37) which is obtained by the magnifying lens 76's processing an image on the projection plane 75a.

Therefore, patterns outputted by the image display apparatus 71 is mapped on the projection plane 75a through the two lenses, namely, the projection lens 74 and the magnifying lens 76 thereby forming an image, and the image is viewed through the magnifying lens 76.

With this arrangement, observation of images and projection for image formation can be both carried out from the front of the projection plane 75a of the screen 75. Therefore, asymmetric distortions in images such as those occurring when images are projected in an oblique direction can be avoided.

Furthermore, since the magnifying lens 76 is used for projection, a problem that the magnifying lens 76 becomes an obstacle blocking an optical path for the projection does not occur. In addition, a range where the projection is feasible and a range where the observation of the images is possible both depend on an angle of the apparent visual field of the magnifying lens 76. Therefore, when the apparent visual field of the magnifying lens 76 is broadened, images can be formed in a wide range corresponding to the apparent visual field.

Though the display device arranged as above employs the half mirror 91 as optical path separator, the principal rays A and B may be separated by utilizing polarization of the light, instead of using the half mirror 91. For example, utilized as optical path separating means may be a member which is equipped with a polarizing filter for extracting light having a specific polarization out of the outputs of the image display element 71, (2) a rotary polarizing element for carrying out rotary polarization so that linear polarized incident light to the projection plane 75a and linear polarized outgoing light from there have an angle of 90°, and (3) a polarized light separating element for reflecting one of the two linear polarized lights orthogonal to each other and penetrating the other light. In this case, the polarizing filter is disposed on the output side of the liquid crystal display panel as the image display element 71, the rotary polarizing element is disposed just in front of the projection plane 75a, and the polarized light separating element is disposed at the position of the half mirror 91.

Note that as a polarizing device, a phase shifting element or a rotary polarizing element may substitute for the above-described member. Such polarizing device is composed of a crystalline, a high polymer sheet, or a thin film. Alternatively, such device may be coupled with a diffraction grating.

The following description will discuss separation of light in the case where the above-arranged optical path separator.

Light extracted from the polarizing filter provided on the liquid crystal display panel as the image display element 71 is represented as linear polarized light (principal ray) A. The linear polarized light (principal ray) A is reflected by the polarized light separating element provided instead of the half mirror 91, so as to enter the projection plane 75a. The rotary polarizing element provided just in front of the projection plane 75a converts the linear polarized light (principal ray) A into linear polarized light (principal ray) B which is orthogonal to the linear polarized light (principal ray) A. The linear polarized light (principal ray) B penetrates through the polarized light separating element. The separation of the optical paths is thus carried out. With such method, it is possible to reduce loss of light caused by the separation of the optical paths, in comparison with the case where the half mirror 91 is used.

Figure 38:
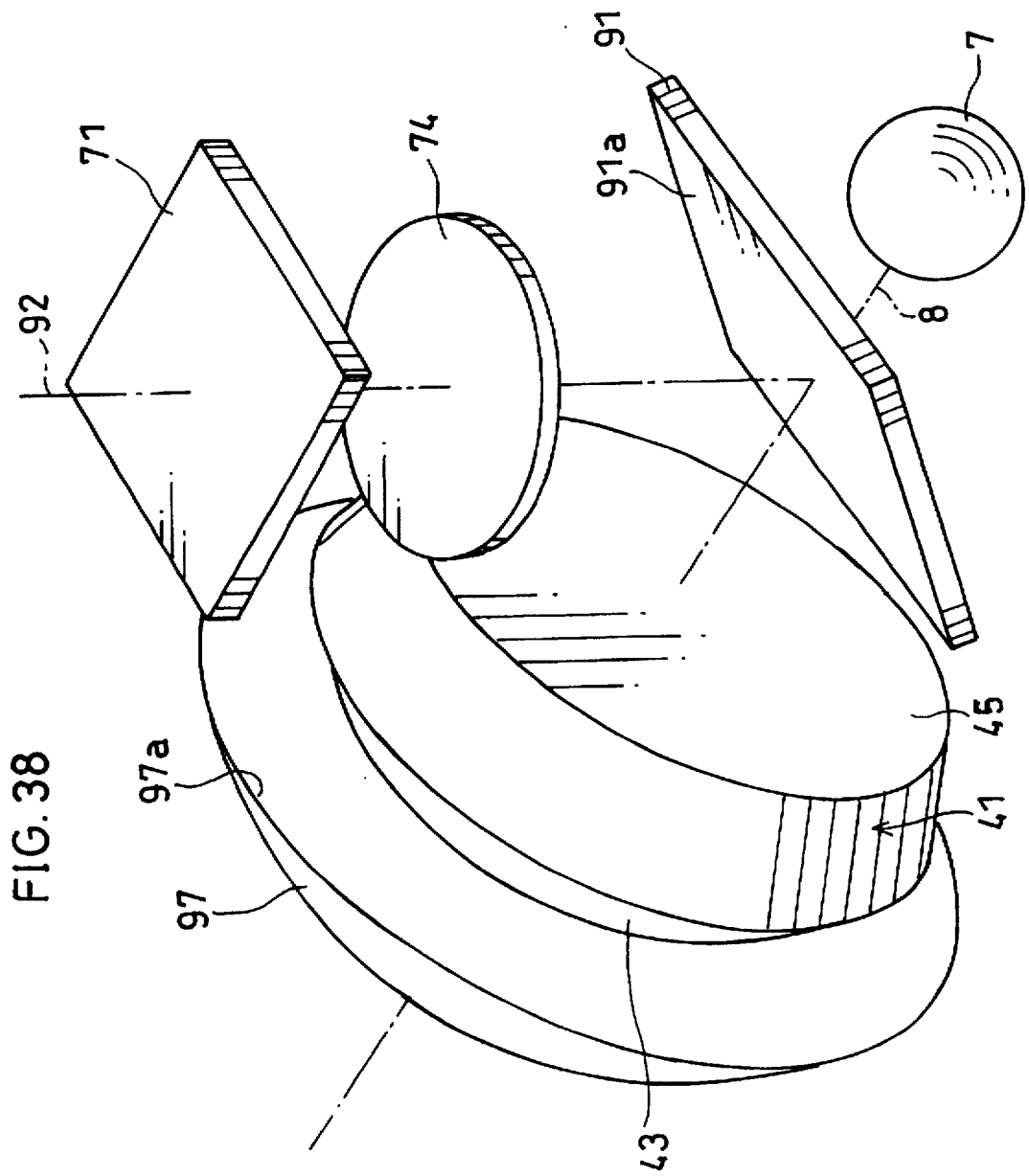
FIG. 38 is a view illustrating a schematic arrangement of the display apparatus shown in FIG. 34 in the case where the compound lens array shown in FIG. 14 is adapted as a magnifying lens in the display apparatus.

The following description will discuss a display apparatus which employs the compound lens array 41 described in conjunction with the second embodiment instead of the magnifying lens 76, and a projection plate 97 instead of the screen 75, as shown in FIG. 38. Note that compound lenses of the compound lens array 41 are omitted in FIG. 38.

The projection plate 97 curves in a substantial spherical form in accordance with the surface form on the projection side of the two-dimensional positive lens array 45. On the compound lens array 41 side of the projection plate 97, a projection plane 97a is provided. With this arrangement, images formed by the compound lens array 41 are properly projected on the projection plane 97a.

Figure 39:
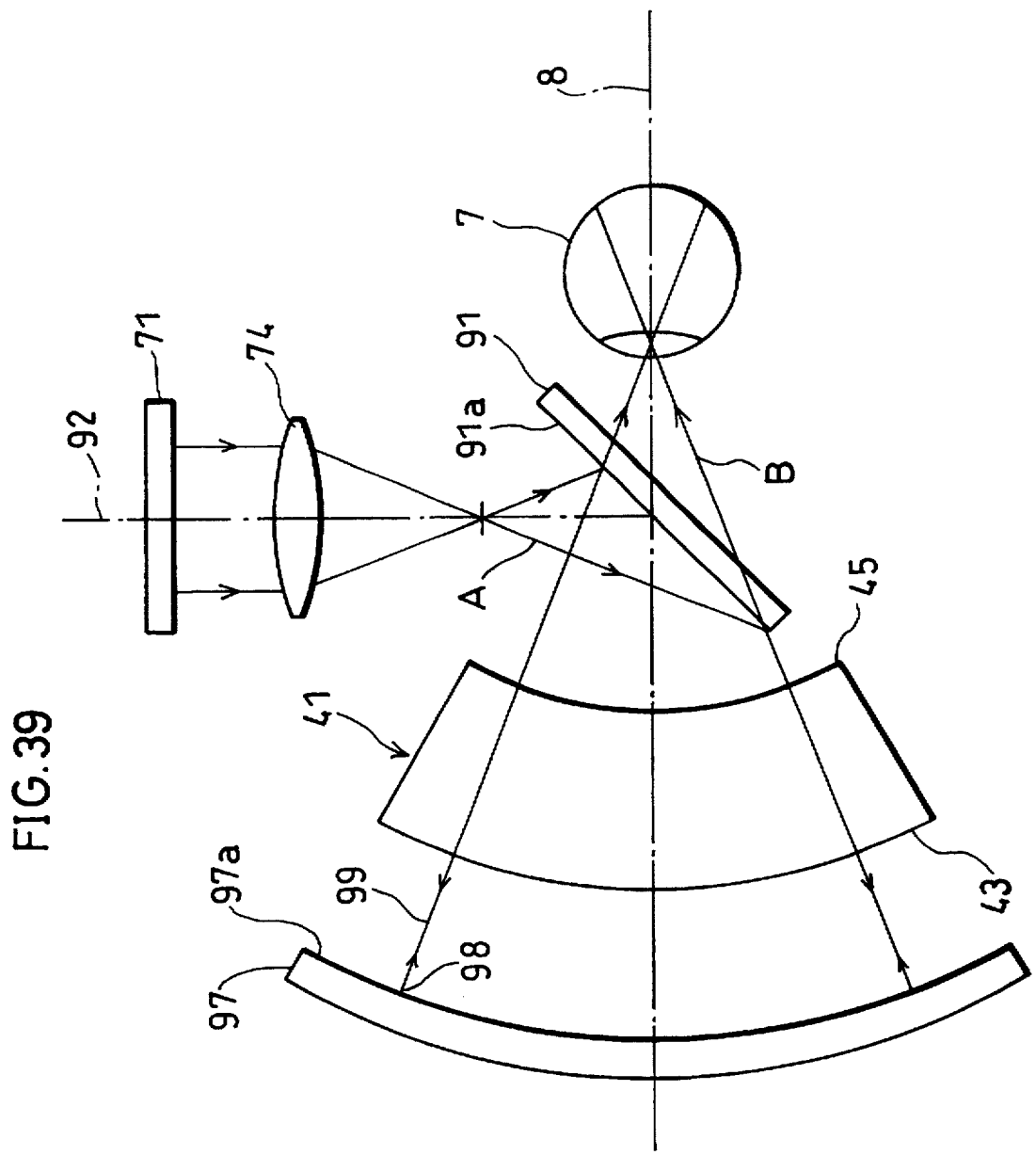
FIG. 39 is a view illustrating optical paths of the display apparatus shown in FIG. 38.

The following description will discuss optical paths in the display apparatus shown in FIG. 39, with reference to FIGS. 39 through 43.

Figure 40:
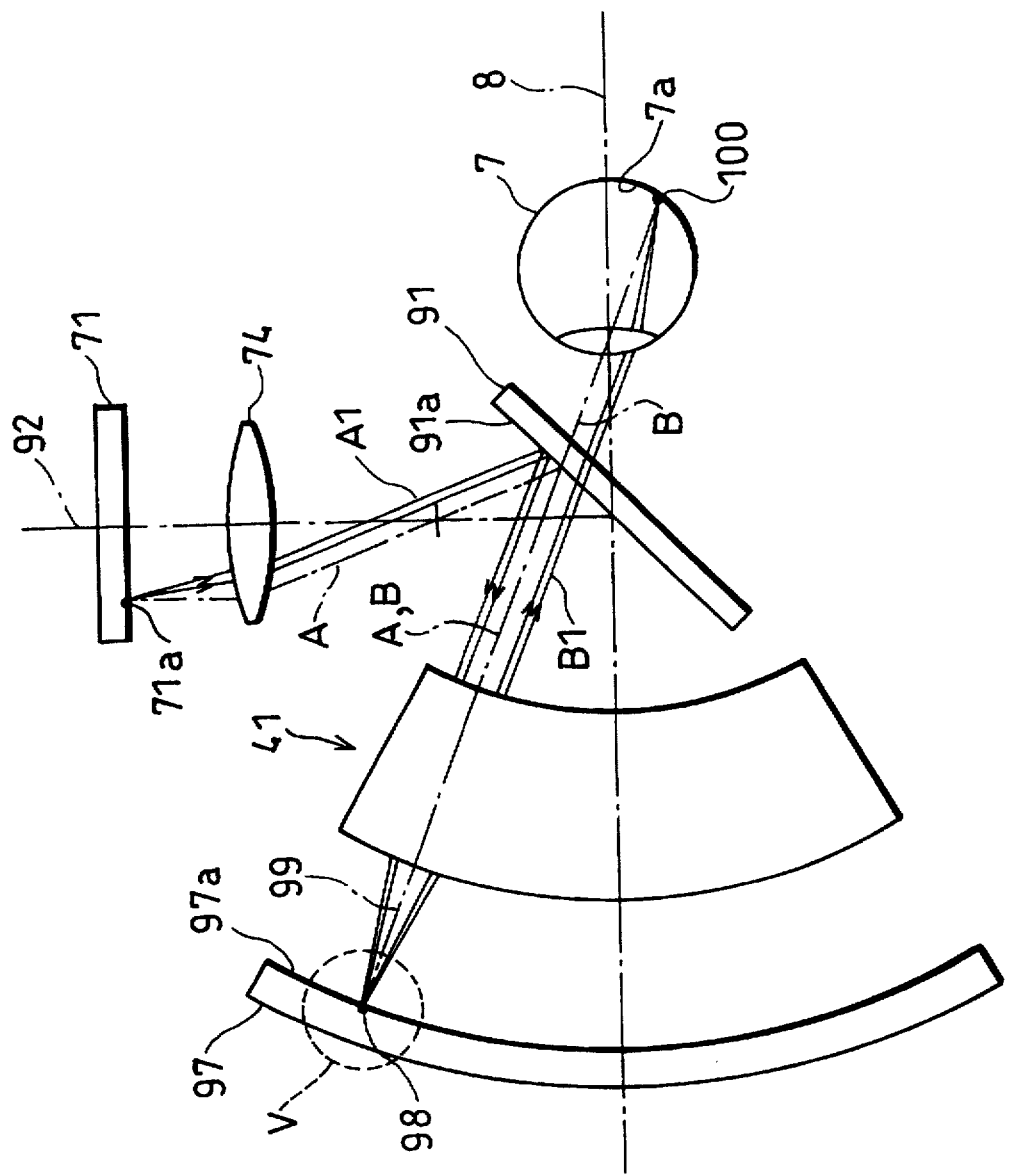
FIG. 40 is a view illustrating a ray emitted from an image display element of the display apparatus shown in FIG. 38, which is reflected by a projection plane of the same, and enters the eye.
Figure 41:
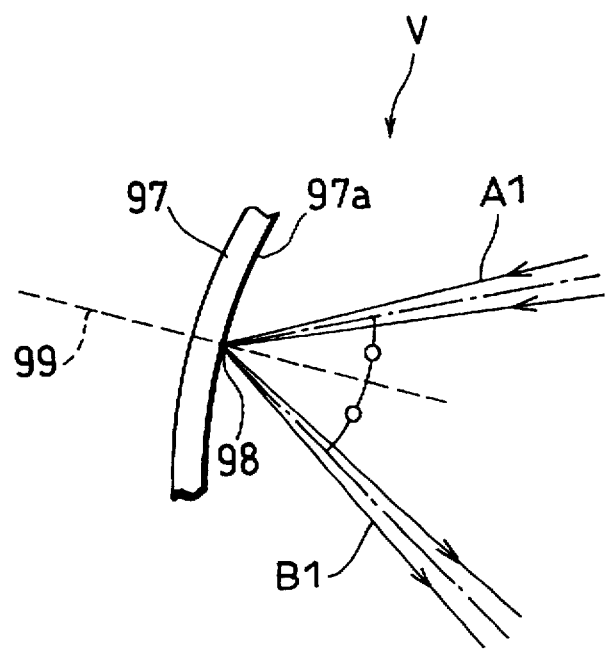
FIG. 41 is a view illustrating reflection of light on the projection plane shown in FIG. 40.

In FIG. 39, light going along an optical path from the image display element 71 to the projection plane 97a is represented as principal ray A, while light going along an optical path from the projection plane 97a to the eye 7 of the observer is represented as a principal ray B. In FIG. 40, light going along an optical path from a point 71a on the image display element 71 to a point 98 on the projection plane 97a is represented as a ray A1, while light going along an optical path from a point 98 on the projection plane 97a to the eye 7 of the observer is represented as a ray B1.

Here, when the principal ray A entering to the point 98 on the projection plane 97a and the principal ray B outgoing from the point 98 are symmetric with respect to a normal line 99 of the projection plane 97a at the point 98, the ray A1 and the ray B1 satisfy the Snell's law with respect to the projection plane 97a. Therefore, the projection plane 97a can be regarded as a mirror finished surface.

FIG. 39 illustrates a case where the principal ray A and the principal ray B coincide with the normal line 99 of the projection plane 97a, with which the above-mentioned condition of symmetry is satisfied. FIG. 40 shows a route of light from the point 71a on the image display element 71 to the eye 7 in this case.

Since it is clear from what has been described that the principal ray A and the principal ray B satisfy the Snell's law with respect to the point 98 on the projection plane 97a, the ray A1 from the image display element 71 to the projection plane 97a and the ray B1 which is a reflected ray of the ray A1 fall on a same point on the retina 7a of the eye 7 on which the principal ray B also falls on. In short, light emitted from the point 71a of the image display element 71 is reflected by the projection plane 97a, and the reflected light is converged at a point 100 on the retina 7a. Thus, when the projection plane 71a is a mirror finished surface thereby allowing the display plane of the image display element 71 to be directly viewed, the light form the image display element 71 is effectually transmitted to the eye 7.

Figure 42:
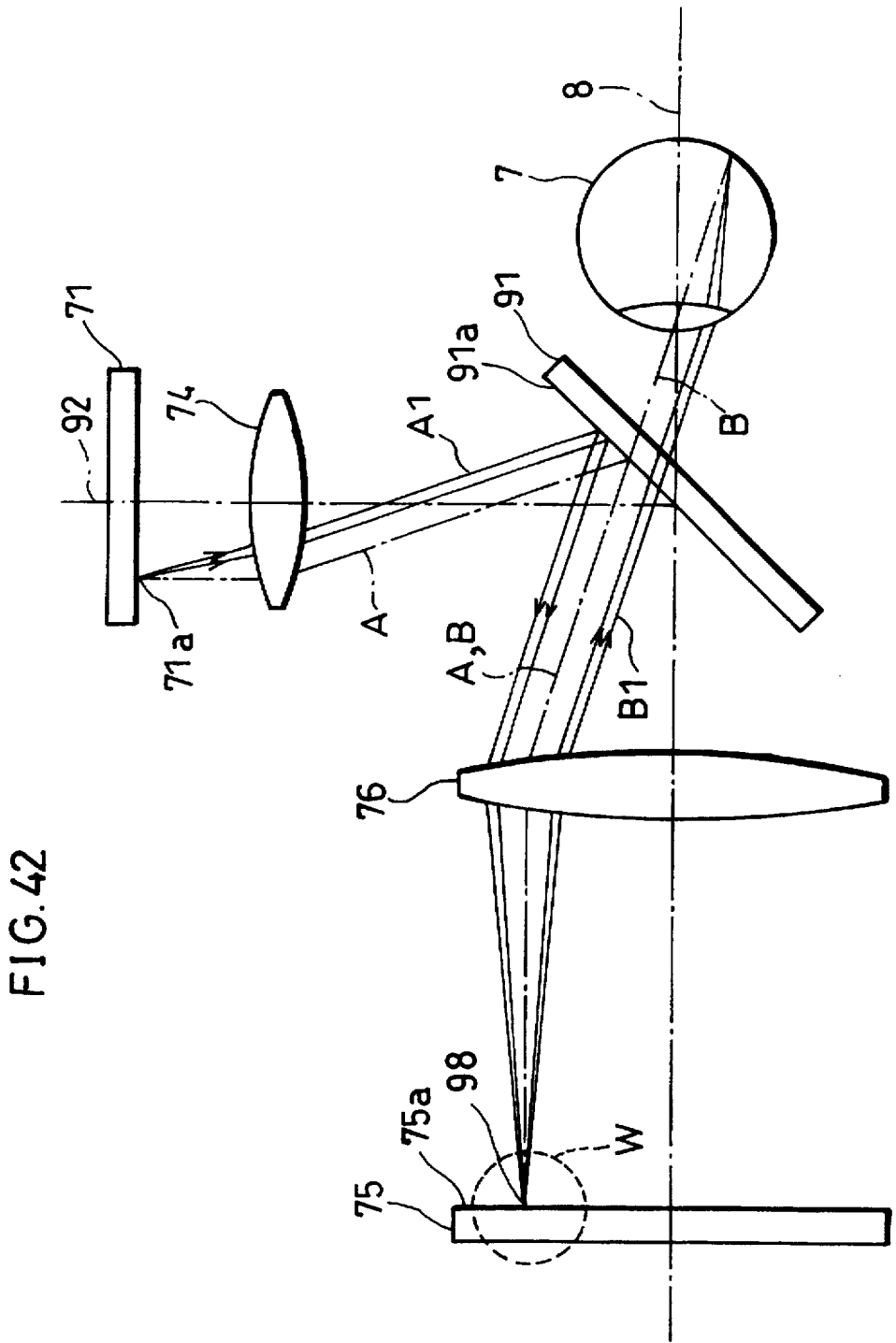
FIG. 42 is a view illustrating a ray emitted from the image display element which is reflected by the projection plane and enters the eye, in the case where the projection plane is flat.
Figure 43:
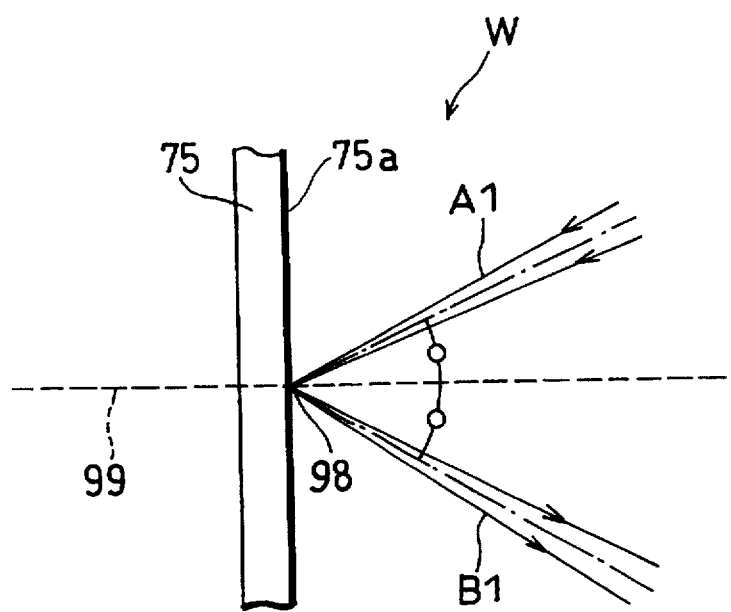
FIG. 43 is a view illustrating reflection of light on the projection plane shown in FIG. 42.

In the case where the projection plane 75a is flat as shown in FIG. 42, when the above conditions are satisfied, the ray A1 and the ray B1 become symmetric with respect to the normal line 99 of the projection plane 75a at the point 98 thereby satisfying the Snell's law, as shown in FIG. 43. Therefore, the projection plane 75a can be also regarded as a mirror finished surface.

[Eighth Embodiment]

The following description will discuss still another embodiment of the present invention. The members having the same structure (function) as those in the above-mentioned embodiment will be designated by the same reference numerals and their description will be omitted.

Figure 44:
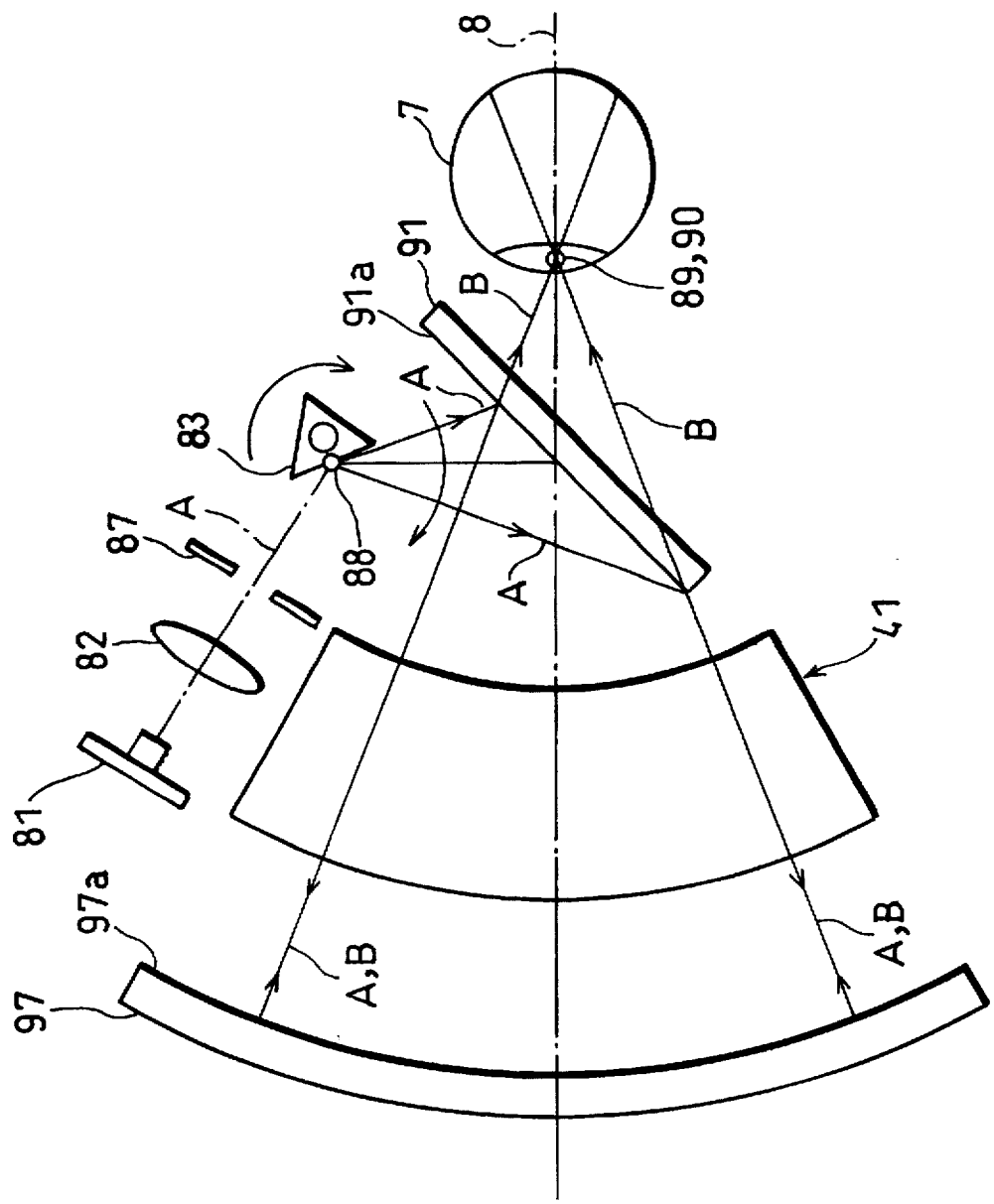
FIG. 44 is a schematic view illustrating an arrangement of the display apparatus shown in FIG. 38 in the case where a scan optical system is used in the display apparatus.

As shown in FIG. 44, a display apparatus in accordance with the present embodiment has a visual unit including (1) a linear display device 81 composed of an LED array, instead of the image display element 71 shown in FIG. 39 in conjunction with the seventh embodiment, and (2) a polygon mirror 83 as optical path deflecting means for deflecting the optical path so as to form images.

To be more specific, image light from the linear display device 81 is projected through a projection lens 82 and a slit 87 onto the polygon mirror 83 which rotates in a direction indicated by an arrow. Then, the image light deflected by the polygon mirror 83 is reflected by a half mirror 91, and scanned, magnified through the compound lens array 41 and projected onto a projection plane 97a of a projection plate 97.

Figure 45:
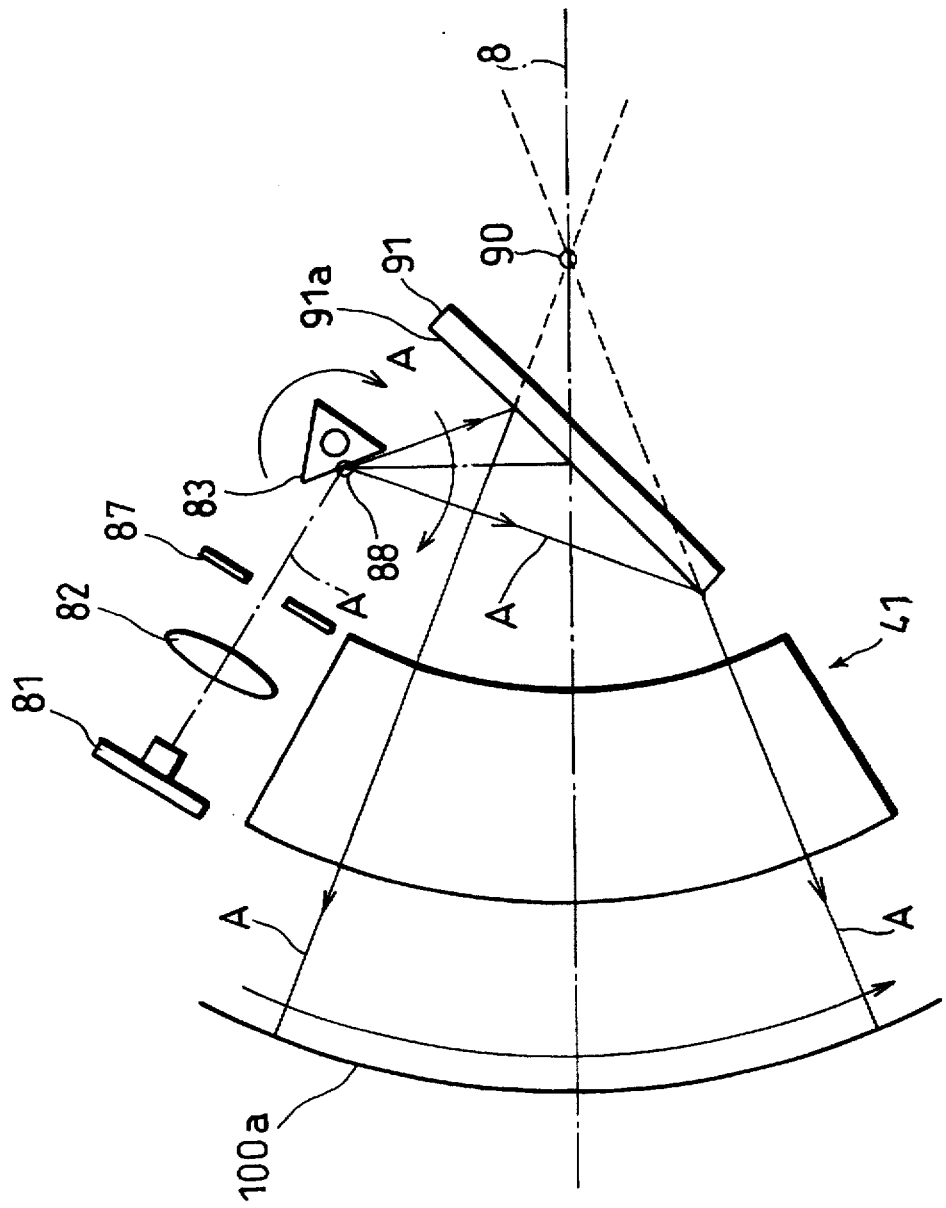
FIG. 45 is a view illustrating deflection of a principal ray by a scan and an image plane formed as a result, in the display apparatus shown in FIG. 38.
Figure 46:
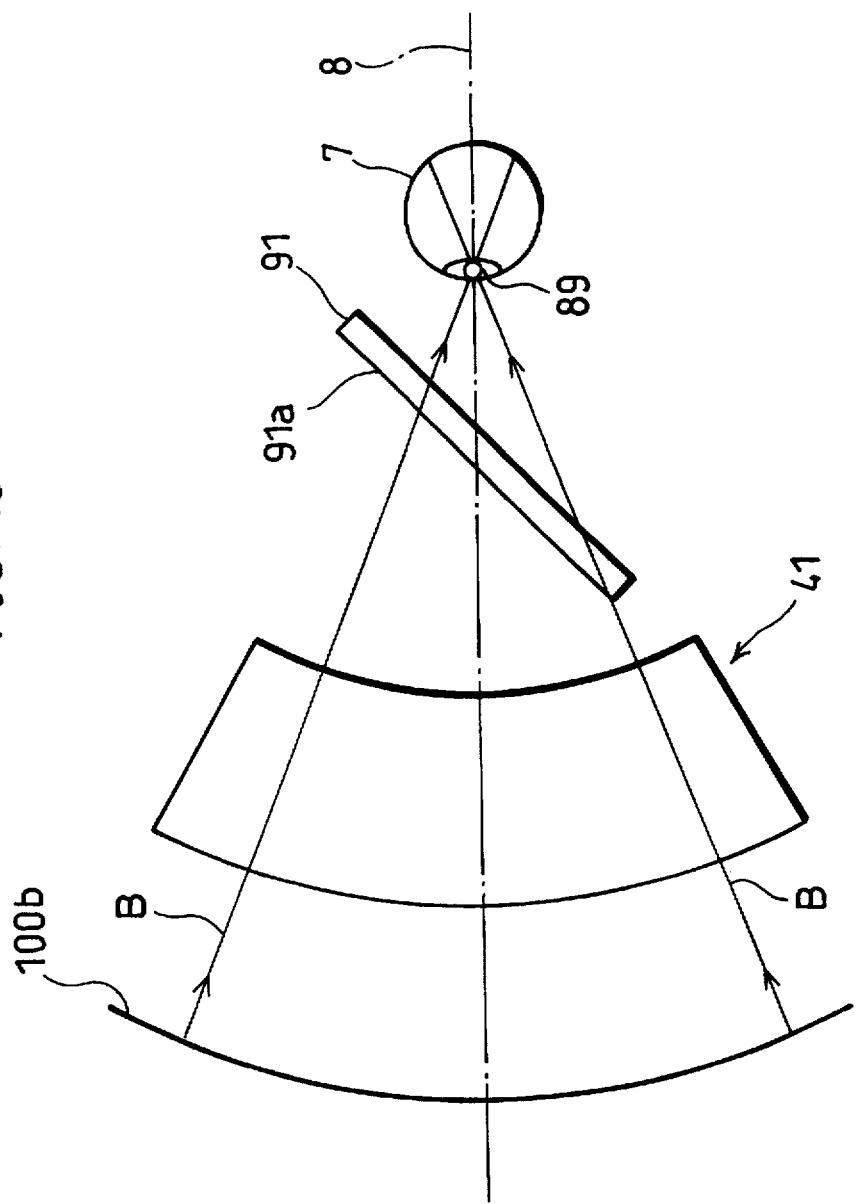
FIG. 46 is a view illustrating a principal ray from the projection plane to the eye in the display apparatus shown in FIG. 38.
Figure 47:
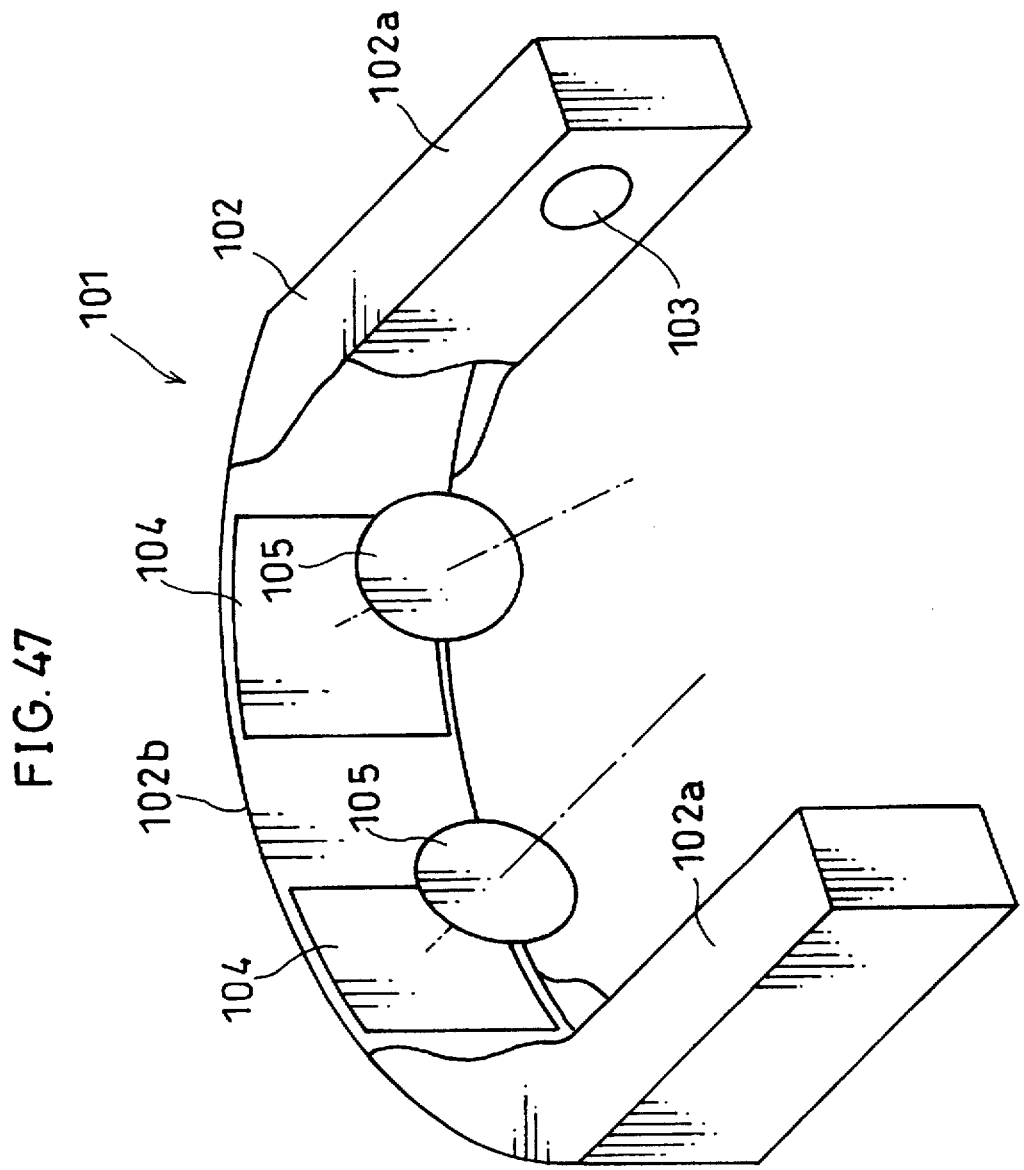
FIG. 47 is a schematic view illustrating an arrangement of a conventional display apparatus.
Figure 48:
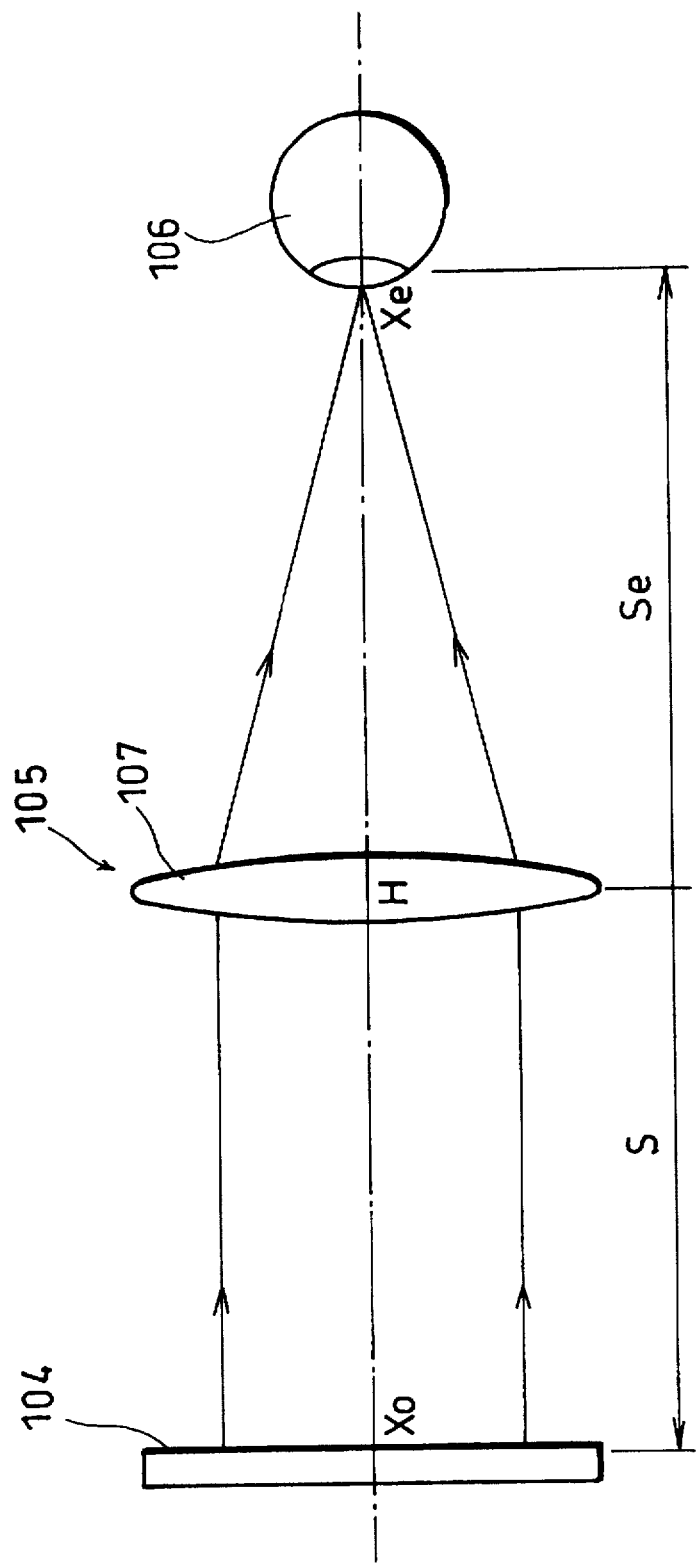
FIG. 48 is a view illustrating object-image correlations of a usual magnifying lens.
Figure 49:
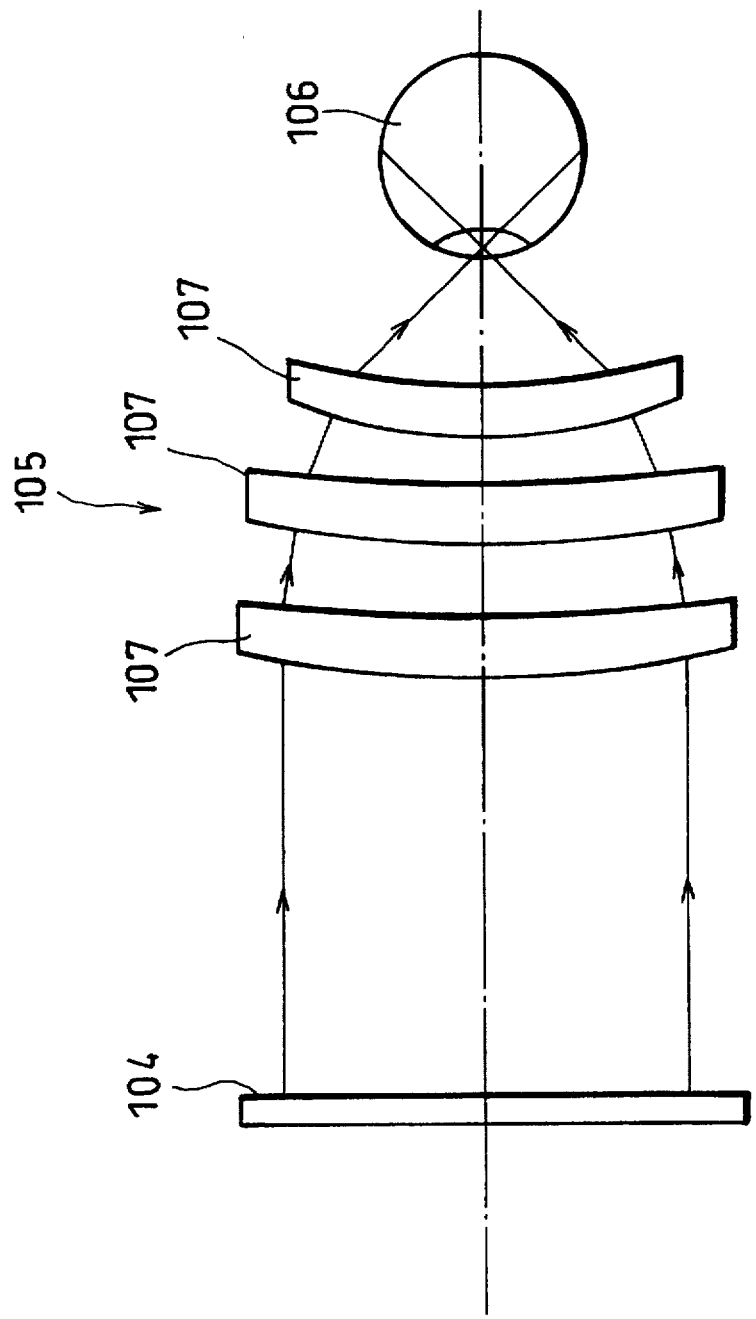
FIG. 49 is a view illustrating object-image correlations of a magnifying lens for a wide visual field.
Figure 50:
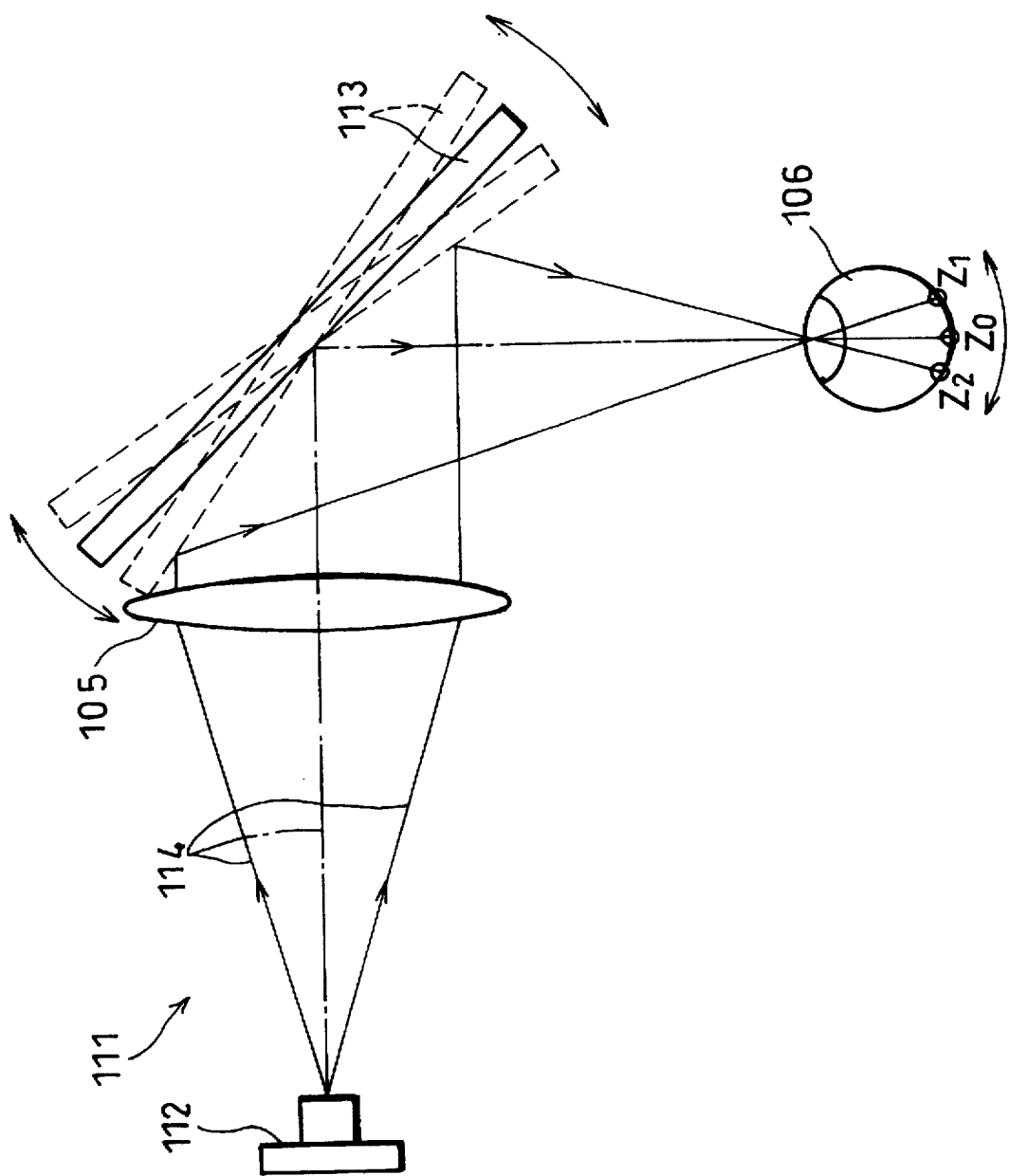
FIG. 50 is a schematic view illustrating an arrangement of an optical part of a display apparatus employing a conventional scan optical system.

The following description will discuss a case where a point 88 and a point 89 substantially coincide with each other with reference to FIGS. 45 and 46, the point 88 on the polygon mirror 83 being a point at which a principal ray A from the linear display device 81 to the projection plane 97a enters the polygon mirror 83, and the point 89 on the eye 7 being a point at which the principal ray B from the projection plane 97a enters the eye 7. Note that dealt with in the present description is a case where a virtual image 90 of the point 88 on the projection plane 97a coincides with the point 89 as shown in FIG. 44.

With the above-described arrangement, when a center of deflection of the principal ray A by the polygon mirror 83 is the point 88 and the virtual image 90 of the point 88 with respect to the half mirror 91 coincides with the point 89 of the principal ray B in FIG. 46, a scan plane 100a in FIG. 45 and an object plane 100b in FIG. 46 coincide with one another, as clear from the reversibility of optical system. Therefore, a correction lens which is usually necessary for image formation by scanning is unnecessary.

Incidentally, when the visual unit of the above-described display apparatus has any of the compound lens arrays 1, 41, and 51 as a magnifying lens so as to project an image, defects sometimes occur in the image on the projected plane 97a, unless a luminous flux from the linear display device 81, when reaching the positive lenses 10, has a width twice as great as the interval of the positive lenses 10 or greater than that.

To cope with this, the projection lens 83 is required to have a diameter great enough to cause the luminous flux to have the above-described width. In the present embodiment, assuming that the pupil diameter of the eye of the observer is 2 mm, the interval between the positive lenses 10 is set to 1 mm. Further, the width of the luminous flux of the projection light is set twice as great as the above-mentioned interval or more than that. However, when the luminous flux has a too great width, projected images tend to blur, in the case where either compound lens array 41 or 51 is employed. To solve this problem, in the present embodiment, the slit 87 with an aperture diameter of 3 mm is provided between the projection lens 82 and the half mirror 91 so as to restrict the width of the luminous flux of the projection light. In this case, since 9 to 12 compound lenses 2 are associated with one point on the linear display device 81 so as to form images, no defect occurs in the projected images. In addition, the blur of the images can be suppressed to a level with which practically no problem would be caused.

In the display apparatus thus arranged, outputs patterns of the linear display device which partially displays an image are mapped onto the projection plane 97a through the projection lens 82 and the magnifying lens 41. The patterns thus mapped on the projection plane 97a are scanned, thereby forming an image.

The scan is conducted by the polygon mirror 83 as optical path deflecting means which rotates. Then, the image thus formed on the projection plane 97a is observed through the magnifying lens 41.

An image formation position of the projected images formed by the scan falls on an assumed rotary body with the polygon mirror 83 as a substantial center. Therefore, when the projection plane 97a does not coincide with this, a correction lens is required so as to correct deviation of the image formation position. With the present arrangement, wherein a center of deflection of the principal ray A by the polygon mirror 83 or a virtual image of the same produced by the half mirror 91 is conformed to the convergent point of the principal ray B, it is possible to conform the image formation position of the projected images to the projection plane 97a from the reversibility of optical system. In short, the magnifying lens 41 also plays a role as the correction lens.

Light from the linear display device 81 to the projection plane 97a through the projection lens 82 and the compound lens array 41 is reflected by the projection plane 97a, and pass through the compound lens array 41 thereby reaching the eye 7. Here, the reflection of the light is in accord with the Snell's law. In other words, since light, which is not diffused light from the linear display device 81, directly enters the eye 7, brighter images can be obtained.

Furthermore, since the light from the linear display device 81 forms images on the projection plane 97a, magnification of images (virtual images) observed through the compound lens array 41 does not change, even in the case where the projection plane 97a is curved.

It is preferable that the projection plane 97a is a mirror finished surface, but it may be a diffusing surface. In the latter case, regular reflection light which has greater power among other diffused light from the projection plane 97a enters the eye. Therefore, brighter images can be obtained.

Furthermore, in the case of the display apparatus wherein images on the projection plane 97a are magnified by the compound lens array 41 and observed, images on a curved surface can be easily obtained, namely, only by forming images on a curving projection plane 97a. Therefore, in the case of this arrangement, it is easier to form an object plane which is suitable for a compound lens array composed of compound lenses provided on a curving surface such as on a cylindrical surface or a spherical surface.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnifying lens for magnifying an object so that a magnified image of the object is visible to naked eye, said magnifying lens comprising a plurality of compound lenses, which is formed by opposite two-dimensional negative lens array and a two-dimensional positive lens array, the two-dimensional negative lens array having a plurality of negative lenses, the two-dimensional positive lens array having a plurality of the positive lenses, each of said compound lenses having a pair of the opposite negative and positive lenses, the negative lenses being provided so that respective principal planes of the negative lenses are on a same first plane, the positive lenses being provided so that respective principal planes of the positive lenses are on a same second plane, wherein each pair of the negative and positive lenses is provided so that a straight line connecting the respective principal points of the negative and positive lenses intersects substantially at a point (Xc) a distance (Sc) between the point (Xc) and the first plane of the two-dimensional negative lens array satisfying the following equation:

$$Sc = \frac{So \cdot Sd \cdot f2}{(So + f1)Sd - (f1 + f2)So}$$

where So (So<0) represents a distance from the first plane of the two-dimensional negative lens array to the object, Sd (Sd>0) represents a distance from the first plane of the two-dimensional negative lens array to the second plane of the two-dimensional positive lens array, f1 (f1<0) represents a focal distance of the negative lens, and f2 (f2>0) represents a focal distance of the positive lens.

2. The magnifying lens as set forth in claim 1, wherein the negative lenses and the positive lenses are provided so that each principal plane of the negative and positive lenses is substantially a flat surface.

3. The magnifying lens as set forth in claim 2, wherein the two-dimensional negative and positive lens arrays are respectively provided on flat substrates, the flat substrates being provided substantially in parallel.

4. The magnifying lens as set forth in claim 1, wherein the two-dimensional negative and positive lens arrays are made of methacrylic resin.

5. The magnifying lens as set forth in claim 1, wherein the two-dimensional negative and positive lens arrays are made of acrylic resin.

6. A magnifying lens as set forth in claim 1, further comprising a light intercepting member provided between said compound lenses.

7. The magnifying lens as set forth in claim 6, wherein said light intercepting member is made of resin colored with black pigment.

8. The magnifying lens as set forth in claim 7, wherein the resin for said light intercepting member is the same resin for the two-dimensional negative and positive lens arrays.

9. The magnifying lens as set forth in claim 1, wherein said compound lenses are provided so that the lenses of the two-dimensional lens array closest to the observer have a principal point interval of not more than half of a diameter of a pupil of the naked eye.

10. The magnifying lens as set forth in claim 1, wherein each pair of the negative and positive lenses constituting said compound lens is provided so that the negative lens and the positive lens are respectively provided substantially on spherical surfaces, both the spherical surfaces having the point (Xc) as a center.

11. A magnifying lens as set forth in claim 10, further comprising lens-barrels, each lens-barrel housing each pair of the negative and positive lenses constituting each compound lens, each lens-barrel having a shape such that products of generatrices or ridge lines of each side surface of said lens-barrel intersect substantially at the point (Xc).

12. The magnifying lens as set forth in claim 10, wherein each compound lens is a single-piece lens having a concave surface on one surface so as to have the same function as that of the negative lens, while a convex surface on the other surface so as to have the same function as that of the positive lens, each compound lens being provided on a spherical surface with the point Xc as a center, each compound lens having a shape such that products of generatrices or ridge lines of a side surface of said compound lens intersect substantially at the point (Xc).

13. The magnifying lens as set forth in claim 10, wherein said compound lenses are provided so that the lenses of the two-dimensional lens array closest to the observer have a principal point interval of not more than half of a diameter of a pupil of the naked eye.

14. The magnifying lens as set forth in claim 1, wherein said compound lenses are linearly provided so as to form a compound lens array and a plurality of the compound lens arrays are provided substantially on a cylindrical surface having the point (Xc) as a center.

15. A magnifying lens as set forth in claim 14, further comprising lens-barrels, each lens-barrel housing each compound lens array, each lens-barrel having a shape such that extension of each side surface of said lens-barrels contains the point (Xc).

16. The magnifying lens as set forth in claim 14, wherein said compound lenses are provided so that the lenses of the two-dimensional lens array closest to the observer have a principal point interval of not more than half of a diameter of a pupil of the naked eye.

17. A display apparatus comprising:

an optical system having an image display element for displaying images and a magnifying lens for magnifying the images displayed on the image display element so that the images are visible to naked eye; and arranging means for providing said optical system so that the images are visible to the naked eye, wherein the magnifying lens comprising a plurality of compound lenses, which is formed by opposite two-dimensional negative lens array and a two-dimensional positive lens array, the two-dimensional negative lens array having a plurality of negative lenses, the two-dimensional positive lens array having a plurality of the positive lenses, each of the compound lenses having a pair of the opposite negative and positive lenses, the negative lenses being provided so that respective principal planes of the negative lenses are on a same first plane, the positive lenses being provided so that respective principal planes of the positive lenses are on a same second plane, each pair of the negative and positive lenses is provided so that a straight line connecting the respective principal points of the negative and positive lenses intersects substantially at a point (Xc), a distance (Sc) between the point (Xc) and the first plane of the two-dimensional negative lens array satisfying the following equation:

$$Sc = \frac{So \cdot Sd \cdot f2}{(So+f1)Sd - (f1+f2)So}$$

where So (So<b 0) represents a distance from the first plane of the two-dimensional negative lens array to the object, Sd (Sd>0) represents a distance from the first plane of the two-dimensional negative lens array to the second plane of the two-dimensional positive lens array, f1 (f<0) represents a focal distance of the negative lens, and f2 (f2>0) represents a focal distance of the positive lens.

18. A display apparatus comprising:

an optical system having an image display element for displaying images;

a screen on which the images are projected;

a projection lens for projecting the images displayed on the image display element on the screen;

a magnifying lens for magnifying the images projected on the screen so that the images are visible to naked eye; and arranging means for providing said optical system so that the images are visible to the naked eye such that an observer views an image reflected by the screen through the magnifying lens.

19. The display apparatus as set forth in claim 18, wherein said optical system further includes optical path deflecting means for deflecting light from the image display element through the projection lens onto the screen, so as to scan and form images on the screen.

20. The display apparatus as set forth in claim 19, wherein the optical path deflecting means is a polygon mirror.

21. The display apparatus as set forth in claim 18, wherein the magnifying lens comprising a plurality of compound lenses, which is formed by opposite two-dimensional negative lens array and a two-dimensional positive lens array, the two-dimensional negative lens array having a plurality of negative lenses, the two-dimensional positive lens array having a plurality of the positive lenses, each of the compound lenses having a pair of the opposite negative and positive lenses, the negative lenses being provided so that respective principal planes of the negative lenses are on a same first plane, the positive lenses being provided so that respective principal planes of the positive lenses are on a same second plane.

22. The display apparatus as set forth in claim 18, wherein the screen has a reflection angle control member for controlling an angle of reflection of projected light.

23. The display apparatus as set forth in claim 22, wherein the reflection angle control member of the screen has a shape of saw-tooth.

24. The display apparatus as set forth in claim 23, wherein the serrated reflection angle control member has mirror-finished surfaces.

25. The display apparatus as set forth in claim 18, wherein said arranging means includes earpiece parts which are fitted over ears of the observer, and an optical system arranging part for holding said optical system, the optical system holding part being provided a predetermined distance apart from the earpiece parts.

26. The display apparatus as set forth in claim 25, wherein said arranging means further includes speakers provided in the earpiece parts.

27. The display apparatus as set forth in claim 18, wherein the magnifying lens is disposed on an optical path from the projection lens to the screen.

28. The display apparatus as set forth in claim 27, wherein said optical system further includes optical path separator for separating a first optical path and a second optical path, the first optical path being from the image display element to the screen, a second optical path being from the screen to the observer's eye.

29. The display apparatus as set forth in claim 28, wherein the optical path separator is a half mirror.

30. The display apparatus as set forth in claim 28, wherein the optical path separator is a polarizing device.

31. The display apparatus as set forth in claim 27, wherein said optical system has optical path deflecting means for deflecting light from the image display element through the projection lens onto the screen, so as to scan and form images on the screen.

32. The display apparatus as set forth in claim 27, wherein:

the screen has a mirror-finished projection plane; and a first optical path from the image display element to the screen and a second optical path from the screen to the observer's eye are set so that incident light proceeding along the first optical path to the screen and reflected light from the screen proceeding along the second optical path satisfy Snell's law on reflection.

33. The display apparatus as set forth in claim 27, wherein the magnifying lens comprising a plurality of compound lenses, which is formed by opposite two-dimensional negative lens array and two-dimensional positive lens array, the two-dimensional negative lens array having a plurality of negative lenses, the two-dimensional positive lens array having a plurality of the positive lenses, each of the compound lenses having a pair of the opposite negative and positive lenses, the negative lenses being provided so that respective principal planes of the negative lenses are on a same first plane, the positive lenses being provided so that respective principal planes of the positive lenses are on a same second plane.

34. The display apparatus as set forth in claim 33, wherein the compound lens array are provided so that the compound lenses closest to the eye have a principal point interval of not more than a diameter of luminous flux from one point on the image display element to the compound lens array.

35. A display apparatus comprising:

an optical system having an image display element for displaying images, a screen on which the images are projected, a projection lens for projecting the images on the image display element on the screen, and a magnifying lens for magnifying the images displayed on the image display element so as to be visible to naked eye; and arranging means for providing said optical system in front of the observer's eye, wherein the magnifying lens comprising a plurality of compound lenses, which is formed by opposite two-dimensional negative lens array and a two-dimensional positive lens array, the two-dimensional negative lens array having a plurality of negative lenses, the two-dimensional positive lens array having a plurality of the positive lenses, each of the compound lenses having a pair of the opposite negative and positive lenses, the negative lenses being provided so that respective principal planes of the negative lenses are on a same first plane, the positive lenses being provided so that respective principal planes of the positive lenses are on a same second plane, each pair of the negative and positive lenses is provided so that a straight line connecting the respective principal points of the negative and positive lenses intersects substantially at a point (Xc), a distance (Sc) between the point (Xc) and the first plane of the two-dimensional negative lens array satisfying the following equation:

$$Sc = \frac{So \cdot Sd \cdot f2}{(So + f1)Sd - (f1 + f2)So}$$

where So (So<0) represents a distance from the first plane of the two-dimensional negative lens array to the object, Sd (Sd>0) represents a distance from the first plane of the two-dimensional negative lens array to the second plane of the two-dimensional positive lens array, f1 (f1<0) represents a focal distance of the negative lens, and f2 (f2>0) represents a focal distance of the positive lens.

36. The display apparatus as set forth in claim 35, wherein the negative lenses and the positive lenses are provided so that each principal plane of the negative and positive lenses is substantially a flat surface.

37. The display apparatus as set forth in claim 36, wherein the two-dimensional negative and positive lens arrays are respectively provided on flat substrates, the flat substrates being provided substantially in parallel.

38. The display apparatus as set forth in claim 35, wherein the two-dimensional negative and positive lens arrays are made of methacrylic resin.

39. The display apparatus as set forth in claim 35, wherein the two-dimensional negative and positive lens arrays are made of acrylic resin.

40. The display apparatus as set forth in claim 35, wherein the magnifying lens further includes a light intercepting member provided between the compound lenses.

41. The display apparatus as set forth in claim 40, wherein the light intercepting member is made of resin colored with black pigment.

42. The display apparatus as set forth in claim 41, wherein the resin for the light intercepting member is the same resin for the two-dimensional negative and positive lens arrays.

43. The display apparatus as set forth in claim 35, wherein the compound lenses are provided so that the lenses of the two-dimensional lens array closest to the observer have a principal point interval of not more than half of a diameter of a pupil of the naked eye.

44. The display apparatus as set forth in claim 35, wherein each pair of the negative and positive lenses constituting the compound lens is provided so that the negative lens and the positive lens are respectively provided substantially on spherical surfaces, both the spherical surfaces having the point (Xc) as a center.

45. The display apparatus as set forth in claim 44, wherein the magnifying lens further includes lens-barrels, each lens-barrel housing each pair of the negative and positive lenses constituting each compound lens, each lens-barrel having a shape such that products of generatrices or ridge lines of each side surface of the lens-barrel intersect substantially at the point (Xc).

46. The display apparatus as set forth in claim 45, wherein each compound lens is a single-piece lens having a concave surface on one surface so as to have the same function as that of the negative lens, while a convex surface on the other surface so as to have the same function as that of the positive lens, each compound lenses being provided on a spherical surface with the point (Xc) as a center, each compound lens having a shape such that products of generatrices or ridge lines of each side surface of the compound lens intersect substantially at the point (Xc).

47. The display apparatus as set forth in claim 35, wherein the compound lenses are provided so that the lenses of the two-dimensional lens array closest to the observer have a principal point interval of not more than half of a diameter of a pupil of the naked eye.

48. The display apparatus as set forth in claim 35, wherein the compound lenses are linearly provided so as to form a compound lens array and a plurality of the compound lens arrays are provided substantially on a cylindrical surface having the point (Xc) as a center.

49. The display apparatus as set forth in claim 48, wherein the magnifying lens further includes lens-barrels, each lens-barrel housing each compound lens array, each lens-barrel having a shape such that extension of each side surface of the lens-barrels contains the point (Xc).

50. The display apparatus as set forth in claim 48, wherein the compound lenses are provided so that the lenses of the two-dimensional lens array closest to the observer have a principal point interval of not more than half of a diameter of a pupil of the naked eye.

* * * * *